US 8,029,406 B2

(12) United States Patent
Aoki et al.

(10) Patent No.: US 8,029,406 B2
(45) Date of Patent: Oct. 4, 2011

(54) AUTOMATIC TRANSMISSION FOR A VEHICLE

(75) Inventors: Toshihiko Aoki, Anjo (JP); Minoru Todo, Takahama (JP); Kazuhisa Ozaki, Aichiken (JP); Takuya Ishii, Anjo (JP); Satoshi Fukuyama, Anjo (JP); Tomochika Inagaki, McLean, VA (US); Yousuke Andoh, Tokyo (JP)

(73) Assignee: Aisin AW Co., Ltd, Aichiken (JP)

( * ) Notice: Subject to any disclaimer, the term of this patent is extended or adjusted under 35 U.S.C. 154(b) by 0 days.

(21) Appl. No.: 12/831,729

(22) Filed: Jul. 7, 2010

(65) Prior Publication Data

US 2010/0298087 A1 Nov. 25, 2010

Related U.S. Application Data

(62) Division of application No. 11/666,827, filed on Apr. 30, 2007, now Pat. No. 7,819,773.

(30) Foreign Application Priority Data

Mar. 9, 2005 (JP) ................................ 2005-066397

(51) Int. Cl.
*F16H 3/44* (2006.01)
(52) U.S. Cl. ......................... 475/282; 475/284; 475/286
(58) Field of Classification Search .................. 475/282, 475/284, 286, 330
See application file for complete search history.

(56) References Cited

U.S. PATENT DOCUMENTS

| 6,110,069 | A | 8/2000 | Taniguchi et al. |
| 6,120,410 | A | 9/2000 | Taniguchi et al. |
| 6,135,912 | A | 10/2000 | Tsukamoto et al. |
| 6,139,463 | A | 10/2000 | Kasuya et al. |
| 6,176,802 | B1 | 1/2001 | Kasuya et al. |
| 6,634,980 | B1 | 10/2003 | Ziemer |
| 7,819,773 | B2 * | 10/2010 | Aoki et al. ............. 475/282 |
| 2003/0083173 | A1 | 5/2003 | Miyazaki et al. |
| 2004/0097324 | A1 | 5/2004 | Ziemer |
| 2004/0116238 | A1 | 6/2004 | Ziemer |
| 2004/0242367 | A1 | 12/2004 | Miyazaki et al. |
| 2007/0037657 | A1 * | 2/2007 | Thomas et al. .......... 475/284 |

FOREIGN PATENT DOCUMENTS

| EP | 1211436 | 6/2002 |
| EP | 1270997 | 1/2003 |
| JP | 06-200998 | 7/1994 |
| JP | 2000-055152 | 2/2000 |

(Continued)

*Primary Examiner* — Justin Holmes
(74) *Attorney, Agent, or Firm* — Bacon & Thomas, PLLC

(57) ABSTRACT

An output side transfer member 103 of a second clutch C-2 extends around the outer circumferences of the output side transfer members 101, 102 of the third and first clutches C-3, C-1, the output side transfer member 104 (or 13, 101) of a fourth clutch C-4 and the output side transfer member 101 of a third clutch C-3 are linked to a sun gear S2, the output side transfer member 104 (or 13, 101) of a fourth clutch C-4, an output side transfer member 101 of a third clutch C-3, and a sun gear S2, which rotate integrally, are disposed radially inward with respect to the output side transfer member 102 of the first clutch C-1. Thereby, it becomes possible to reduce the diameter of the output side transfer member 104 (or 13, 101) of the fourth clutch C-4, to reduce the weight and inertia, and to improve the controllability of the automatic transmission 1.

13 Claims, 19 Drawing Sheets

FOREIGN PATENT DOCUMENTS

| | | |
|---|---|---|
| JP | 2001-082555 | 3/2001 |
| JP | 2001-182785 | 7/2001 |
| JP | 2008-106945 | 5/2008 |
| JP | 2008-133964 | 6/2008 |

* cited by examiner

FIG.3

|  | C-1 | C-2 | C-3 | C-4 | B-1 | B-2 |
|---|---|---|---|---|---|---|
| 1st | ● |  |  |  |  | ● |
| 2nd | ● |  |  |  | ● |  |
| 3rd | ● |  | ● |  |  |  |
| 4th | ● |  |  | ● |  |  |
| 5th | ● | ● |  |  |  |  |
| 6th |  | ● |  | ● |  |  |
| 7th |  | ● | ● |  |  |  |
| 8th |  | ● |  |  | ● |  |
| Rev1 |  |  | ● |  |  | ● |
| Rev2 |  |  |  | ● |  | ● |

FIG. 10

|      | C-1 | C-2 | C-3 | C-4 | B-1 | B-2 | F-1 |
|------|-----|-----|-----|-----|-----|-----|-----|
| 1st  | ●   |     |     |     |     | (●) | ●   |
| 2nd  | ●   |     |     |     | ●   |     |     |
| 3rd  | ●   |     | ●   |     |     |     |     |
| 4th  | ●   |     |     | ●   |     |     |     |
| 5th  | ●   | ●   |     |     |     |     |     |
| 6th  |     | ●   |     | ●   |     |     |     |
| 7th  |     | ●   | ●   |     |     |     |     |
| 8th  |     | ●   |     |     | ●   |     |     |
| Rev1 |     |     | ●   |     |     | ●   |     |
| Rev2 |     |     |     | ●   |     | ●   |     |

(●) INDICATES ENGINE BRAKE OPERATION

AUTOMATIC TRANSMISSION FOR A VEHICLE

TECHNICAL FIELD

The present invention relates to an automatic transmission that is mounted in a vehicle or the like, and in particular, relates to a configuration for an automatic transmission that enables multi-speed shifting by selectively transferring input rotation and reduced speed rotation to first, second, and third rotary elements of a planetary gear unit by using first and second input transfer clutches and first and second speed reduction transfer clutches.

BACKGROUND ART

In recent years, in an automatic transmission that is mounted in a vehicle or the like, multi-speed shifting is coming to play a central role in satisfying the need to improve fuel economy and the like. Such an automatic transmission is disclosed, for example, in Japanese Patent Application Publication No. JP-A-2001-182785 (in particular, refer to FIG. 2 and TABLE 2).

The automatic transmission disclosed in JP-A-2001-182785 is provided with a speed reduction planetary gear set (G1) that receives the input rotation that is input to an input shaft (11) and reduces the speed of that rotation, first and second input transfer clutches (C4, C3) that selectively transfers the input rotation, first and second reduced speed transfer clutches (C2, C1) that selectively transfers rotation at a speed reduced through the speed reduction planetary gear set (G1), first and second brakes (B1, B2), that brake the rotation on the case (1), and a planetary gear set (G23) that has at least first, second, third, and fourth rotary elements (S2, S3, PC2 and PC3, R3). This automatic transmission inputs rotation through the first input transfer clutch (C4) to the first rotary element (S2) of the planetary gear set (G23) and the reduced speed rotation is output through the first speed reduction transfer clutch (C2) while the first rotary element (S2) is held stationary on the case (1) by the first brake (B1). The automatic transmission is structured such that reduced speed rotation can be transferred to the second rotary element (S3) by the second speed reduction transfer clutch (C1). Further, input rotation can be transferred through the second input transfer clutch (C3) to the third rotary element combination of (PC2 and PC3) and the third rotary element can be held stationary by the second brake (B2). Rotation can be output from the fourth rotary element (R2, R3). Thus, by appropriately operating these clutches (C1, C2, C3, C4) and brakes (B1, B2), the automatic transmission enables multi-speed shifting.

However, as shown in TABLE 2 of JP-A-2001-182780, while the first forward speed to the eighth forward speed can be established by suitably operating the clutches and brakes, the third rotary elements (PC2 and PC3), which receive the input rotation by engagement of the second input transfer clutch (C3), do not attain a speed that is higher than the input rotation, even if the first rotary element (S2) receives input rotation by engagement of the first input transfer clutch (C4), because, for example, in the fifth forward speed, the first input transfer clutch (C4) is released, a reduced speed rotation is input to the second rotary element (S3) by engagement of the first speed reduction transfer clutch (C1), and rotation is input to the third rotary element (PC2 and PC3) by engagement of the second input transfer clutch (C3), resulting in a high speed rotation, that is, a speed that is higher than that of the input rotation.

SUMMARY OF THE INVENTION

In the automatic transmission described above, if the clutches and brakes were to be disposed farther radially outward from the path by which input rotation, through the members (that is, the output side member of the first input transfer clutch) that link the first input transfer clutch (C4) and the first rotary element (S2), is input to the third rotary element (PC2 and PC3) via the second input transfer clutch (C3), the members which reach a speed that is higher than the input rotation, and which therefore require a higher rigidity, would be disposed radially outward of the members that do not reach a speed that is higher than that of the input rotation. However, such modification would increase centrifugal force in proportion to the increase in the diameter of these members and the thickness of the members must be increased in order to attain the necessary high rigidity, thus increasing the weight and the inertia, while reducing the controllability of the automatic transmission.

Thus, it is an object of the present invention to provide an automatic transmission for a vehicle that enables a reduction in weight and improvement in controllability by reducing the inertia.

In the description which follows, the reference numerals in parenthesis which refer to the drawing figures, are included by way of example, for convenience and for understanding of the invention, and should not be interpreted as limiting the scope of the claims.

Accordingly, the present invention (refer, for example, to FIG. 1 through FIG. 19) provides an automatic transmission (1) for a vehicle which outputs an output rotation from a fourth rotary element (R3), and which has a reduction planetary gear set (DP) that includes a stationary element (S1), which is held stationary by the case (4), an input rotary element (CR1), which receives the input rotation of the input shaft (12), and a speed reduction rotary element (R1) that outputs a reduced speed rotation at a speed less than that of the input rotation. The automatic transmission of the present invention also has: a planetary gear unit (PU) that includes first, second, third, and fourth rotary elements (S2, S3, CR2, R3) that have rotational speed relationships according to their gear relationships; a first input transfer clutch (C-4) for transfer of the input rotation to the first rotary element; a second input transfer clutch (C-2) for transfer of the input rotation to the third rotary element (CR2); a first speed reduction transfer clutch (C-3) for transfer of a reduced speed rotation through the speed reduction planetary gear set (DP) to the first rotary element (S2); a second speed reduction transfer clutch (C-1) for transfer of a reduced speed rotation through the speed reduction planetary gear set (DP) to the second rotary element (S3); a first brake (B-1) which, when engaged, locks the first rotary element (S2) against rotation; and a second brake (B-2) which, when engaged, locks the third rotary element (CR2) against rotation. The output side transfer member (103) of the second input transfer clutch (C-2) is linked to the third rotary element (CR2) through the outer circumferential side of the output side transfer members (101, 102) of the first and second speed reduction transfer clutches (C-3, C-1). The output side transfer member (104, 13 in FIG. 8 and FIG. 18, 101 in FIG. 15 and FIG. 16) and the output side transfer member (101) of the first speed reduction transfer clutch (C-3) are linked to the first rotary element (S2). The output side transfer member (104, 13 in FIG. 8 and FIG. 18; 101 in FIG. 15 and FIG. 16) and the output side transfer member (101) of the first speed reduction transfer clutch (C-3), rotate integrally and are disposed radially inward of an output side transfer member (102) of the second speed reduction transfer clutch (C-1).

In the above-described automatic transmission of the present invention, because the output side transfer member of the first input transfer clutch, which rotates faster than the output side transfer member of the second input transfer clutch, is disposed more radially inward than the output side transfer member of the second speed reduction transfer clutch which, in turn, is radially inward of the output side transfer member of the second input transfer clutch, the diameter of the output side transfer member of the first input transfer clutch can be made smaller than the diameter of the output side transfer member of the second input transfer clutch, and it is possible to reduce the weight as compared to a structure in which it is disposed on the outer circumferential side (radially outer side). In addition, in comparison to a structure in which the output side transfer member of the first input transfer clutch is disposed on the outer circumferential side, inertia is reduced and controllability of the automatic transmission is improved.

In another aspect of the present invention (refer, for example, to FIG. 1, FIGS. 5 through 7, FIG. 11 through 14, and FIG. 19), the first and second speed reduction transfer clutches (C-3, C-1) are disposed on the speed reduction planetary gear set (DP) side relative to the planetary gear unit (PU), and the output side transfer members (101, 102) of the first and second speed reduction transfer clutches (C-3, C-1) are respectively linked to the first rotary element (S2) and the second rotary element (S3). In this embodiment, the first input transfer clutch (C-4) is disposed on the side of the planetary gear unit (PU) axially opposite the speed reduction planetary gear set (DP), and the output side transfer member (104) of the first input transfer clutch (C-4) is linked to the first rotary element (S2). The second input transfer clutch (C-2) is disposed on the speed reduction planetary gear set (DP) axial side relative to the planetary gear unit (PU), and the output side transfer member (103) of the second input transfer clutch (C-2) is linked to the third rotary element (CR2) on the outer circumferential side of the output side transfer members (101, 102) of the first and second speed reduction transfer clutches (C-3, C-1).

In the preferred embodiment described immediately above, because the output side transfer member of the first input transfer clutch, which reaches a rotational speed that is higher than that of the output side transfer member of the second input transfer clutch, is on the radially inward side, the diameter of the output side transfer member of the first input transfer clutch is smaller than the diameter of the output side transfer member of the second input transfer clutch, and it is possible to reduce its weight more than in the case in which it is disposed on the radially outward side. In addition, because the inertia is reduced in comparison to a structure in which the output side transfer member of the first input transfer clutch is disposed on the outer side, it is possible to improve the controllability of the automatic transmission.

In addition, as compared to a design wherein the hydraulic servo of the first input transfer clutch is located between the planetary gear unit and the speed reduction planetary gear set, it is possible to dispose the friction plates of the first input transfer clutch more radially outward, and thus it is possible to enlarge the area of the friction plates. Therefore, it is possible to ensure transfer of a sufficient amount of torque while reducing the number of friction plates. Furthermore, by shortening the distance between the first and second speed reduction transfer clutches and the planetary gear unit, and the output side transfer members of the first and second speed reduction transfer clutches, which must be sufficiently strong to transfer a high torque, it is possible to reduce weight and to improve the controllability of the automatic transmission.

Furthermore, it is possible to supply the working oil to the hydraulic servo of the first input transfer clutch from an oil duct that is provided, for example, in a boss extending from a side wall of the case. In this manner, as compared to a case in which the working oil is supplied from an oil duct in the input shaft, it is possible to reduce the number of seal rings, to reduce the sliding resistance of the seal rings, and to improve the power transfer efficiency of the automatic transmission.

In addition, in the present invention (refer, for example, to FIG. 1, FIGS. 5 through 7, FIGS. 11 to 14, and FIG. 19), the input side transfer member (52) of the first input transfer clutch (C-4) is linked to the input shaft (12, 13) radially inward of the planetary gear unit (PU), and a portion of the input side transfer member (52) of the first input transfer clutch (C-4) forms the clutch drum (52) of the hydraulic servo (50) of the first input transfer clutch (C-4).

In contrast to transmissions in which a portion of the output side transfer member of the first input transfer clutch forms the clutch drum of a hydraulic servo, in the present invention the clutch drum of a hydraulic servo additionally functions as a power transfer member. As a result, it is possible to make the automatic transmission more axially compact.

In another embodiment of the present invention (refer, for example, to FIG. 8, FIG. 15, FIG. 16, and FIG. 18) the first and second speed reduction transfer clutches are disposed on the side of speed reduction planetary gear set (DP) relative to the planetary gear unit (PU) and the output side transfer members (101, 102) of the first and second speed reduction transfer clutches (C-3, C-1) are respectively linked to the first rotary element and the second rotary element.

The first input transfer clutch (C-4) is disposed on the side of the speed reduction planetary gear set (DP) relative to the planetary gear unit (PU) and the output side transfer member (13 in FIG. 8 and FIG. 18, 101 in FIG. 15 and FIG. 16) of the first input transfer clutch (C-4) is linked to the first rotary element (S2).

The second input transfer clutch (C-2) is disposed on the speed reduction planetary gear set (DP) relative to the planetary gear unit (PU) and the output side transfer member (103) of the second input transfer clutch (C-2) is linked to the third rotary element (CR2) radially outward of the output side transfer members (101, 102) of the first and second speed reduction transfer clutches (C-3, C-1).

Thereby, because the output side transfer member of the first input transfer clutch, which rotates faster than the output side transfer member of the second input transfer clutch, is on the radially inner side, it is possible to make the diameter of the output side transfer member of the first input transfer clutch smaller than the diameter of the output side transfer member of the second input transfer clutch, and to thus reduce the weight as compared to the case in which it is on the radially outer side. In addition, in comparison to a structure in which it is on the radially outer side, it is possible to decrease the inertia, and to thus improve the controllability of the automatic transmission.

In addition, in the present invention (refer, for example, to FIG. 8, FIG. 15, FIG. 16, and FIG. 18), the input side transfer member (52) of the first input transfer clutch (C-4) is directly linked to the input rotary element (CR1), and along with a portion of the input rotary element (CR1), forms a portion of the hydraulic servo (50) of the first input transfer clutch (C-4).

Thereby, it is possible to use portions of the members that form the input rotary element (portions of the clutch drum and the side plate of the carrier) and the hydraulic servo of the first input transfer clutch in common, and to thereby reduce the size and weight.

In addition, the present invention (refer, for example, to FIG. 1, FIG. 11, FIG. 16, and FIG. 19) may include a boss (3b) extending from the side wall (3a) of the case (4) for supporting the stationary element (S1) while holding it stationary.

The input side transfer member (32) of the second input transfer clutch (C-2) is linked to the input rotary element (CR1) and a portion of the input side transfer member (32) of the second input transfer clutch (C-2) forms the clutch drum (32) of the hydraulic servo (30) of the second input transfer clutch (C-2), and that hydraulic servo (30) is disposed around the boss (3b), between the speed reduction planetary gear set (DP) and the side wall (3a).

Supply of the working oil to the hydraulic servo of the second input transfer clutch from a duct that is provided in the boss portion, as compared to supply of working oil via an oil duct in the input shaft, allows the length of the oil duct to be shortened by an amount equivalent to the length of the oil duct in the input shaft.

As shown, for example, to FIG. 1, FIG. 11, FIG. 16 through FIG. 19, the input side transfer member (111) of the second speed reduction transfer clutch (C-1) is linked to the speed reduction rotary element(s) (R1). The output side transfer member (102) of the second speed reduction transfer clutch (C-1) is linked to the second rotary element (S3), a portion of the output side transfer member (102) of the second speed reduction transfer clutch (C-1) forms the clutch drum (22) of the hydraulic servo (20) of the second speed reduction transfer clutch (C-1), which hydraulic servo, in turn, is disposed around the boss (3b).

The above design allows supply of the working oil to the hydraulic servo of the second speed reduction transfer clutch from an oil duct that is provided in a boss. Thus, in comparison to a structure in which, for example, the hydraulic servo of the second speed reduction transfer clutch is separated from the boss and the working oil is supplied via an oil duct in the input shaft, it is possible to shorten the length of the oil duct by an amount equivalent to the length of the oil duct in the input shaft, and it is possible to improve the controllability of the automatic transmission.

An embodiment as shown, for example, in FIGS. 16 through 19 is provided with a counter gear (15) that is linked to the fourth rotary element (R3) of the planetary gear unit (PU). The counter gear (15) is disposed on the side of the planetary gear unit (PU) axially opposite the speed reduction planetary gear set (DP). The second brake (B-2) is a multi-plate brake that has a plurality of friction plates (71) and is disposed radially outward of the planetary gear unit (PU).

In comparison to a structure in which, for example, the counter gear is located between the planetary gear unit and the speed reduction planetary gear set, the above-described arrangement makes it possible to link the counter gear to the third rotary element by utilizing, as a locking force transfer member of the second brake, the output side transfer member of the second input transfer clutch. In comparison to a structure in which a band brake is located around the output side transfer member of the second input transfer clutch, it is possible to locate the multi-plate brake around the outer circumference of the planetary gear unit, to reduce size, and to utilize a multiple-plate brake.

An embodiment as shown, for example, in FIGS. 5 through 8, FIGS. 12 through 15 has a counter gear (15) that is linked to the fourth rotary element (R3) and is axially positioned between the planetary gear unit (PU) and the speed reduction planetary gear set (DP).

A support member (120a) extending radially inward from the wall (120) of the case (4) supports the counter gear (15). The input side transfer member (112) of the second input transfer clutch (C-2) axially extends radially outward of the first and second speed reduction transfer clutches (C-3, C-1) to where it links with the first speed reduction transfer clutch (C-3). A portion of the output side transfer member (103) of the second input transfer clutch (C-2) forms the clutch drum (32) of the hydraulic servo (30) of the second input transfer clutch (C-2), which hydraulic servo (30) is disposed around the support member (120a) and axially intermediate the speed reduction planetary gear set (DP) and the counter gear (15).

In this latter type embodiment, it is possible to supply the working oil to the hydraulic servo of the second input transfer clutch from an oil duct that is provided in the support member. Thus, in comparison to a structure in which, for example, the working oil is supplied from an oil duct in the input shaft, it is possible to reduce the number of seal rings, to reduce the sliding resistance of the seal rings, and to improve the power transfer efficiency of the automatic transmission.

In an embodiment as shown, for example, in FIG. 7, FIG. 8, FIG. 14, and FIG. 15 a boss (3b) that extends from the side wall (3a) of the case (4) supports the stationary element (S1). The input side transfer member (42) of the first speed reduction transfer clutch (C-3) is linked to the speed reduction rotary element (R1). A portion of the input side transfer member (42) of the first speed reduction transfer clutch (C-3) forms the clutch drum (42) of the hydraulic servo (40) of the first speed reduction transfer clutch (C-3), and the hydraulic servo (40) is arranged around the boss (3b) and is positioned axially between the speed reduction planetary gear set (DP) and the side wall of the case. The input side transfer member (22) of the second speed reduction transfer clutch (C-1) is linked to the input side transfer member (42) of the first speed reduction transfer clutch (C-3) and a portion of the input side transfer member (22) of the second speed reduction transfer clutch (C-1) forms the clutch drum (22) of the hydraulic servo (20) of the second speed reduction transfer clutch (C-1), which hydraulic servo (20) is disposed on support member (120a) and is axially positioned between the speed reduction planetary gear set (DP) and the hydraulic servo (30) of the second input transfer clutch (C-2).

Accordingly, in the above embodiment also, it is possible to supply the working oil to the hydraulic servo of the first speed reduction transfer clutch from an oil duct in the boss extending to the side wall of the case. Thus, in comparison to a structure in which, for example, the hydraulic servo of the first speed reduction transfer clutch is disposed around the input shaft, separated from the boss, with the working oil supplied via an oil duct in the input shaft, it is possible to shorten the length of the oil duct by an amount equivalent to the length of the oil duct in the input shaft, and to thereby improve the controllability of the automatic transmission. In addition, it is possible to supply the working oil to the hydraulic servo of the second speed reduction transfer clutch from an oil duct that extends through a wall of the case and a support wall extending from the case wall. Thus, as compared, for example, with prior art wherein the working oil is supplied from an oil duct in the input shaft, it is possible to reduce the number of seal rings, to reduce the sliding resistance of the seal rings, and to improve the power transfer efficiency of the automatic transmission.

In an embodiment shown, for example, in FIG. 6 and FIG. 13, the output side transfer member (102) of the second speed reduction transfer clutch (C-1) is linked to the second rotary element (S3), a portion of the output side transfer member (102) of the second speed reduction transfer clutch (C-1) forms the clutch drum (22) of the hydraulic servo (20) of the second speed reduction transfer clutch (C-1), and the hydraulic servo (20) is disposed around the support member (120a) and axially positioned between the speed reduction planetary gear set (DP) and the hydraulic servo (30) of the second speed reduction transfer clutch (C-2).

The output side transfer member (101) of the first speed reduction transfer clutch (C-3) is linked to the first rotary element (S2). A portion of an output side transfer member (101) of the first speed reduction transfer clutch (C-3) forms the clutch drum (42) of its hydraulic servo (40) which is axially positioned between the speed reduction planetary gear set (DP) and the hydraulic servo (20) of the second speed reduction transfer clutch (C-1).

Thus, in the latter type embodiment, it is also possible to supply the working oil to the hydraulic servo of the second speed reduction transfer clutch from an oil duct that is provided in a wall that extends from the case and through the support member. In addition, because the hydraulic servo of the first speed reduction transfer clutch is axially positioned between the planetary gear unit and the speed reduction planetary gear set, in comparison to a structure in which, for example, the hydraulic servo of the first speed reduction transfer clutch is disposed on the side of the speed reduction planetary gear set that is axially opposite the planetary gear unit, it is possible to shorten the distance between the first speed reduction transfer clutch and the planetary gear unit and to shorten the output side transfer member of the first speed reduction transfer clutch, which must be strong in order to transfer a high torque. It is thereby possible to reduce the weight, and to improve the controllability of the automatic transmission.

In addition, the present invention (refer, for example, to FIG. 1 through FIG. 19) is provided with a second shaft (81) that is disposed parallel to the input shaft (12) and is linked via the counter gear (15) which is linked to the fourth rotary element (R3). The output rotation from the fourth rotary element (R3) is transferred to the second shaft (81) via the counter gear (15).

With the above design the automatic transmission may be advantageously used in an FF-type vehicle.

In addition, in the present invention (refer, for example, to FIG. 1 through FIG. 15), the counter gear (15) is disposed axially between the planetary gear unit (PU) and the speed reduction planetary gear set (DP) and is supported by a support member (120a) that extends from wall (120) of the case (4).

Thereby, it is possible to position the counter gear axially closer to the input side. Thus, it is possible, for example, to position the second shaft and the like closer to the input side (the torque converter side), and thereby make the automatic transmission more compact. As a result, it is also possible to prevent interference, for example, between the automatic transmission and the frame of the vehicle, whereby mounting of the automatic transmission is facilitated.

In addition, in the present invention (refer, for example, to FIG. 16 through FIG. 19), the counter gear (15) is disposed on the side of the planetary gear unit (PU) axially opposite the speed reduction planetary gear set (DP), and is supported by the support member (120a).

Thus, it is possible to shorten the distance between the speed reduction planetary gear set (DP) and the planetary gear unit (PU), and thereby shorten the output side member of the first and second speed reduction transfer clutches, which must be particularly strong in order to transfer a high torque. Thus, it is possible to reduce the weight and improve the controllability of the automatic transmission.

In addition, in the present invention (refer, for example, to FIG. 1 through FIG. 19), the input side transfer member (CR1) is linked to the input shaft (12) on the planetary gear unit (PU) side of the speed reduction planetary gear set (DP), and (CR1) is also linked to the input side transfer member (32 and 112) of the second input transfer clutch (C-2) on the side of the speed reduction planetary gear set (DP) axially opposite the planetary gear unit (PU).

Thus, it is possible to link the input rotary element and the input side transfer member of the second input transfer clutch with the input shaft without a complicated design, and to make the automatic transmission more compact.

In addition, in the present invention (refer, for example, to FIG. 1 through FIG. 19), the force transfer members (116, 104) of the first brake (B-1) are connected to the first rotary element (S2) on the side of the planetary gear unit (PU) axially opposite the speed reduction planetary gear set (DP).

Thus, it is possible to simplify the linkage of locking force transfer member of the first brake to the first rotary element and to make the automatic transmission more compact.

In addition, in the present invention (refer, for example, to FIG. 1 through FIG. 9), the stationary element of the speed reduction planetary gear set (DP) includes a first sun gear (S1) and the input rotary element of the speed reduction planetary gear set (DP) includes a first carrier (CR1) that rotatably supports a first pinion gear (P1) in mesh with the first sun gear (S1) and a second pinion gear in mesh with the first pinion gear (P1), and is linked to the input shaft (12). The reduced speed rotary element of the speed reduction planetary gear set (DP) includes a first ring gear (R1) which meshes with the second pinion gear (P2) and which outputs the reduced speed rotation.

Thereby, it is possible to output rotation at a reduced speed, relative to that of the input shaft, from the first ring gear.

The planetary gear unit (PU) may be a Ravigneaux-type planetary gear set that includes a second sun gear (S2), a third sun gear (S3), a third pinion gear (P3) that meshes with the third sun gear (S3), a fourth pinion gear (P4) that meshes with the second sun gear (S2) and meshes with the third pinion gear (P3), a second carrier (CR2) that rotatably supports the third pinion gear (P3) and the fourth pinion gear (P4), and a second ring gear (R3) that meshes with the fourth pinion gear (P4), further comprising:

the first rotary element includes the second sun gear (S2);
the second rotary element includes the third sun gear (S3);
the third rotary element includes the second carrier (CR2); and
the fourth rotary element includes the second ring gear (R3).

Thereby, is it possible to reduce the rotational speeds of each of the rotary elements and to obtain advantageous gear ratios while providing simplified linkages between the rotary elements of the planetary gear unit and the output side members of the clutches.

In the present invention, a first forward speed is established by engaging the second speed reduction transfer clutch (C-1) and locking the second brake (B-2). Second forward speed is established by engaging the second speed reduction transfer clutch (C-1) and locking the first brake (B-1). Third forward speed is established by engaging the second speed reduction transfer clutch (C-1) and the first speed reduction transfer clutch (C-3). Fourth forward speed is established by engaging the second speed reduction transfer clutch (C-1) and the first input transfer clutch (C-4). Fifth forward speed is established by engaging the second speed reduction transfer clutch (C-1)

and the second input transfer clutch (C-2). Sixth forward speed is established by engaging the second input transfer clutch (C-2) and the first input transfer clutch (C-4). Seventh forward speed is established by engaging the second input transfer clutch (C-2) and the first speed reduction transfer clutch (C-3). Eighth forward speed is established by engaging the second input transfer clutch (C-2) and locking the first brake (B-1). Reverse speeds are established by engaging the first speed reduction transfer clutch (C-3) or the first input transfer clutch (C-4), and locking the second brake (B-2).

Thus, the automatic transmission of the present invention can establish eight forward speeds in addition to reverse speeds.

Further, in the present invention (refer, for example, to FIG. 14), the rotational speed relationships are based on the gear relationships of the first, second, third, and fourth rotary elements (S2, S3, CR3, and R3), and in a velocity diagram in which the respective speeds of the first, second, third, and fourth rotary elements (S2, S3, CR3, R3) of the planetary gear unit (PU) are shown on the ordinate, and the corresponding gear ratios of the first, second, third, and fourth rotary elements (S2, S3, CR3, R3) are shown in the abscissa, the first rotary element (S2) is positioned to the farthest left side and the third rotary element (CR2), the fourth rotary element (R3), and the second rotary element (S3) are arranged in sequence to the right thereof.

BRIEF DESCRIPTION OF THE DRAWINGS

FIG. 3 is a table of operations of the clutches and brakes in the automatic transmission $1_1$.

FIG. 10 is table of operations of the automatic transmission $1_5$ according to a fifth embodiment.

BEST MODES FOR CARRYING OUT THE INVENTION

First Embodiment

Figure 1:
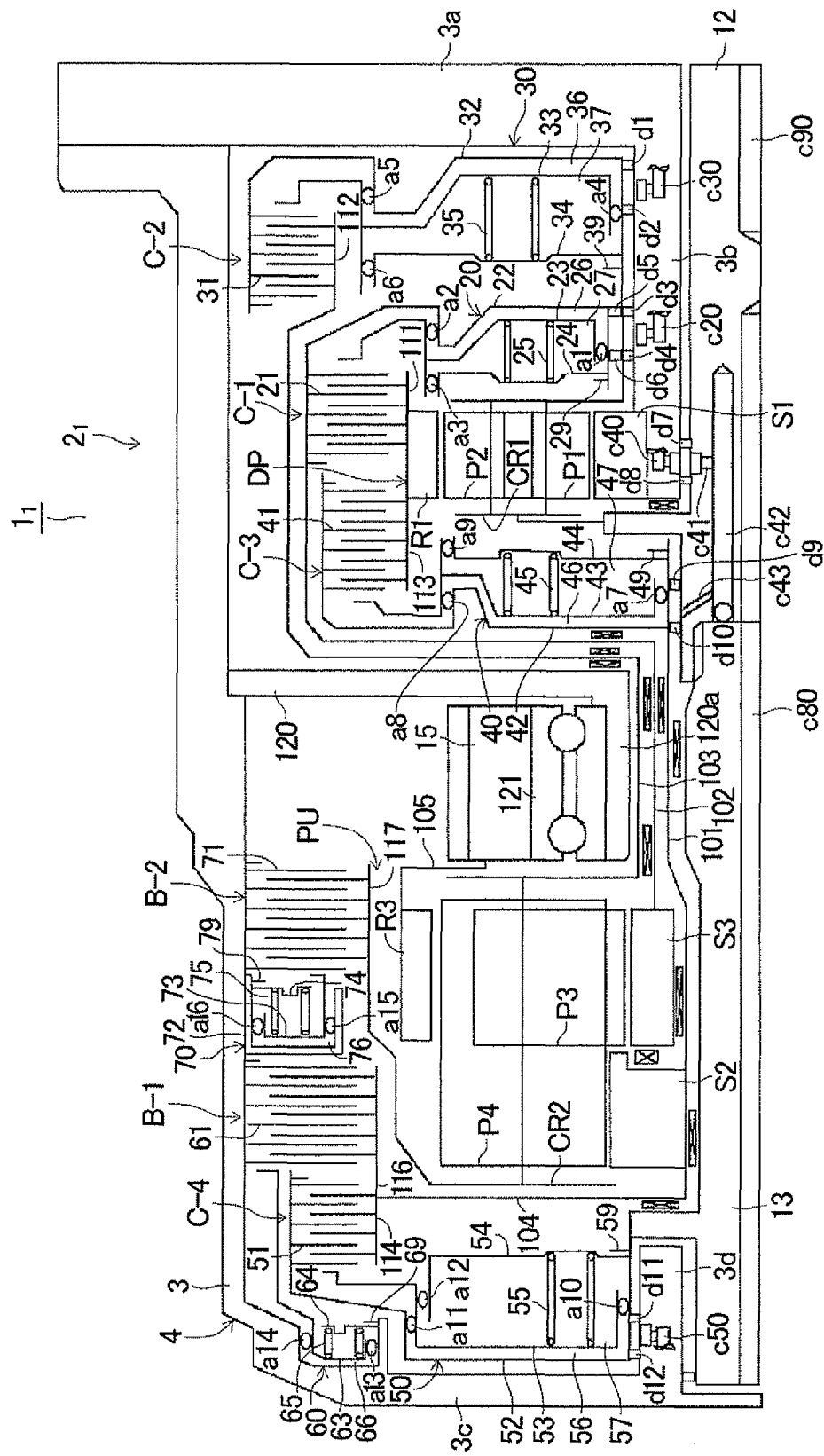
FIG. 1 is a cross-sectional view of the automatic transmission $1_1$ according to a first embodiment.

Below, a first embodiment of the present invention will be explained with reference to FIG. 1 to FIG. 4.

In the following explanation, up, down, left, and right in FIG. 1 and FIG. 2 correspond in sequence to "up", "down", "left", and "right" in an actual automatic transmission 1. In addition, the back portion of the input shaft 12 and the front portion of the intermediate shaft 13 are spline engaged so that the input shaft 12 and the intermediate shaft 13 integrally form an input shaft in a broad sense. The input shaft 12 and the intermediate shaft 13 will be described in detail below. In addition, the direction lengthwise of the input shaft is referred to as "axial" and the direction perpendicular to this axial direction is referred to as the "radial direction". Furthermore, for positions in the radial direction, the side near the shaft is referred to as the radially inner side ("inner circumferential side") and the side toward the outer periphery is referred to as the "radially outer side" (the "outer circumferential side"). Furthermore, in the rotation transfer path from the input shaft to the counter gear, for each clutch, the member on the input shaft side (that is, upstream in the transfer path) of the friction plates is referred to an "input side transfer member" of the clutch, and the member on the counter gear side (that is, downstream in the transfer path) is referred to as an "output side transfer member".

First, the structure of the automatic transmission $1_1$, as mounted, in an FF-type (front drive, front engine) vehicle, will be explained with reference to FIG. 2. As shown in FIG. 1 and FIG. 2, the automatic transmission $1_1$ includes a transmission case 3 connected to a case 4 that encloses a torque converter 7. The transmission case 3, as shown in FIG. 2, houses a speed change mechanism 2, a counter shaft portion 80, and a differential portion 90. The speed change mechanism 2 is, for example, on a central axis defined by the input shaft 12 of the speed change mechanism and the intermediate shaft 13 of the speed change mechanism, which are axially aligned with the shaft 111 of the automatic transmission $1_1$ that is connected to the output shaft of the engine. The counter shaft 81 of the counter shaft portion 80 is disposed on an axis that is parallel to the central axis defined by the shaft 12 and the intermediate shaft 13, and differential portion 90 has left and right vehicle axles 93l and 93r aligned on an axis that is parallel to the counter shaft 81. The input axis 12, the intermediate axis 13, the counter shaft 81, and the left and right vehicle axles 93l and 93r have a helical positional relationship when viewed from the end side.

Note that for an automatic transmission mounted in an FF-type vehicle, which will be explained below, the left-right direction in the figures is also the actual left-right direction in the vehicle, and depending on the direction in which the automatic transmission $1_1$ is mounted, the right side of the figure may actually be the left side of the vehicle and the left side in the figure may actually be the right side of the vehicle, but in the following description, "right side" and "left side" simply refer to the "right side" and the "left side" in the figures.

Figure 2:
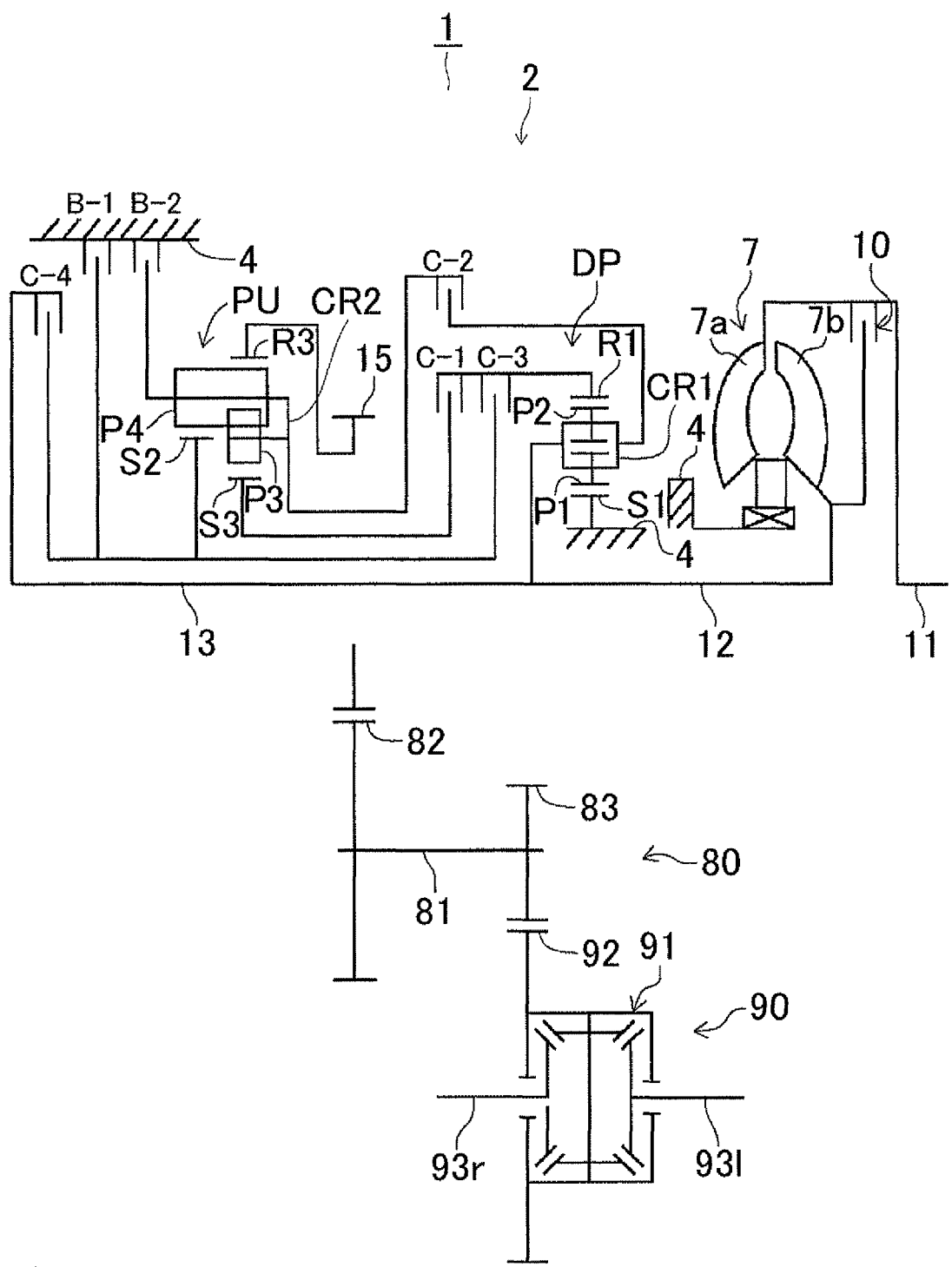
FIG. 2 is a skeletal view of the automatic transmission $1_1$.

As shown in FIG. 2, the torque converter 7 includes a pump impeller 7a that is connected to the input shaft 11 of the automatic transmission $1_1$ and a turbine runner 7a to which the rotation of the pump impeller 7a is transferred via a working liquid. A turbine runner 7b is connected to an input shaft 12 of the speed change mechanism 2, which is axially aligned with the input shaft 11. The torque converter 7 is provided with a lock up clutch 10 and, when the lock up clutch 10 is engaged under control of a hydraulic control apparatus (not illustrated), the rotation of the input shaft 11 of the automatic transmission 1₁ is directly transferred to the input shaft 12 of the speed change mechanism 2.

The speed change mechanism 2 is provided with a planetary gear set (speed reduction planetary gear set) DP and a planetary gear unit PU arranged around the input shaft 12 (and the intermediate shaft 13). The planetary gear set DP includes a sun gear ("stationary element"; or "first sun gear") S1, a carrier (input rotary element; first carrier) CR1, and a ring gear ("reduced speed rotary element"; or "first ring gear") R1, and the carrier CR1 supporting a pinion ("first pinion gear") P1 that meshes with the sun gear S1 and a pinion ("second pinion gear") P2 that meshes with the ring gear R1. The pinions P1 and P2 are also in mesh with each other in what is commonly termed a "double pinion planetary gear set".

The planetary gear unit PU includes the following four rotary elements: a sun gear S2 (first rotary element; second sun gear); a sun gear S3 (second rotary element; third sun gear); a carrier CR2 (CR3) (third rotary element; second carrier); and a ring gear R3 (R2) (fourth rotary element; second ring gear). The carrier CR2 supports a long pinion (fourth pinion gear) P4 that meshes with the sun gear S2 and the ring gear R3 and a short pinion (third pinion gear) P3 that meshes with a sun gear S3 and with long pinion P4 to form what is termed a Ravigneaux-type planetary gear set.

The sun gear S1 of the planetary gear set DP is connected to the transmission case 3 (in a wider sense, the case 4) and thereby held against rotation. The carrier CR1 is connected to the input shaft 12 and rotates integrally with the input shaft 12 (hereinafter referred to as the "input rotation"), and at the same time, is connected to the second clutch C-2 (the second input transfer clutch). The ring gear R1 rotates at a speed reduced by the stationary sun gear S1 and the carrier CR1, and is connected to the first clutch C-1 (the "second speed reduction transfer clutch") and a third clutch C-3 (the "first speed reduction transfer clutch").

The sun gear S2 of the planetary gear unit PU is locked by engagement of the first brake B-1 to the transmission case 3. Further, the sun gear S2 is connected to a fourth clutch C-4 ("first input transfer clutch") and the third clutch C-3, to which the rotation of the input shaft 12 is input, via the intermediate shaft 13. The rotation of the input shaft 12 is selectively input via the fourth clutch C-4 and the reduced speed rotation of the ring gear R1 is selectively input via the third clutch C-3. The sun gear S3, by engagement of the first clutch C-1, receives the reduced speed rotation of the ring gear R1.

The carrier CR2 receives the input rotation via the second clutch C-2. In addition, the carrier CR2 is connected to the second brake B-2, and the rotation is selectively locked (held against rotation) by the second brake B-2. In addition, the ring gear R3 is connected to the counter gear 15 whereby they rotate in unison.

The large diameter gear 82, which meshes with the counter gear 15, is disposed on the left end of the counter shaft 81 and a small diameter gear 83 is disposed on the right end. A differential ring gear 92 of the differential gear apparatus 91 meshes with the small diameter gear 83. Thus, the rotation of the counter gear 15 is transferred to the differential ring gear 92 of the differential gear apparatus 91 via the large diameter gear 82, the counter shaft 81, and the small diameter gear 83.

The rotation of the differential ring gear 92 is transferred to the right and left vehicle axles 93l and 93r, while a difference in the rotational speeds of the right and left vehicle axles 93l and 93r is permitted by the differential gear apparatus 91.

Figure 4:
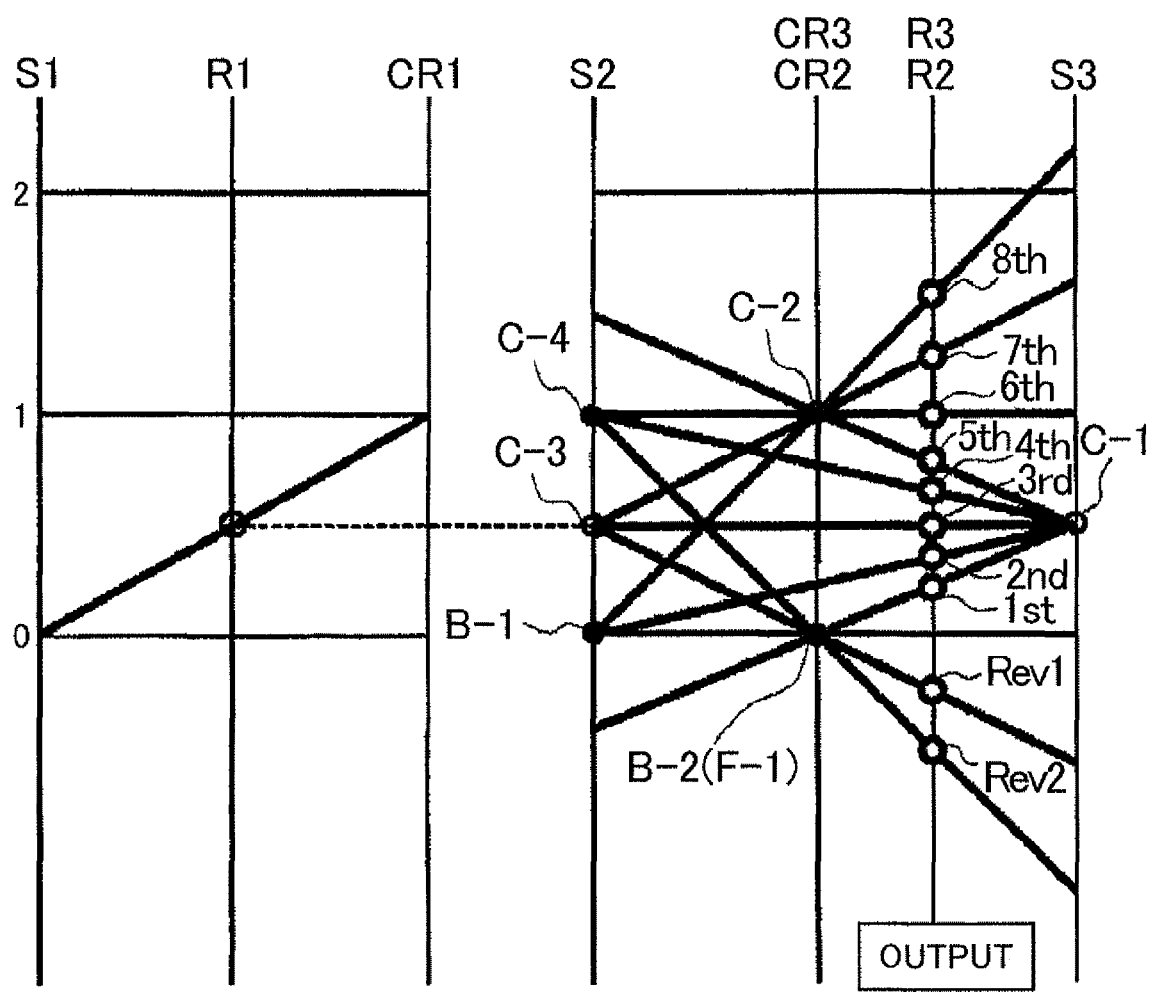
FIG. 4 is a velocity diagram for the automatic transmission $1_1$.

The operation of the speed change mechanism 2 described above will now be explained with reference to FIG. 2, FIG. 3, and FIG. 4. Note that in the velocity diagram shown in FIG. 4, the ordinate represents the speed of the respective rotary elements (each gear) and the abscissa represents the corresponding gear ratios of these rotary elements. In addition, in the portion of the velocity diagram for the planetary gear set DP, the ordinate at the left side in FIG. 4 corresponds to the sun gear S1 and, the other elements on the ordinate, in sequence toward the right in the figure, represent the ring gear R1 and the carrier CR1. Furthermore, in the portion of the velocity diagram for the planetary gear unit PU, the ordinate to the farthest right side in FIG. 4 corresponds to the sun gear S3, and the other elements on the ordinate, in sequence toward the left side in the figure correspond to the ring gear R3 (R2), the carrier CR2 (CR3), and the sun gear S2, respectively.

For example, in the D (drive) range, in the first forward speed (1st), as shown in FIG. 3, the first clutch C-1 and the second brake B-2 are engaged. Thus, as shown in FIG. 2 and FIG. 4, the rotation of the ring gear R1, which receives the reduced speed rotation of the sun gear S1, which is stationary, and the carrier CR1, which provides the input rotation, is input to the sun gear S3 via the first clutch C-1. The carrier CR2 is held against rotation by engagement of the second brake B-2. Thereby, the reduced speed rotation input to the sun gear S3 is output to the ring gear R3 via the stationary carrier CR2, and from the ring gear R3 to the counter gear 15 as the first forward speed.

In the second forward speed (2nd), as shown in FIG. 3, the first clutch C-1 is engaged and the first brake B-1 is locked. Thus, as shown in FIG. 2 and FIG. 4, the rotation of the ring carrier R1, at a speed as reduced by the stationary sun gear S1, and the carrier CR1 (which provides the input rotation), is input to the sun gear S3 via the first clutch C-1. The sun gear S2 is held stationary (without rotation) by the locking of the first brake B-1, whereby, the carrier CR2 rotates at a speed that is slower than that of the sun gear S3. The reduced speed rotation that is input to the sun gear S3 is then output to the ring gear R3 via the carrier CR2, and the rotation of ring gear 3 is output from the counter gear 15 as the second forward speed.

In the third forward gear (3rd), as shown in FIG. 3, the first clutch C-1 and the third clutch C-3 are engaged. Thus, as shown in FIG. 2 and FIG. 4, the reduced speed rotation of the ring gear R1 is transferred to the sun gear S3 via the first clutch C-1. In addition, the reduced speed rotation of the ring gear R1 may be input to the sun gear S2 by engagement of the third clutch C-3. Because the reduced speed rotation of the ring gear R1 is input to the sun gear S2 and the sun gear S3, the planetary gear unit PU becomes directly linked, the reduced speed rotation is output directly to the ring gear R3, and is output from the counter gear 15 as the third forward speed.

In the fourth forward speed (4th), as shown in FIG. 3, the first clutch C-1 and the fourth clutch C-4 are engaged. Thus, as shown in FIG. 2 and FIG. 4, the reduced speed rotation of the ring gear R1 is input to the sun gear S3 via the first clutch C-1. The input rotation of the carrier CR1 is input to the sun gear S2 by engagement with the fourth clutch C-4. Thus, the carrier CR2 acquires a reduced speed rotation that is a higher speed than that of the sun gear S3, the reduced speed rotation received by the sun gear S3 is then output to the ring gear R3 via the carrier CR2, and from the ring gear R3 to the counter gear 15 where it is output as the fourth forward speed.

In the fifth forward speed (5th), as shown in FIG. 3, the first clutch C-1 and the second clutch C-2 are engaged. Thus, as shown in FIG. 2 and FIG. 4, the reduced speed rotation of the ring gear R1 is input to the sun gear S3 via the first clutch C-1. In addition, the input rotation is input to the carrier CR2 by engagement of the second clutch C-2. Thus, a reduced speed rotation, which is at a higher speed than that of the fourth forward speed described above, is output into the ring gear R3. Thus, due to the reduced speed rotation of the sun gear S3 and the input rotation input to the carrier CR2, the output from the counter gear 15 is the fifth forward speed.

In the sixth forward speed (6th), as shown in FIG. 3, the second clutch C-2 and the fourth clutch C-4 are engaged. Thus, as shown in FIG. 2 and FIG. 4, the input rotation of the carrier CR1 is input to the sun gear S2 by engagement of the fourth clutch C-4. In addition, the input rotation is input to the carrier CR2 by engagement of the second clutch C-2. That is, because the input rotation is input to the sun gear S2 and to the carrier CR2, the planetary gear unit PU is directly coupled, the input rotation is output directly to the ring gear R3, and the output from the counter gear 15 is the sixth forward speed.

In the seventh forward speed (7th), as shown in FIG. 3, the second clutch C-2 and the third clutch C-3 are engaged. Thus, as shown in FIG. 2 and FIG. 4, the rotation of the ring gear R1 is input to the sun gear S2 via the third clutch C-3. In addition, the input rotation is input to the carrier CR2 by engagement of the second clutch C-2. Thus, rotation at an increased speed that is slightly higher than that of the input rotation is output to the ring gear R3, due to the combination of reduced speed rotation that is input to the sun gear S2 and the input rotation that is input to the carrier CR2, and the rotation of ring gear R3 is output from the counter gear 15 as the seventh forward speed.

In the eighth forward speed (8th), as shown in FIG. 3, the second clutch C-2 is engaged, and the first brake B-1 is locked. Thus, as shown in FIG. 2 and FIG. 4, the input rotation is received by the carrier CR2 due to the engagement of the second clutch C-2. In addition, the sun gear S2 is held rotationless by the locking of the first brake B-1. Thus, the input rotation of the carrier CR2 becomes rotation at an increased speed that is higher than the seventh forward speed and that is output to the ring gear R3, and, in turn, is output from the counter gear 15 as the eighth forward speed.

In the first reverse speed (Rev1), as shown in FIG. 3, the third clutch C-3 is engaged, and the second brake B-2 is locked. Thus, as shown in FIG. 2 and FIG. 4, the rotation of the ring gear R1 is input to the sun gear S2 via the third clutch C-3. In addition, the carrier CR2 is held stationary (without rotation) by the locking of the second brake B-2. Thus, the reduced speed rotation that is input to the sun gear S2 is output to the ring gear R3 via the carrier CR2, which is stationary, and the reverse rotation is output from the counter gear 15 as the first reverse speed.

In the second reverse speed (Rev2), as shown in FIG. 3, the fourth clutch C-4 is engaged, and the second brake B-2 is locked. Thus, as shown in FIG. 2 and FIG. 4, the input rotation of the carrier CR1 due to the engagement of the clutch C-4 is input to the sun gear S2. In addition, the carrier CR2 is held stationary (without rotation) by the locking of the second brake B-2. Thus, the input rotation that is input to the sun gear S2 is output to the ring gear R3 via the carrier CR2, which is stationary, and the reverse rotation is output from the counter gear 15 as the second reverse speed.

In the P (parking) range and the N (neutral) range, the first clutch C-1, the second clutch C-2, the third clutch C-3, and the fourth clutch C-4 are released. Thereby, the carrier CR1 and the sun gear S2 are disengaged. In addition, the ring gear R1, the sun gear S2, and the sun gear S3 are disengaged and the planetary gear set DP and the planetary gear unit PU are thereby disengaged. Additionally, the input shaft 12 (intermediate shaft 13) and the carrier CR2 are disengaged. Therefore, there is no transfer of the driving force from the input shaft 12 to the planetary gear unit PU, i.e. no transfer of driving force from the input shaft 12 to the counter gear 15.

Next, the overall configuration of the automatic transmission $1_1$ according to a first embodiment, and in particular, the relative position relationships between the essential components, will be briefly explained with reference to FIG. 1.

Note that in the following explanation, the words clutch (first through fourth clutches C-1 to C-4) and brake (first brake B-1, second brake B-2) are used in a sense that includes both the friction plates (outer friction plates and inner friction plates) and the hydraulic servos that engage/disengage them.

As shown in FIG. 1, the automatic transmission $1_1$ includes a speed change mechanism $2_1$ housed within the transmission case 3. Inside the transmission case 3, the planetary gear unit PU is disposed around the intermediate shaft 13. On the right side (input side) of the planetary gear unit PU, in an axial sequence from the right, are the second clutch C-2, the first clutch C-1, the planetary gear set DP, the third clutch C-3, and the counter gear 15. On the left side of the planetary gear unit PU, disposed in an axial sequence, are the fourth clutch C-4 and the first brake B-1. The second brake B-2 is located radially outward of the planetary gear unit PU.

Within the transmission case 3, to the right of the counter gear 15, in sequence from the right end, are the friction plates 31 of the second clutch C-2, the friction plates 21 of the first clutch C-1, and the friction plates 41 of the third clutch C-3, all arranged around the input shaft 12, relatively near the outer wall of the transmission case 3.

A partition wall member 3a that separates the transmission case 3 from the housing (case) is attached as a portion of the case 4. The hydraulic servo 30 of second clutch C-2 is mounted on a boss 3b (the boss 3b and the partition wall member 3a need not be integrally formed) that extends from partition wall member 3a. Furthermore, the hydraulic servo 20 of the first clutch C-1 is disposed on the left side of the hydraulic servo 30, the planetary gear set DP is disposed radially inward of the friction plates 21, and the hydraulic servo 40 of the third clutch C-3 is disposed substantially radially inward of the friction plates 41. That is, arranged in a sequence from the right side of the transmission case 3, are the hydraulic servo 30, the hydraulic servo 20, the planetary gear set DP, and the hydraulic servo 40 is disposed on the input shaft 12 adjacent the planetary gear set DP.

A flange-shaped support wall (center support member) 120 extends radially inward from the inner circumferential surface of the transmission case 3, on the left side of the hydraulic servo 40 of the third clutch C-3. Fixed to the radially inner end of the support wall 120 is an axially extending sleeve-shaped support member 120a. The counter gear 15, which is connected to the ring gear R3 of the planetary gear unit PU, is rotatable mounted on the support member 120a via the ball bearing assembly 121.

The planetary gear unit PU is disposed on the intermediate shaft 13 on the left side of the transmission case 3 in the figure, that is, on the left side of the counter gear 15. The friction plates 71 of the second brake B-2 and the hydraulic servo 70 of the second brake B-2 are disposed radially outward, on the right side of the planetary gear unit PU, and the friction plates 61 of the first brake B-1 are disposed radially outward on the left side of the planetary gear unit PU. The friction plates 51 of the fourth clutch C-4 are disposed on the left side of the friction plates 61, and the hydraulic servo 60 of the first brake B-1 is disposed on the left side of the friction plates 51. The hydraulic servo 50 of the fourth clutch C-4 located radially inward of the hydraulic servo 60.

As explained above, the hydraulic servo 30 of the second clutch C-2 and the hydraulic servo 20 of the first clutch C-1 are located on the side of the planetary gear set DP that is axially opposite the planetary gear unit PU, the hydraulic servo 40 of the third clutch C-3 and the counter gear 15 are located axially intermediate the planetary gear set DP and the planetary gear unit PU. The hydraulic servo 50 of the fourth clutch C-4 and the hydraulic servo 60 of the first brake B-1 are disposed on the side of the planetary gear unit PU that is axially opposite the planetary gear set DP.

Next, the structure inside the transmission case 3 will be explained in detail with reference to FIG. 1 and the structure of each of the oil ducts will be explained together thereafter.

The planetary gear set DP includes a sun gear S1, a carrier CR1, and a ring gear R1. The sun gear S1 is mounted on the boss 3b and thereby fixed so as to be rotationless. The carrier CR1 includes left and right carrier plates which rotatably support the pinions P1 and P2 therebetween. These pinions P1 and P2 mesh with each other, while the former pinion P1 also meshes with the sun gear S1 and the latter pinion P2 also meshes with the ring gear R1. The left side carrier plate is connected to the input shaft 12 and the right side carrier plate is connected to the clutch drum 32 that is spline engaged with the outer friction plates among the friction plates 31 of the second clutch C-2. The inner friction plates among the friction plates 21 of the first clutch C-1 are spline engaged to the outer circumferential surface of the ring gear R1. In addition, a hub member 113 is linked to the left side of the ring gear R1, and the inner friction plates among the friction plates 41 of the third clutch C-3 are spline engaged to this hub member 113.

The first clutch C-1 is disposed on the boss 3b via the radially inner portion of the clutch drum 32 of the second clutch C-2, on the right side of the planetary gear set DP. The first clutch C-1 is provided with friction plates 21 and a hydraulic servo 20 that engages/disengages friction plates 21. This hydraulic servo 20 includes a clutch drum 22, a piston member 23, a cancel plate 24, the oil chamber 26, the cancel oil chamber 27, and a return spring 25, The radially inner portion of the clutch drum 22 is disposed around the outer circumference of the radially inner portion of the clutch drum 32 of the second clutch C-2, and the outer friction plates of the friction plates 21 are spline engaged to the inner circumferential surface of the radially outer portion of the clutch drum 22. The distal end of the radially outer portion of the clutch drum 72 is connected to the transfer member 102, that links to the sun gear S3 of the planetary gear unit PU, through the radially inner side of the counter gear 15. The inner friction plates among the friction plates 21 are spline engaged to the outer circumferential surface of the ring gear R1 and the hub member 111 that extends from the ring gear R1. The piston member 23 is axially movable relative to the clutch drum 22, and an oil-tight oil chamber 26 is formed within the clutch drum 22 by the seal rings a1 and a2. The cancel plate 24 is prevented from moving toward the left by a snap ring 29 that is fit on the clutch drum 22. A return spring 25 is compressed between the cancel plate 24 and the piston 23 disposed at the right side thereof, and an oil-tight cancel oil chamber 27 is formed by the sealing rings a1 and a3.

The second clutch C-2 is disposed on the right side of the first clutch C-1 as described above, and radially outward of the boss 3b. The second clutch C-2 is provided with friction plates 31 and a hydraulic servo 30 engaging/disengaging the friction plates 31. This hydraulic servo 30 includes a clutch drum 32, a piston member 33, a cancel plate 34, the oil chamber 36, the cancel oil chamber 37, and a return spring 35. The left side end portion of the radially inner portion of the clutch drum 32 is linked to the carrier CR1 of the planetary gear set DP. The hydraulic servo 20 of the first clutch C-1 is disposed around the outer circumference of the left side of the clutch drum 32, and the hydraulic servo 30 is formed on the right side of the clutch drum 32. The outer friction plates 31 are splined to the inner circumferential surface on the radially outer portion of the clutch drum 22, and the inner friction plates 31 are splined to the hub 112. This hub 112 extends around the outer circumference of the first clutch C-1, the planetary gear set DP, and the third clutch C-3 and then extends to the inner circumferential side of the counter gear 15 where it connects with the transfer member 103 that is linked to the right side plate (that is, the planetary gear set DP side) of the carrier CR2 of the planetary gear unit PU. The piston member 33 is mounted for axial movement within the clutch drum 32, and an oil-tight oil chamber 36 is formed within the clutch drum 32 by the seal rings a4 and a5. The cancel plate 34 is limited in its movement toward the left by a snap ring 39 that is fit on the clutch drum 32. A return spring 35 is compressed between the cancel plate 34 and the piston member 33 that is disposed on the right side of the cancel plate 34, and an oil-tight cancel oil chamber 37 is formed by the seal rings a4 and a6.

Note that because the clutch drum 32 of this second clutch C-2 is connected to the input shaft 12 via the carrier CR1, that is, is rotated with the same input rotation of the input shaft 12, it is possible to locate an input rotation speed sensor on the outer circumferential side of the clutch drum 32. Thus, in comparison to mounting the input rotation speed sensor so as to directly measure the rotational speed of the input shaft 12 mounting of the input rotation speed sensor is easier.

The third clutch C-3 is on the left side of the planetary gear set DP, around the input shaft 12. The third clutch C-3 is provided with friction plates 41 and a hydraulic servo 40 that engages/disengages friction plates 41. The inner friction plates 41 are spline engaged to the outer circumferential surface of the hub member 113 that is linked to the ring gear R1. The outer friction plates 41 are spline engaged to the inner circumferential surface of the clutch drum 42 which extends through the inner circumferential side of the counter gear 15 and connects to a transfer member 101 that is linked to the sun gear S2 of the planetary gear unit PU.

The hydraulic servo 40 includes a clutch drum 42, a piston member 43, a cancel plate 44, forming the oil chamber 46 and the cancel oil chamber 47, and a return spring 45. The clutch drum 42 is rotatably mounted on the left side of the outer circumferential surface of the input shaft 12. The piston member 43 is mounted for axial movement within the clutch drum 42, and an oil-tight oil chamber 46 is formed in the space between the piston member 43 and the clutch drum 42 by the seal rings a7 and a8. A portion of the outer circumferential surface of the piston member 43 opposes the friction plates 41. Furthermore, the cancel plate 44 is prevented from moving toward the right by a snap ring 49 that is fitted on the outer circumferential surface of the inner portion of the clutch drum 42 described above. The return spring 45 is compressed between the cancel plate 44 and the piston member 43, located on the left side of the cancel plate 44, and an oil-tight cancel oil chamber 47 is formed by the seal rings a7 and a9.

The first brake B-1 is located between the outer circumference of the left portion of the planetary gear unit PU to the side wall portion 3c of the left side of the transmission case 3. The first brake B-1 includes friction plates 61 and a hydraulic servo 60 that engages and releases friction plates 61. The outer friction plates 61 are spline engaged to the inner circumferential surface of the transmission case 3, and at the same time, the inner friction plates 61 are spline engaged to the hub member 116 that is linked to the sun gear S2 of the planetary gear unit PU via the transfer member 104.

The hydraulic servo 60 includes a piston member 63, a cancel plate 64, and a return spring 65, and an oil chamber 66 is formed between the piston member 63 and the transmission case 3. The piston member 63 is mounted for axial movement, and has a right side end portion axially aligned in opposition to the friction plates 61. An oil-tight oil chamber 66 is formed in the space between the piston member 63 and the transmission case 3 by the two seal rings a13 and a14. The cancel plate 64 is prevented from moving toward the right side by a snap ring 69 that is fitted on the inner circumferential surface of the transmission case 3.

The second brake B-2 is radially outward of the ring gear R3 of the planetary gear unit PU and includes friction plates 71 and a hydraulic servo 70 that operates the friction plates 71. The outer friction plates 71 are spline engaged with the inner circumferential surface of the transmission case 3, and the inner friction plates 71 are spline engaged with the hub member 117 that is linked to the carrier CR2 of the planetary gear unit PU.

The hydraulic servo 70 includes a cylinder 72, a piston 73, a cancel plate 74, a return spring 75, and an oil chamber 76 formed between the cylinder 72 and the piston 73. The piston 73 is mounted for axial movement, and has a right side end portion axially aligned in opposition to the friction plates 71. An oil-tight oil chamber 76 is formed in the space between the piston 73 and the transmission case 3 by the two seal rings a15 and a16. The cancel plate 74 is prevented from movement toward the right by a snap ring 79 that is fitted on the inner circumferential surface of the transmission case 3.

The fourth clutch C-4 is located to the left of the planetary gear unit PU, radially inward of the first brake B-1, and includes friction plates 51 and a hydraulic servo 50 that operates the friction plates 51. The inner friction plates 51 are linked to the hub member 116 by spline engagement with the hub member 114 that is linked to the carrier CR2 via the transfer member 104. The outer friction plates 51 are spline engaged with the inner circumferential surface of the clutch drum 52 and the clutch drum 52 is linked to the intermediate shaft 13. This intermediate shaft 13 is spline engaged with the input shaft 12, that is, the clutch drum 52 is linked to the input shaft 12 via the intermediate shaft 13. In this manner, the fourth clutch C-4 can directly engage and disengage the input shaft 12 (intermediate shaft 13) and the sun gear S2, rather than through the carrier CR1 of the planetary gear set DP.

The hydraulic servo 50 includes a clutch drum 52, a piston 53, a cancel plate 54, a return spring 55, an oil chamber 56 and a cancel oil chamber 57. At its right side end, the clutch drum 52 is connected to the intermediate shaft 13. The clutch drum 52 is supported for free rotation on the boss 3d extending from the side wall portion 3a of the transmission case 3. The piston 53 is mounted for axial movement within the clutch drum 52, and an oil-tight oil chamber 56 is formed in the space between the piston 53 and the clutch drum 52 by seal rings a10 and a11. A radially outer portion of the piston member 53 is axially aligned in opposition to the friction plates 51. The cancel plate 54 is prevented from moving toward the right by a snap ring 59 that is fitted on the outer circumferential surface of the inner portion of the clutch drum 52. A return spring 55 is compressed between the cancel plate 54 and the piston member 53 that is disposed on the left side thereof, and an oil-tight cancel oil chamber 57 is formed by the seal rings a10 and a12.

The planetary gear unit PU includes a sun gear S2, a sun gear S3, a short pinion P3 that meshes with the sun gear S3, a long pinion P4 that meshes with the sun gear S2, the short pinion P3, and the ring gear R3, a carrier CR2 that rotatably supports the short pinion P3 and the long pinion P4 between two end plates, and a ring gear R3 that meshes with the long pinion P4, thereby forming a Ravigneaux-type planetary gear set.

The transfer member 101 that passes through the inner circumference of the counter gear 15 is linked to the right side of the sun gear S2, and the sun gear S2 is thereby linked to the clutch drum 42 of the third clutch C-3 via the transfer member 101. The transfer member 104 described above is linked to the left side of the sun gear S2, and the sun gear S2 is linked to the hub member 114 of the fourth clutch C-4 and to the hub member 116 of the first brake B-1 via the transfer member 104. The transfer member 102 that passes through the inner circumferential side of the counter gear 15 is linked to the right side of the sun gear S3, and the clutch drum 22 of the first clutch C-1 is linked to the sun gear S3 via the linking member 102.

The right side of the carrier CR2, that is, the side plate on the planetary gear set DP side, is linked to the transfer member 103 that passes through the inner circumference of the counter gear 15 and is thereby linked to the hub member 112 of the second clutch C-2 via the transfer member 103. The side plate on the left side of the carrier CR2 is linked to the hub member 117 of the second brake B-2. The ring gear R3 is connected to the counter gear 15 via the transfer member 105. The counter gear 15 meshes with the large diameter gear 82 that is mounted on the counter shaft 81, and links to the left and right wheels 93l and 93r (that is, the drive wheels) via the counter shaft 80 and the differential gear portion 90.

Next, the structure of each of the oil ducts and the supply of the working oil will be briefly explained. The oil duct c30 in the boss 3b communicates with the oil chamber 36 of the hydraulic servo 30 of the second clutch C-2, that is, the oil chamber 36 that is formed by sealing the space between the clutch drum 32 and the piston 33 by the seal rings a4 and a5. Working oil is supplied through the space between the clutch drum 32 and the boss 3b and formed between the seal rings d1 and d2, from the oil duct c30. Likewise, oil is supplied from an oil duct (not illustrated) to the cancel oil chamber 37 that is formed by sealing the space between the piston member 33 and the cancel plate 34 with the seal rings a4 and a6.

In addition, the oil duct c20 in the boss 3b communicates with the oil chamber 26 of the hydraulic servo 20 of the first clutch C-1, that is, the oil chamber 26 that is formed by sealing the space between the clutch drum 22 and the piston 23 by the seal rings a1 and a2, through the space between the clutch drum 32 of the second clutch C-2 and the boss 3b sealed between the seal rings d3 and d4, and through the space between the seal rings d5 and d6, whereby, working oil is supplied from the oil duct c20. Likewise, oil is supplied from an oil duct (not illustrated) to the cancel oil chamber 27 that is formed by sealing the space between the piston 23 and the cancel plate 24 with the seal rings a1 and a3.

The oil duct c40 in the boss 3b communicates via the oil ducts c41, c42, and c43 in the input shaft 12, with the oil chamber 46 of the hydraulic servo 40 of the third clutch C-3, that is, the oil chamber 46 formed by sealing the space between the clutch drum 42 and the piston member 43 with the seal rings a7 and a8. This supply of oil also passes through the space between the boss 3b and the input shaft 12 sealed between the seal rings d7 and d8, and through the space between the input shaft 12 and the clutch drum 42 between the seal rings d9 and d10. Likewise, oil is supplied from an oil duct (not illustrated) to the cancel oil chamber 47 that is formed by sealing the space between the piston 43 and the cancel plate 44 by the seal rings a7 and a9.

The oil duct c50 in the boss 3d communicates with the oil chamber 56 of the hydraulic servo 50 of the fourth clutch C-4, that is, the oil chamber 56 formed by sealing the space between the clutch drum 52 and the piston member 53 with the sealing rings a10 and a11, and through the space between the clutch drum 52 and the boss 3d defined between the seal rings d11 and d12. Likewise, oil is supplied from an oil duct (not illustrated) to the cancel oil chamber 57 that is formed by sealing the space between the piston member 53 and the cancel plate 54 with the seal rings a10 and a12.

In addition, working oil is supplied from an oil duct (not illustrated) in the side wall portion 3c to the oil chamber 66 of the hydraulic servo 60 of the first brake B-1, that is, the oil chamber 66 that is formed by sealing the space between the side wall portion 3c of the transmission case 3 and the piston 63 with the seal rings a13 and a14.

Working oil is also supplied from an oil duct (not illustrated) in the transmission case 3 to the oil chamber 76 of the hydraulic servo 70 of the second brake B-2, that is, the oil chamber 76 that is formed by sealing the space between the cylinder member 72 and the piston 73 with the seal rings a15 and a16.

In addition, an oil duct c80 extends axially through the input shaft 12 and the intermediate shaft 13, and lubricating oil is supplied from an oil duct (not illustrated) in the boss 3b or the boss 3d to the oil duct c80. A plurality of holes (not illustrated) are bored in the input shaft 12 and the intermediate shaft 13 in radial alignment with the oil duct c80, and the lubricating oil that is supplied to the oil duct c80 is supplied into the speed change mechanism 2$_1$ as a spray from these holes.

In addition, an oil duct c90 is axially formed in the input shaft 12 and communicates with the lock up clutch 10 via an oil duct (not illustrated). Thus, when working oil is supplied to the oil duct c90 from a hydraulic control apparatus (not illustrated) via an oil duct in the boss 3b, the friction plates of the lock up clutch 10 are pressed together, and the lock up clutch 10 is thereby engaged.

Figure 19:
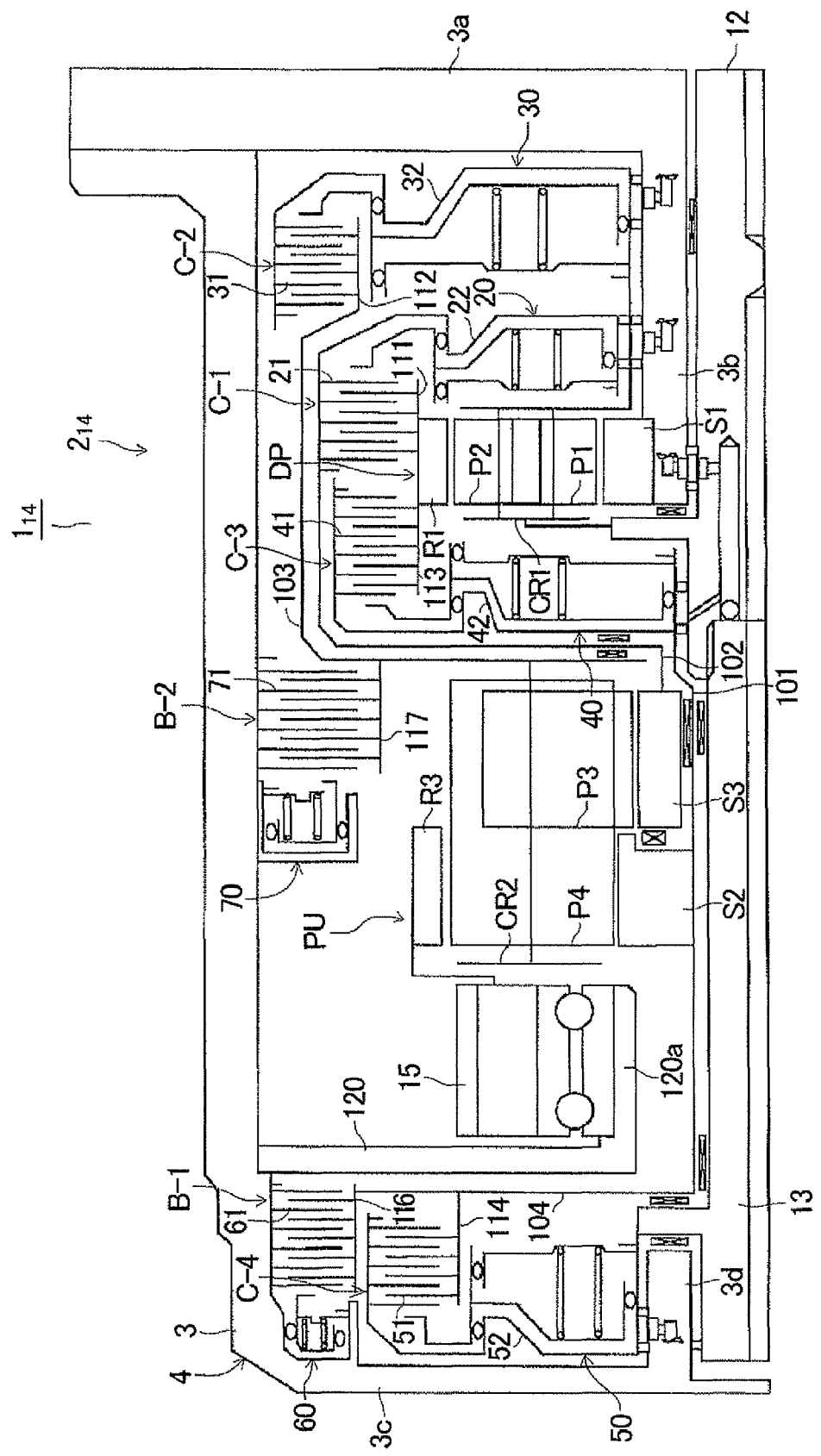
FIG. 19 is a cross-sectional view of an automatic transmission $1_{14}$ according to a fourteenth embodiment.

In contrast, in the automatic transmission that is shown in FIG. 19 of Japanese Patent Application Publication No. JP-A-2004-183705, an input rotary element of a speed reduction planetary gear set and a rotary element of a second planetary gear set are adapted to be selectively locked by clutches, but assuming that the transfer member that transfers this input rotation is linked to the rotary element of the second planetary gear set, extends along the outer circumference of the second planetary gear set and radially inward to link with the input rotary element of the speed reduction planetary gear set, the transfer member linked to the rotary element encloses the second planetary gear set.

However, disposition of the transfer member on the outer circumference side of the second planetary gear set in this manner hinders making the automatic transmission more radially compact. In addition, because the transfer member is disposed on the radially outermost side, the centrifugal force generated during rotation requires a high rigidity, a thicker transfer member, and added weight, thus increasing inertia and hindering controllability.

In addition, in the above-described prior art transmission, because each of the rotary elements of the second planetary gear set rotate relative to each other, lubricating oil must be supplied and cooled, but that supply (and discharge) is hindered by the transfer member which encloses the planetary gear set, and heat is easily accumulated; that is, it is not possible to ensure cooling performance. Furthermore, when, for example, sufficient holes are provided in the transfer member so that the lubricating oil can be discharged smoothly, there are problems in that it is necessary to make the transfer member even thicker in order to provide the necessary high rigidity, and the weight is further increased.

In addition, because the above-described prior art transfer member encloses a section from the speed reduction planetary gear set to the second planetary gear set, the assembly of the automatic transmission is difficult. Furthermore, even if, for example, the transfer member were to be partitioned into a plurality of sections and linked by splines or the like, such splines would require positioning, making the assembly of the automatic transmission more difficult.

In addition, because the prior art transfer member also encloses other clutches, for example, it is not possible to provide a structure including a center support member, supply of working oil for a clutch through a center support member is precluded. Further, because it is necessary to supply the working oil to such a clutch hydraulic servo from the input shaft (in particular, via members that rotate relative to each other), there are problems in that the number of seal rings must be increased and the sliding resistance increased, hindering the power transfer efficiency.

In contrast, in the automatic transmission 1$_1$ of the present invention, there is no member enclosing the planetary gear unit PU because the fourth clutch C-4 is interposed in the transfer path between input shaft 12 and the sun gear S2, the second clutch C-2 interposed in the transfer path between the carrier CR1 and the carrier CR2, and the output side transfer member 103 of the second clutch C-2 is linked to the carrier CR2 in the planetary gear unit PU at the axial side of the planetary gear set DP. It is thereby possible to make the automatic transmission 1$_1$ more axially compact. In addition, it is possible to shorten the transfer member that requires a high rigidity, and thereby improve the controllability of the automatic transmission 1$_1$. Further, the present invention provides a simplified structure in which the supply of lubricating oil is readily discharged, thereby ensuring cooling performance. Furthermore, the arrangement of the clutches enables a structure including a support wall 120 through which working oil of a clutch is supplied. Thus, it is possible to reduce the number of seal rings, to reduce the sliding resistance of the seal rings, and to improve the power transfer efficiency of the automatic transmission 1$_1$.

In addition, because the counter gear 15 that is linked to the ring gear R3 is disposed axially intermediate the planetary gear unit PU and the planetary gear set DP, and the output side member 101 of the third clutch C-3, the output side transfer member 102 of the first clutch C-1, and the output side transfer member 103 of the second clutch C-2 connect with the planetary gear unit PU through the radially inner side of the counter gear 15, it is possible to dispose the counter gear 15 axially intermediate the planetary gear unit PU and the planetary gear set DP, and it is possible to advantageously use the automatic transmission 1$_1$ in an FF-type vehicle.

Furthermore, because the hydraulic servo 30 of the second clutch C-2 is disposed on the side of the planetary gear set DP that is axially opposite the planetary gear unit PU, it is possible to supply working oil from an oil duct c30 in the boss 3b to the hydraulic servo 30 of the second clutch C-2. It is thereby possible to reduce the number of seal rings as compared to a structure in which the working oil is supplied from an oil duct in the input shaft 12. It is thereby possible to reduce the sliding resistance of the seal rings, and to improve the power transfer efficiency of the automatic transmission 1$_1$.

In addition, because the hydraulic servo 50 of the fourth clutch C-4 is disposed on the side of the planetary gear unit PU axially opposite the planetary gear set DP, it is possible to locate the friction plates 51 of the fourth clutch C-4 relatively near the outer circumference of the case and to enlarge the area of the friction plates 51. Thereby, it is possible to ensure torque capacity while reducing the number of the friction plates 51. Furthermore, it is possible to supply working oil to the hydraulic servo 50 of the fourth clutch C-4 from the oil duct c50 that is provided inside the boss 3d. Therefore, the number of seal rings may be reduced in comparison to a structure in which the working oil is supplied from an oil duct inside the input shaft 12, to reduce the sliding resistance of the seal rings, and to improve the power transfer efficiency of the automatic transmission $1_1$.

Furthermore, because the hydraulic servo 40 of the third clutch C-3 is located axially intermediate the planetary gear unit PU and the planetary gear set DP, as compared to a structure which the hydraulic servo 40 of the third clutch C-3 is disposed on the side of the planetary gear set DP axially opposite the planetary gear unit PU, it is possible to shorten the distance between the third clutch C-3 and the planetary gear unit PU, and to shorten the output side transfer member 101 of the third clutch C-3, which member requires strength for transferring a high torque. In this manner, the weight is reduced and the controllability of the automatic transmission $1_1$ is improved.

In addition, because the hydraulic servo 20 of the first clutch C-1 is located on the side of the planetary gear set DP axially opposite the planetary gear unit PU, it is possible to supply working oil to the hydraulic servo 20 of the first clutch C-1 from the oil duct c20 in the boss 3. Thereby, for example, as compared to a structure in which the hydraulic servo 20 of the first clutch C-1 is disposed on the input shaft 12 and working oil is supplied via the input shaft 12, it is possible to shorten the length of the oil duct, and thereby improve the controllability as an automatic transmission $1_1$.

Furthermore, because a first brake B-1 is provided that selectively locks the sun gear S2 to the case 4 and the hydraulic servo 60 of the first brake B-1 is disposed on the side of the planetary gear unit PU axially opposite the planetary gear set DP, it is possible to link the output side transfer member of the first brake B-1 to the sun gear S2 without a complicated configuration, and to make the automatic transmission $1_1$ more compact.

In the automatic transmission $1_1$ according to the present invention, as explained above, the transfer member 103 of the output side of the second clutch C-2 is linked to the carrier CR2, extending along the outer circumference of the transfer members 101, 102 of the output sides of the third and first clutches C-3, C-1, the transfer member 104 of the output side of the fourth clutch C-4 and the transfer member 101 of the output side of third clutch C-3 are linked to the sun gear S2, and the transfer member 104 of the output side of the fourth clutch C-4, the transfer member 101 of the output side of third clutch C-3, and the sun gear S2, which rotate integrally therewith, are disposed on the inner circumferential side of the transfer member 102 of the output side of the first clutch C-1. Therefore, the transfer member 104 of the output side of the fourth clutch C-4, which rotates faster than the transfer member 103 of the output side of the second clutch C-2, is located more radially inward than the transfer member 102 of the output side of the first clutch C-1, which is on the inner side of the transfer member 103 of the output side of the second clutch C-2. As a result, it is possible to make the diameter of the transfer member 104 of the output side of the fourth clutch C-4 smaller than the diameter of the transfer member 103 of the output side of the second clutch C-2, and thus it is possible to reduce the weight more than in a structure in which the transfer member 102 is on the outer side of transfer member 103. In addition, because the inertia is reduced in comparison to a structure in which the transfer member 102 is located on the outer side, the controllability of the automatic transmission $1_1$ is improved.

The third and first clutches C-3, C-1 are disposed on the side of the planetary gear set DP relative to the planetary gear set PU, the transfer members 101, 102 of the output side of the third and first clutches C-3, C-1 are respectively linked to the sun gear S2 and the sun gear S3, the fourth clutch C-4 is located on the side of the planetary gear unit PU axially opposite the planetary gear set DP, the transfer member 104 of the output side of the fourth clutch C-4 is linked to the sun gear S2, the second clutch C-2 is disposed on the planetary gear set DP side relative to the planetary unit PU, and the transfer member 103 of the output side of the second clutch C-2 is linked to the carrier CR2 extending outward of the outer circumference of the transfer members 101, 102 of the output sides of the third and first clutches C-3, C-1. Because the transfer member 104 of the output side of the fourth clutch C-4, which rotates faster than the transfer member of the output side of the second clutch C-2, is located more radially inward, the diameter of the transfer member 104 of the output side of the fourth clutch C-4 can be made smaller than the diameter of the transfer member 103 of the output side of the second clutch C-2, and it is possible to reduce the weight as compared to a configuration in which the transfer member 104 is disposed on the outer circumferential side. In addition, because it is possible to reduce the inertia as compared to a configuration in which the transfer member 104 is on the outer side, it is possible to improve the controllability of the automatic transmission $1_1$ In addition, as compared to a structure in which the hydraulic servo 50 of the fourth clutch C-4 is located between the planetary gear unit PU and the planetary gear set DP, the friction plates 51 of the fourth clutch C-4 are located more radially outward, and it is possible to increase the area of the friction plates. Thus, it is possible to ensure an adequate torque transfer capacity while reducing the number of friction plates 51. Furthermore, it is possible to shorten the distance between the third and first clutches C-3, C-1 and the planetary gear unit PU, and it is possible to shorten the transfer members 101, 102 of the output sides of the third and first clutches C-3, C-1, which must be sufficiently strong to transfer a high torque. It is thereby possible to decrease the weight to improve the controllability of the automatic transmission $1_1$.

Furthermore, it is possible, for example, to supply the working oil to the hydraulic servo 50 of the fourth clutch C-4 from an oil duct c50 provided in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_1$.

In addition, because the transfer member of the input side of the fourth clutch C-4 is linked to the input shaft 12 and to intermediate shaft 13 through the inner side of the planetary gear unit PU and a portion of the transfer member of the input side of the fourth clutch C-4 forms the clutch drum 52 of the hydraulic servo 50 of the fourth clutch C-4, in comparison to a structure in which the transfer member of the output side of the fourth clutch C-4 forms the clutch drum of the hydraulic servo 50, the clutch drum of the hydraulic servo 50 can also serve to transfer power from the input shaft 12, and thus it is possible to shorten the transfer member.

Furthermore, because the boss 3b supports and holds the sun gear S1 stationary, because the transfer member of the input side of the second clutch C-2 is linked to the carrier CR1 and a portion of the transfer member of the input side of the second clutch C-2 forms the clutch drum 32 of the hydraulic servo 30 of the second clutch C-2, and because the hydraulic servo 30 is disposed around the boss 3b axially intermediate the planetary gear set DP and the side wall 3a, it is possible to supply the working oil to the hydraulic servo 30 of the second clutch C-2 from an oil duct c30 in the boss 3b. Thus, in comparison to a structure in which the hydraulic servo 30 of the second clutch C-2 is disposed around the input shaft 12, separated from the boss 3b, and the working oil is supplied via an oil duct in the input shaft 12, it is possible to shorten the length of the oil duct by an amount equivalent to the length of the oil duct in the input shaft 12, and it is possible to improve the controllability of the automatic transmission $1_1$.

In addition, because: (1) the hub 111 of the first clutch C-1 is linked to the ring gear R1, (2) the transfer member 102 of the output side of the first clutch C-1 is linked to the sun gear S3, (3) a portion of the transfer member 102 forms the clutch drum 22 of the hydraulic servo 20 of the first clutch C-1, and (4) the hydraulic servo 20 is disposed around the boss 3b axially intermediate the planetary gear set DP and the hydraulic servo 20 of the second clutch C-1, it is possible to supply the working oil to the hydraulic servo 20 of the first clutch C-1 from an oil duct c20 in the boss 3b. Thus, in comparison to a structure in which, for example, the hydraulic servo 20 of the first clutch C-1 is disposed around the input shaft 12, separated from the boss 3b and the working oil is supplied via an oil duct in the input shaft 12, it is possible to shorten the length of the oil duct by an amount equivalent to the length of the oil duct in the input shaft 12, and to improve the controllability of the automatic transmission $1_1$.

Furthermore, because counter shaft 81 is parallel to the input shaft 12 and linked via the counter gear 15 that is linked to the ring gear R3, and the output rotation from the ring gear R3 is transferred to the counter shaft 81 via the counter gear 15, it is possible to advantageously use the automatic transmission $1_1$ for a FF-type vehicle.

Because the counter gear 15 is located axially intermediate the planetary gear unit PU and the planetary gear set DP and is supported by a support member 120a extending from the support wall 120, it is possible to position the counter gear 15 axially further toward the input side. For example, it is possible to position the counter shaft portion 80 and the differential gear portion 90 near the torque converter 7 side, thereby making the automatic transmission $1_1$ more compact. Thus, it is possible to avoid interference between the transmission $1_1$ and the frame of the vehicle.

Furthermore, because the carrier CR1 is linked to the input shaft 12 on the side of the planetary gear set DP facing the planetary gear unit PU and has an axially extending linkage to the clutch drum 32, which also serves as the transfer member of the input side of the second clutch C-2, at the side of the planetary gear set DP opposite the planetary gear unit PU, it is possible to link the carrier CR1, the transfer member 32 of the input side of the second clutch C-2, and the input shaft 12 without complicated configuration of the components, and it is possible to make the automatic transmission $1_1$ more compact.

In addition, because the hub member 116 of the first brake B-1 and the transfer member 104 that is linked thereto are axially linked to the sun gear S2 at the side of the planetary gear unit PU opposite the planetary gear set DP, it is possible to link together the hub member 116 of the first brake B-1, the transfer member 104, and the sun gear S2 without a complicated configuration of components, and to make the automatic transmission $1_1$ more compact.

In addition, because the planetary gear set DP includes a sun gear S1 which normally does not rotate, a carrier CR1 that rotatably supports the pinion gear P1 and the pinion gear P2 and that is coupled to the input shaft 12, and a ring gear R1 that meshes with the pinion gear P2 and outputs a reduced speed rotation, it is possible to output from the ring gear R1 a reduced speed rotation, i.e. rotation at a speed less than that of the input rotation of the input shaft 12.

In addition, because the planetary gear unit PU is a Ravigneaux-type planetary gear unit that includes a sun gear S2, a sun gear S3, a short pinion P3 that meshes with the sun gear S3, a long pinion P4 that meshes with the sun gear S2 and with the short pinion P3, a carrier CR2 that selectively rotatably supports the short pinion P3 and the long pinion P4, and the ring gear R3 that meshes with the long pinion P4, it is possible to link each of the rotary elements of the planetary gear unit PU and the output side members of each of the clutches and brakes without making these members complicated, and at the same time it is possible to prevent high speed rotation of each of the rotary members, and to obtain favorable gear ratios.

The first forward speed can be established by engaging the first clutch C-1 and locking the second brake B-2; the second forward speed can be established by engaging the first clutch C-1 and locking the first brake B-1; the third forward speed can be established by engaging the first clutch C-1 and the third clutch C-3; the fourth forward speed can be established by engaging the first clutch C-1 and the fourth clutch C-4; the fifth forward speed can be established by engaging the first clutch C-1 and the second clutch C-2; the sixth forward speed can be established by engaging the second clutch C-2 and the fourth clutch C-4; the seventh forward speed can be established by engaging the second clutch C-2 and the third clutch C-3; the eighth forward speed can be established by engaging the second clutch C-2 and locking the first brake B-1; and reverse speeds can be established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are on the ordinate, and the corresponding gear ratios of the sun gear S2, the sun gear S3, the carrier CR2, and the ring gear R3 are on the abscissa, a structure becomes possible in which the sun gear S2 is positioned at the farthest left end of the ordinate and, in sequence therefrom, are the carrier CR2, the ring gear R3 that is linked to the counter gear 15, and the sun gear S3.

The automatic transmission $1_1$ according to the first embodiment becomes an automatic transmission $1_6$ according to the sixth embodiment described below (FIG. 11) by axially reversing the speed change mechanism $2_1$, i.e. by reversing the relative axial positions of the planetary gear sets PU and DP.

Second Embodiment

Figure 5:
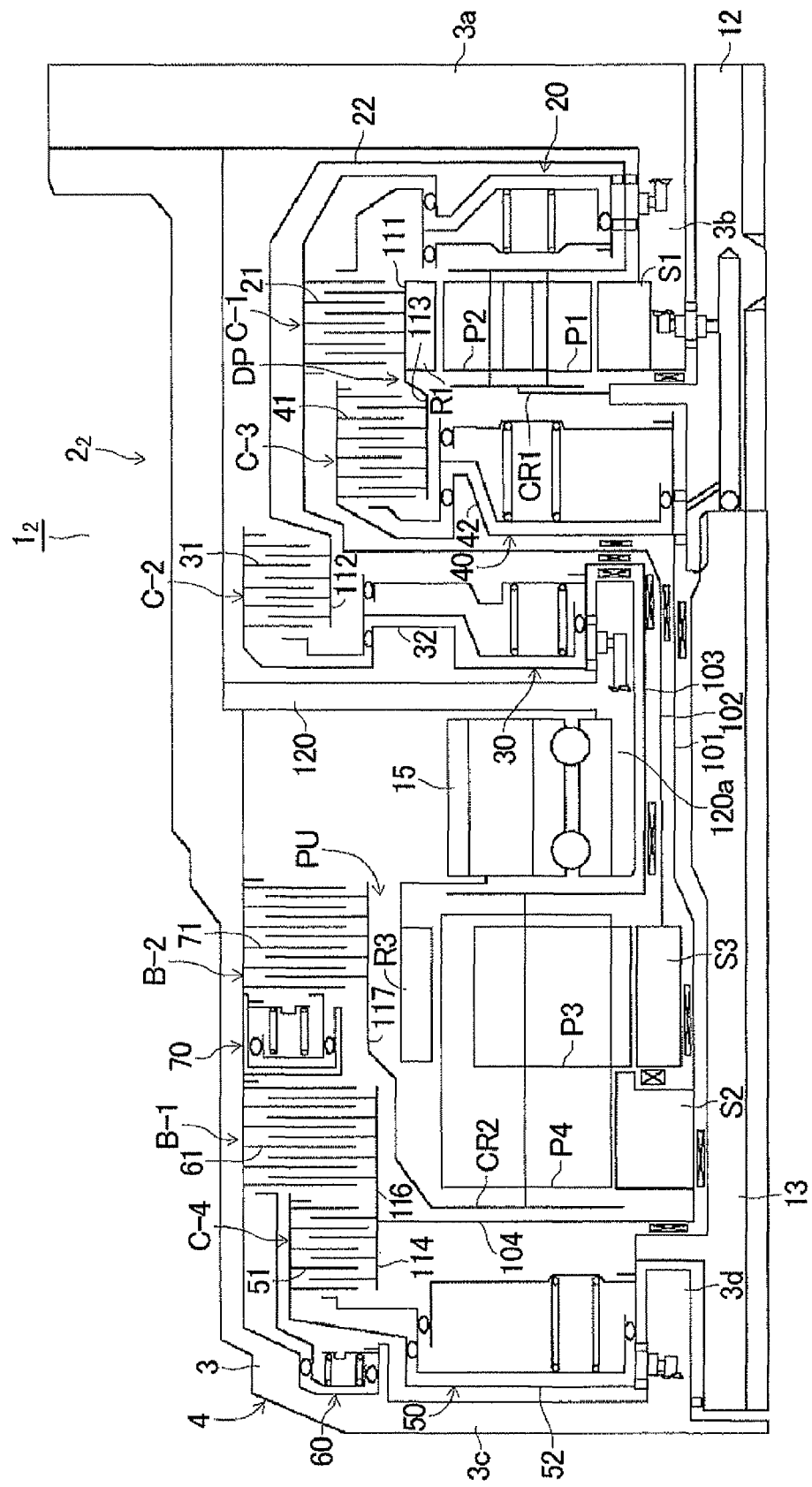
FIG. 5 is a cross-sectional view of an automatic transmission $1_2$ according to a second embodiment.

Next, a second embodiment, in which a portion of the first embodiment has been modified, will be explained with reference to FIG. 5 which is a cross-sectional view showing the automatic transmission $1_2$ of the second embodiment. Note that in the second embodiment explained below, only the portions that differ from the automatic transmission $1_1$ of the first embodiment will be explained. The other portions are substantially identical, and explanation thereof will be omitted.

In contrast to the automatic transmission $1_1$ of the first embodiment, the automatic transmission $1_2$ of the second embodiment has a structure that is modified such that the hydraulic servo 30 of the second clutch C-2 is located axially intermediate the planetary gear set DP and the planetary gear unit PU, and more specifically, the hydraulic servo 30 of the second clutch C-2 is located axially intermediate the counter gear 15 and the hydraulic servo 40 of the third clutch C-3 and adjacent a support wall 120.

Specifically, in automatic transmission $1_2$, the hydraulic servo 20 of the first clutch C-1 is disposed on the side of the planetary gear set DP axially opposite the planetary gear unit PU, the hydraulic servo 40 of the third clutch C-3, the hydraulic servo 30 of the second clutch C-2, and the counter gear 15 are located axially intermediate the planetary gear set DP and the planetary gear unit PU, and the hydraulic servo 50 of the fourth clutch C-4 and the hydraulic servo 60 of the first brake B-1 are disposed on the side of the planetary gear unit PU that is axially opposite the planetary gear set DP.

In the automatic transmission $1_2$, because the fourth clutch C-4 is located in the transfer path to connect the input shaft 12 and the sun gear S2, the second clutch C-2 is located in the transfer path so as to connect the carrier CR1 and the carrier CR2, and the output side transfer member 103 of the second clutch C-2 is axially linked to the carrier CR2 on the side of the planetary gear unit PU facing the planetary gear set DP, it is possible to avoid need for a member enclosing the planetary gear unit PU. The automatic transmission $1_2$ can thereby be made more radially compact. In addition, it is possible to shorten the transfer member, which requires a high rigidity, and to thereby reduce the weight and improve the controllability. Furthermore, the lubricating oil is readily discharged, and the cooling performance can be ensured. In addition, the assembly of the automatic transmission $1_2$ can be simplified. Furthermore, because of provision of support wall 120, the working oil for the clutches can be supplied from this support wall 120 enabling a reduction in the number of seal rings, a reduction in the sliding resistance of the seal rings, and an improvement the power transfer efficiency of the automatic transmission $1_2$.

In addition, because the hydraulic servo 30 of the second clutch C-2 is disposed axially intermediate the planetary gear unit PU and the planetary gear set DP, it is possible to supply working oil to the hydraulic servo 30 of the second clutch C-2 from an oil duct provided in the support wall 120. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_2$.

Furthermore, because the hydraulic servo 50 of the fourth clutch C-4 is located on the side of the planetary gear unit PU that is axially opposite the planetary gear set DP, it is possible to locate the friction plates 51 of the fourth clutch C-4 further radially outward and to make the surface area of the friction plates 51 larger. Therefore, it is possible to ensure transfer of a sufficient torque, while reducing the number of friction plates. Furthermore, it is possible to supply working oil to the hydraulic servo 50 of the fourth clutch C-4 from an oil duct that is provided in the boss 3d. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_2$.

In addition, because the hydraulic servo 40 of the third clutch C-3 is disposed axially intermediate the planetary gear unit PU and the planetary gear set DP, in comparison to a structure in which the hydraulic servo 40 of the third clutch C-3 is disposed on the side of the planetary gear set DP that is axially opposite the planetary gear unit PU, it is possible to shorten the distance between the third clutch C-3 and the planetary gear unit PU and to shorten the output side transfer member 101 of the third clutch C-3, which must be strong in order to transfer high torque. It is thereby possible to reduce the weight and to improve the controllability of the automatic transmission $1_2$.

Furthermore, because the hydraulic servo 20 of the first clutch C-1 is disposed on the side of the planetary gear set DP that is axially opposite the planetary gear unit PU, it is possible to supply working oil to the hydraulic servo 20 of the first clutch C-1 from an oil duct provided in the boss 3b. Thereby, in comparison to a structure in which working oil is supplied from an oil duct in the input shaft 12, it is possible to reduce the number of seal rings, to reduce the sliding resistance of the seal rings, and to improve the power transfer efficiency of the automatic transmission $1_2$.

In addition, because of provision of a first brake B-1 that selectively stops rotation of the sun gear S2 and because the hydraulic servo 60 of the first brake B-1 is located on the side of planetary gear unit PU that is axially opposite the planetary gear set DP, the locking force transfer member of the first brake B-1 and the sun gear S2 can be linked without complicating the configuration of these components, and it is possible to make the automatic transmission $1_2$ more compact.

In the automatic transmission $1_2$ according to the present invention, as explained above, the transfer member 103 of the output side of the second clutch C-2 is linked to the carrier CR2 radially outward of the transfer members 101, 102 of the output side of the third and first clutches C-3, C-1, the transfer member 104 of the output side of the fourth clutch C-4 and the transfer member 101 of the output side of third clutch C-3 are linked to the sun gear S2, and the transfer member 104 of the output side of the fourth clutch C-4, the transfer member 101 of the output side of third clutch C-3, and the sun gear S2, which rotate integrally therewith, are disposed radially inward of the transfer member 102 of the output side of the first clutch C-1. Therefore, the transfer member 104 of the output side of the fourth clutch C-4, which rotates faster than the transfer member 103 of the output side of the second clutch C-2, is radially inward of the transfer member 102 of the output side of the first clutch C-1, which, in turn, is radially inward of the transfer member 103 of the output side of the second clutch C-2. As a result, it is possible to make the diameter of the transfer member 104 of the output side of the fourth clutch C-4 smaller than the diameter of the transfer member 103 of the output side of the second clutch C-2, and to reduce the weight as compared to the weight when it is on the radially outer side. In addition, because the inertia is reduced in comparison to a structure in which it is disposed on the radially outer side, it is possible to improve the controllability of the automatic transmission $1_2$.

In addition, the third and first clutches C-3, C-1 are disposed on the planetary gear set DP side of the planetary gear set PU, the transfer members 101, 102 of the output side of the third and first clutches C-3, C-1 are respectively linked to the sun gear S2 and the sun gear S3, the fourth clutch C-4 is disposed on the side of the planetary gear unit PU that is axially opposite the planetary gear set DP, the transfer member 104 of the output side of the fourth clutch C-4 is linked to the sun gear S2, the second clutch C-2 is disposed on the planetary gear set DP side of the planetary gear unit PU, and the transfer member 103 of the output side of the second clutch C-2 is linked to the carrier CR2 radially outward of the transfer members 101, 102 of the output side of the third and first clutches C-3, C-1. Thereby, because the transfer member 104 of the output side of the fourth clutch C-4, which rotates faster than the transfer member of the output side of the second clutch C-2, is located more radially inward, the diameter of the transfer member 104 of the output side of the fourth clutch C-4 can be made smaller than the diameter of the transfer member 103 of the output side of the second clutch C-2, and it is possible to reduce the weight as compared to the case in which it is disposed on the radially outer side. In addition, because it is possible to reduce the inertia as compared to an arrangement in which it is further radially outward, it is possible to improve the controllability of the automatic transmission $1_2$.

In addition, in comparison to an arrangement wherein the hydraulic servo 50 of the fourth clutch C-4 is located between the planetary gear unit PU and the planetary gear set DP, it is possible to dispose the friction plates 51 of the fourth clutch C-4 more radially outward, and to increase the area of the friction plates. Thus, it is possible to ensure transfer of a sufficient torque while, at the same time, reducing the number of friction plates 51. Furthermore, it is possible to shorten the distance between the third and first clutches C-3, C-1 and the planetary gear unit PU and to shorten the transfer members 101, 102 of the output side of the third and first clutches C-3, C-1, which must be sufficiently strong in order to transfer a high torque. It is thereby possible to decrease the weight and to improve the controllability of the automatic transmission $1_2$.

Furthermore, it is possible, for example, to supply working oil to the hydraulic servo 50 of the fourth clutch C-4 from an oil duct c50 that is provided in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_2$.

In addition, because the transfer member of the input side of the fourth clutch C-4 is linked to the input shaft 12 and the intermediate shaft 13 at the radially inner side of the planetary gear unit PU and because a portion of the transfer member of the input side of the fourth clutch C-4 forms the clutch drum 52 of the hydraulic servo 50 of the fourth clutch C-4, there is an advantage over the case in which the transfer member of the output side of the fourth clutch C-4 forms the clutch drum of the hydraulic servo 50 in that, in the present embodiment, the clutch drum of the hydraulic servo 50 serves to transfer power from the input shaft 12, and thus it is possible to make the transfer member shorter (more axially compact).

Furthermore, because the counter gear 15 is located axially intermediate the planetary gear unit PU and the planetary gear set DP, because support member 120a is provided to support the counter gear 15, because the hub member 112 of the second clutch C-2 is linked to the carrier CR1 on the radially outer side of the third and first clutches C-3, C-1, because a portion of the transfer member 103 of the output side of the second clutch C-2 forms the clutch drum 32 of the hydraulic servo 30 of the second clutch C-2, and because the hydraulic servo 30 is located around the support member 120a, between the planetary gear set DP and counter gear 15, it is possible to supply the working oil to the hydraulic servo 30 of the second clutch C-2 from an oil duct c30 in the support member 120a. Thus, as compared to an embodiment in which, for example, working oil is supplied from an oil duct in the input shaft 12, it is possible to reduce the number of seal rings, to reduce the sliding friction of the seal rings, and to improve the power transfer efficiency of the automatic transmission $1_2$.

In addition, because a counter shaft 81 is arranged in parallel with the input shaft 12 and is linked to the counter gear 15, in turn linked to the ring gear R3, rotation output from the ring gear R3 is transferred to the counter shaft 81 via the counter gear 15, enabling use of the automatic transmission $1_2$ in an FF-type vehicle.

Furthermore, because the counter gear 15 is located axially intermediate the planetary gear unit PU and the planetary gear set DP and is supported by support member 120a, it is possible to locate the counter gear 15 axially closer to the input side. For example, it is possible to position the counter shaft portion 80 and the differential gear portion 90 near the torque converter 7 side, thereby making the automatic transmission $1_2$ more compact. Thus, it is possible to prevent interference between the transmission and the frame of the vehicle, and thereby provide more flexibility in mounting the automatic transmission $1_2$ in the vehicle.

In addition, because the carrier CR1 is linked to the input shaft 12 on the planetary gear unit PU side of the planetary gear set DP and is axially linked to the hub member 112, which is the transfer member of the input side of the second clutch C-2, on the side of the planetary gear set DP opposite the planetary gear unit PU, it is possible to link the carrier CR1, the transfer member 112 of the input side of the second clutch C-2, and the input shaft 12 without a complicated configuration and to make the automatic transmission $1_2$ more compact.

In addition, because the hub member 116 of the first brake B-1 and the transfer member 104 that is linked thereto are axially linked to the sun gear S2 on the side of the planetary gear unit PU opposite the planetary gear set DP, it is possible to link the hub member 116 of the first brake B-1, the transfer member 104, and the sun gear S2 without a complicated configuration and to make the automatic transmission $1_2$ more compact.

In addition, because the planetary gear set DP includes the sun gear S1, which is normally held against rotation, a carrier CR1 that supports the pinion gear P1 and the pinion gear P2 so as to be selectively rotatable and that is normally linked to the output shaft 12, and a ring gear R1 that meshes with the pinion gear P2 and outputs a reduced speed rotation, it is possible to output a reduced speed rotation, i.e. rotation at a speed less than that of the input shaft 12 from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and meshes with the short pinion P3, the carrier CR2 that rotatably supports the short pinion P3 and the long pinion P4, and the ring gear R3 that meshes with the long pinion P4, it is possible to prevent high speed rotation of the rotary elements and to provide advantageous gear ratios while enabling each of the rotary elements of the planetary gear unit PU and the output side members of each of the clutches and brakes to be linked without making these members complicated.

The first forward speed can be established by engaging the first clutch C-1 and locking the second brake B-2; the second forward speed can be established by engaging the first clutch C-1 and locking the first brake B-1; the third forward speed can be established by engaging the first clutch C-1 and the third clutch C-3; the fourth forward speed can be established by engaging the first clutch C-1 and the fourth clutch C-4; the fifth forward speed can be established by engaging the first clutch C-1 and the second clutch C-2; the sixth forward speed can be established by engaging the second clutch C-2 and the fourth clutch C-4; the seventh forward speed can be established by engaging the second clutch C-2 and the third clutch C-3; the eighth forward speed can be established by engaging the second clutch C-2 and locking the first brake B-1; and reverse speeds can be established by engaging the third clutch C-3 or the fourth clutch C-4 and locking the second brake B-2.

In addition, in a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, a structure becomes possible in which the sun gear S2 is positioned at the farthest left end of the diagram and, in sequence to the right therefrom, are the carrier CR2, the ring gear R3 that is linked to the counter gear 15, and the sun gear S3.

Note that the automatic transmission $1_2$ according to the second embodiment can form an automatic transmission $1_7$ for a vehicle according to a seventh embodiment described below substantially by rotating the speed change mechanism $2_2$, whereby the relative axial positions of units PU and DP are reversed.

Third Embodiment

Figure 6:
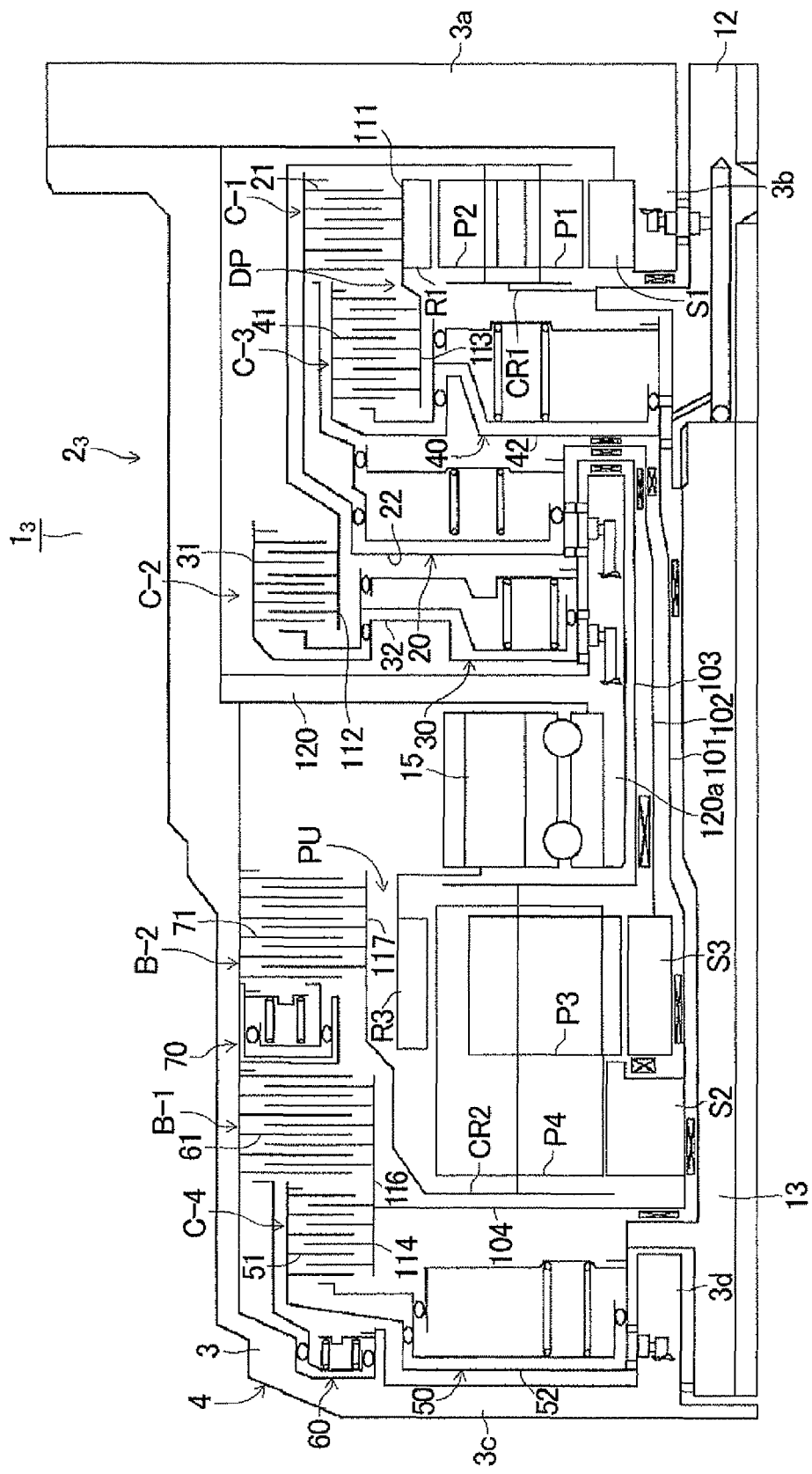
FIG. 6 is a cross-sectional view of an automatic transmission $1_3$ according to a third embodiment.

Next, a third embodiment, in which a portion of the first embodiment has been modified, will be explained with reference to FIG. 6 which is a cross-sectional view showing an automatic transmission $1_3$. Note that in the third embodiment described below, only the portions that differ from the automatic transmission $1_1$ according to the first embodiment, will be explained. The other portions are substantially identical, and thus their description will be omitted.

The automatic transmission $1_3$ according to the third embodiment has a structure that, in contrast to the automatic transmission $1_1$ of the first embodiment, is modified such that the hydraulic servo 30 of the second clutch C-2 and the hydraulic servo 20 of the first clutch C-1 are disposed axially intermediate the planetary gear set DP and the planetary gear unit PU, and specifically, the hydraulic servo 30 of the second clutch C-2 is disposed axially intermediate the counter gear 15 and the hydraulic servo 20 of the first clutch C-1 and adjacent to a support wall 120, and the hydraulic servo 20 of the first clutch C-1 is disposed axially intermediate the hydraulic servo 30 of the second clutch C-2 and the hydraulic servo 40 of the third clutch C-3 on the support wall 120.

Specifically, in the automatic transmission $1_3$, the hydraulic servo 40 of the third clutch C-3, the hydraulic servo 20 of the first clutch C-1, the hydraulic servo 30 of the second clutch C-2, and the counter gear 15 are located axially intermediate the planetary gear set DP and the planetary gear unit PU, and the hydraulic servo 50 of the fourth clutch C-4 and the hydraulic servo 60 of the first brake B-1 are located on the side of the planetary gear unit PU that is axially opposite the planetary gear set DP.

In the automatic transmission $1_3$, because the fourth clutch C-4 is located in the transfer path to connect the input shaft 12 and the sun gear S2, the second clutch C-2 is located in the transfer path to connect the carrier CR1 and the carrier CR2, and the output side transfer member 103 of the second clutch C-2 is linked to the axial side of the carrier CR2 facing the planetary gear set DP, it is possible to eliminate need for a member enclosing the planetary gear unit PU. Thereby, the automatic transmission $1_3$ can be made more radially compact. In addition, it is possible to shorten the transfer member that requires a high rigidity, to reduce the weight, and to improve the controllability of the automatic transmission $1_3$. Furthermore, this structure facilitates the supply and discharge of lubricating oil, and ensures the cooling performance. In addition, the assembly of the automatic transmission $1_3$ can be simplified. Furthermore, because the structure includes a support wall 120 through which the working oil for the clutches can be supplied, it is possible to reduce the number of seal rings, to reduce the sliding resistance of the seal rings, and to improve the power transfer efficiency of the automatic transmission $1_3$.

In addition, because the hydraulic servo 30 of the second clutch C-2 is disposed axially intermediate the planetary gear unit PU and the planetary gear set DP, it is possible to supply working oil to the hydraulic servo 30 of the second clutch C-2 from an oil duct provided in the support wall 120. Thereby, in comparison with a transmission in which the working oil is supplied from an oil duct in the input shaft 12, it is possible to reduce the number of seal rings, to reduce the sliding resistance of the seal rings, and to improve the power transfer efficiency of the automatic transmission $1_3$.

Furthermore, because the hydraulic servo 50 of the fourth clutch C-4 is disposed on the side of the planetary gear unit PU that is axially opposite the planetary gear set DP, it is possible to locate the friction plates 51 of the fourth clutch C-4 further radially outward, and to enlarge the surface area of the friction plates 51. Thereby it is possible to ensure transfer of a sufficient torque and at the same time reduce the number of friction plates. Furthermore, it is possible to supply working oil to the hydraulic servo 50 of the fourth clutch C-4 from an oil duct provided in the boss $3d$ that extends from one end of the case 4. Thereby, in comparison to supply of working oil from an oil duct in the input shaft 12, it is possible to reduce the number of seal rings, to reduce the sliding resistance of the seal rings, and to improve the power transfer efficiency of the automatic transmission $1_3$.

In addition, because the hydraulic servo 40 of the third clutch C-3 is disposed axially intermediate the planetary gear unit PU and the planetary gear set DP, in comparison with a structure in which the hydraulic servo 40 of the third clutch C-3 is disposed on the side of the planetary gear set DP that is axially opposite the planetary gear unit PU, it is possible to shorten the distance between the third clutch C-3 and the planetary gear unit PU and to shorten the output side transfer member 101 of the third clutch C-3, which member requires strength for transferring a high torque. Thereby, it is possible to reduce the weight and improve the controllability of automatic transmission $1_3$.

In addition, because the hydraulic servo 20 of the first clutch C-1 is located axially intermediate the planetary gear unit PU and the planetary gear set DP, in comparison to a structure in which the hydraulic servo 20 of the third clutch C-1 is disposed on the side of the planetary gear set DP that is axially opposite the planetary gear unit PU, it is possible to shorten the distance between the first clutch C-1 and the planetary gear unit PU and to shorten the output side transfer member 102 of the first clutch C-1, which requires strength for transferring a high torque. Thereby, it is possible to reduce the weight and to improve the controllability of the automatic transmission $1_3$.

In addition, because of provision of a first brake B-1 that stops the rotation of the sun gear S2 by locking to the case 4 and the because hydraulic servo 60 of the first brake B-1 is disposed on the side of the planetary gear unit PU that is axially opposite the planetary gear set DP, it is possible to link the locking force transfer member of the first brake B-1 and the sun gear S2 without a complicated configuration of these members and to make the automatic transmission $1_3$ more compact.

In the automatic transmission $1_3$, the transfer member 103 of the output side of the second clutch C-2 is linked to the carrier CR2 through the radially outer side of the transfer members 101, 102 of the output side of the third and first clutches C-3, C-1, the transfer member 104 of the output side of the fourth clutch C-4 and the transfer member 101 of the output side of third clutch C-3 are connected to the sun gear S2, and the transfer member 104 of the output side of the fourth clutch C-4, the transfer member 101 of the output side of third clutch C-3, and the sun gear S2, which rotates integrally, are disposed on the radially inner side of the transfer member 102 of the output side of the first clutch C-1. Therefore, the transfer member 104 of the output side of the fourth clutch C-4, which rotates faster than the transfer member 103 of the output side of the second clutch C-2, is located more radially inward than the transfer member 102 of the output side of the first clutch C-1, which is on the radially inner side of the transfer member 103 of the output side of the second clutch C-2. As a result, it is possible to make the diameter of the transfer member 104 of the output side of the fourth clutch C-4 smaller than the diameter of the transfer member 103, and it is possible to reduce the weight as compared with a structure in which transfer member 104 is on the outer side. In addition, because the inertia is reduced as compared to the case in which transfer member 104 is disposed on the outer side, it is possible to improve the controllability of the automatic transmission $1_3$.

In addition, the third and first clutches C-3, C-1 are disposed on the side of the planetary gear set DP, the transfer members 101, 102 of the output side of the third and first clutches C-3, C-1 are linked respectively to the sun gear S2 and the sun gear S3, the fourth clutch C-4 is located on the side of the planetary gear unit PU that is axially opposite the planetary gear set DP, the transfer member 104 is linked to the sun gear S2, the second clutch C-2 is disposed on the side of the planetary gear set DP, and the transfer member 103 is linked to the carrier CR2 through the outer side of the transfer members 101, 102. Thereby, because the transfer member 104, which rotates faster than the transfer member 103, is on the radially inner side, the diameter of the transfer member 104 can be made smaller than the diameter of the transfer member 103, and it is possible to reduce the weight as compared to a structure in which the transfer member 104 is disposed on the outer side. In addition, because inertia is reduced as compared to the case in which transfer member 104 is on the outside of transfer member 103, it is possible to improve the controllability of the automatic transmission $1_3$.

In addition, in comparison to a structure in which the hydraulic servo 50 of the fourth clutch C-4 is located between the planetary gear unit PU and the planetary gear set DP, it is possible to locate the friction plates 51 of the fourth clutch C-4 more radially outward, and it is possible to increase the area of the friction plates. Thus, it is possible to ensure transfer of a sufficient torque, and to reduce the number of friction plates 51. Furthermore, it is possible to shorten the distance between the third and first clutches C-3, C-1 and the planetary gear unit PU and to shorten the transfer members 101, 102 of the output sides of the third and first clutches C-3, C-1, which must be strong in order to transfer a high torque. It is thereby possible to decrease the weight, and to improve the controllability of the automatic transmission $1_3$.

Furthermore, by supplying the working oil to the hydraulic servo 50 of the fourth clutch C-4 from an oil duct c50 in the boss 3b, in comparison to a transmission in which the working oil is supplied from an oil duct in the input shaft 12, it is possible to reduce the number of seal rings, to reduce the sliding resistance of the seal rings, and to improve the power transfer efficiency of the automatic transmission $1_3$.

In addition, because the transfer member of the input side of the fourth clutch C-4 is linked to the input shaft 12 and the intermediate shaft 13 on the inner side of the planetary gear unit PU and a portion of the transfer member of the input side of the fourth clutch C-4 forms the clutch drum 52 of the hydraulic servo 50 of the fourth clutch C-4, in comparison to a structure in which the transfer member of the output side of the fourth clutch C-4 forms the clutch drum of the hydraulic servo 50, the clutch drum of the hydraulic servo 50 can also serve to transfer power from the input shaft 12, and thus it is possible to form the transfer member more axially compact.

Furthermore, because counter gear 15 is linked to the ring gear R3 and is disposed axially intermediate the planetary gear unit PU and the planetary gear set DP, because there is an axially extending support member 120a that is integral with the support wall 120 that extends radially from the case 4 and the counter gear 15 is mounted on the support member 120a, because the hub member 112 of the second clutch C-2 extends around the outer side of the third and first clutches C-3, C-1 to link with the carrier CR1, because a portion of the transfer member 103 of the output side of the second clutch C-2 forms the clutch drum 32 of the hydraulic servo 30 of the second clutch C-2, and because the hydraulic servo 30 is disposed around the support member 120a between the planetary gear set DP and counter gear 15, it is possible to supply the working oil to the hydraulic servo 30 of the second clutch C-2 from an oil duct c30 that is provided in the support member 120a. Thus, in comparison to a structure in which, for example, the working oil is supplied from an oil duct in the input shaft 12, it is possible to reduce the number of seal rings, to reduce the sliding friction of the seal rings, and to improve the power transfer efficiency of the automatic transmission $1_3$.

In addition, the transfer member 102 of the output side of the first clutch C-1 is connected to the sun gear S3, a portion of the transfer member 102 of the output side of the first clutch C-1 forms the clutch drum 22 of the hydraulic servo 20 of the first clutch C-1, the hydraulic servo 20 is disposed around the support member 120a axially intermediate the planetary gear set DP and the hydraulic servo 30 of the second clutch C-2, the transfer member 101 of the output side of the third clutch C-3 is connected to the sun gear S2, a portion of the transfer member 101 of the output side of the third clutch C-3 forms the clutch drum 42 of the hydraulic servo 40 of the third clutch C-3, and the hydraulic servo 40 is disposed axially intermediate the planetary gear set DP and hydraulic servo 20 the first clutch C-1. Therefore, it is possible to supply the working oil to the hydraulic servo 20 of the first clutch C-1 from an oil duct c20 that runs through the support wall 120 and the support member 120a. Thus, in comparison to a structure in which, for example, the working oil is supplied from an oil duct in the input shaft 12, it is possible to reduce the number of seal rings, to reduce the sliding resistance of the seal rings, and to improve the power transfer efficiency of the automatic transmission $1_3$. In addition, because the hydraulic servo 40 of the third clutch C-3 is located axially intermediate the planetary gear unit PU and the planetary gear set DP, in comparison to a structure in which, for example, the hydraulic servo 40 of the third clutch C-3 is disposed on the side of the planetary gear set DP that is axially opposite the planetary gear unit PU, it is possible to shorten the distance between the third clutch C-3 and the planetary gear unit PU and to shorten the transfer member 101 of the output side of the third clutch C-3 which must be strong in order to transfer high torque. It is thereby possible to reduce the weight and to improve the controllability of the automatic transmission.

Furthermore, because counter shaft 81 is arranged in parallel with the input shaft 12 and linked via the counter gear 15 that is linked to the ring gear R3 and because the output rotation from the ring gear R3 is transferred to the counter shaft 81 via the counter gear 15, it is possible to advantageously use the automatic transmission $1_3$ in an FF-type vehicle.

In addition, because the counter gear 15 is disposed axially intermediate the planetary gear unit PU and the planetary gear set DP and is supported by a support member 120*a* that is integral with the support wall 120 that extends from the case 4, it is possible to locate the counter gear 15 axially closer to the input side. For example, it is possible to locate the counter shaft portion 80 and the differential gear portion 90 near the torque converter 7, thereby making the automatic transmission $1_3$ more compact. Thus, it is possible to prevent interference between the transmission and the frame of the vehicle, and it is possible to facilitate the mounting of the automatic transmission $1_3$ in the vehicle.

Furthermore, because the carrier CR1 is linked to the input shaft 12 on the side of to the planetary gear set DP facing the planetary gear unit PU and is linked to the hub member 112, which is the transfer member of the input side of the second clutch C-2, on the side of the planetary gear set DP that is axially opposite the planetary gear unit PU, it is possible to link the carrier CR1, the transfer member 112 of the input side of the second clutch C-2, and the input shaft 12 without need for any complicated configuration of these components, and to make the automatic transmission $1_3$ more compact.

In addition, because the hub member 116 of the first brake B-1 and the transfer member 104 are axially connected to the sun gear S2 on the side of the planetary gear unit PU that is axially opposite the planetary gear set DP, it is possible to link the hub member 116 of the first brake B-1, the transfer member 104, and the sun gear S2 without complicated configuration, and to make the automatic transmission $1_3$ more compact.

In addition, because the planetary gear set DP includes a sun gear S1 which is normally held against rotation, a carrier CR1 that rotatably supports the pinion gear P1 and the pinion gear P2 and is coupled to the input shaft 12, and a ring gear R1 that meshes with the pinion gear P2 and outputs a reduced speed rotation, it is possible to output from the ring gear R1 a reduced speed rotation slower than the input rotation of the input shaft 12.

In addition, because the planetary gear unit PU is a Ravigneaux-type planetary gear unit PU that includes a sun gear S2, a sun gear S3, short pinion P3 that meshes with the sun gear S3, a long pinion P4 that meshes with the sun gear S2 and with the short pinion P3, a carrier CR2 that rotatably supports the short pinion P3 and the long pinion P4, and the ring gear R3 that meshes with the long pinion P4, it is possible to prevent high speed rotation of each of the rotary members and to provide favorable gear ratios while enabling each of the rotary elements of the planetary gear unit PU and the output side members of each of the clutches and brakes to be linked without any complicated structure.

The first forward speed can be established by engaging the first clutch C-1 and locking the second brake B-2; the second forward speed can be established by engaging the first clutch C-1 and locking the first brake B-1; the third forward speed can be established by engaging the first clutch C-1 and the third clutch C-3; the fourth forward speed can be established by engaging the first clutch C-1 and the fourth clutch C-4; the fifth forward speed can be established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In addition, in a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, the carrier CR2, and the ring gear R3 are shown on the abscissa, the sun gear S2 is positioned at the left end of the abscissa and the carrier CR2, the ring gear R3 that is linked to the counter gear 15, and the sun gear S3 are arranged in sequence to the right.

Note that the automatic transmission $1_3$ according to the third embodiment can form the automatic transmission $1_8$ according to an eighth embodiment described below by rotating the speed change mechanism $2_3$ left-right.

Fourth Embodiment

Figure 7:
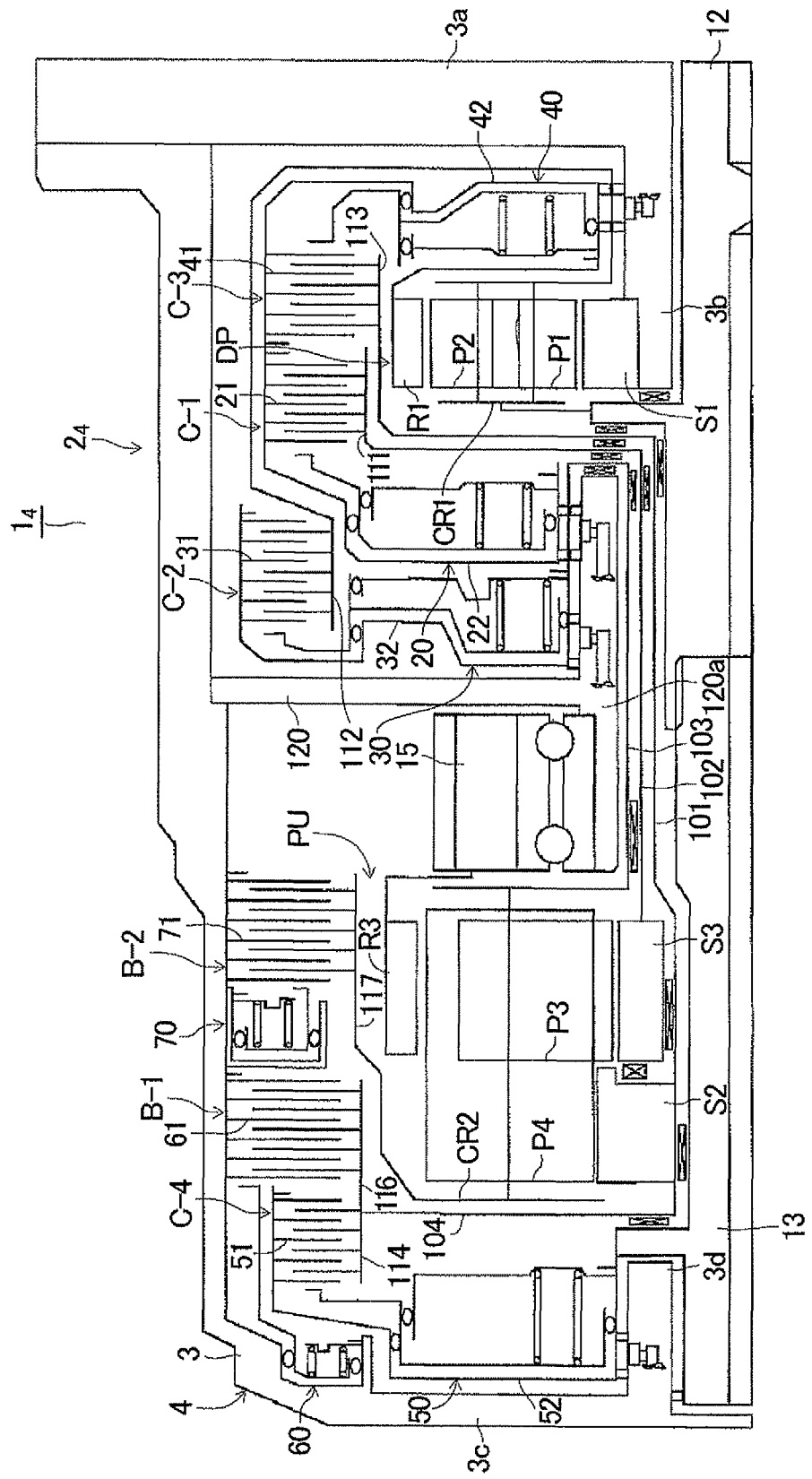
FIG. 7 is an enlarged cross-sectional view of an automatic transmission $1_4$ according to a fourth embodiment.

Next, a fourth embodiment, in which a portion of the first embodiment has been modified, will be explained with reference to FIG. 7 which is a cross-section of an automatic transmission $1_4$ according to the fourth embodiment. Note that in describing the fourth embodiment below, only those features that differ from the automatic transmission $1_1$ according to the first embodiment will be explained. The other features are substantially identical and thus their explanations will be omitted.

The automatic transmission $1_4$ of the fourth embodiment is a modification to the automatic transmission $1_1$ of the first embodiment, wherein the hydraulic servo 30 of the second clutch C-2 and the hydraulic servo 20 of the first clutch C-1 are located axially intermediate the planetary gear set DP and the planetary gear unit PU, and the hydraulic servo 40 of the third clutch C-3 is disposed on the side of the planetary gear set DP that is axially opposite the planetary gear unit PU. Specifically, the hydraulic servo 30 of the second clutch C-2 is located axially intermediate the counter gear 15 and the hydraulic servo 20 of the first clutch C-1 and adjacent to a support wall 120, the hydraulic servo 20 of the first clutch C-1 is located on the support wall 120, axially intermediate the hydraulic servo 30 of the second clutch C-2 and the planetary gear set DP, and the hydraulic servo 40 of the third clutch C-3 is located on the boss 3*b*.

Specifically, in this automatic transmission $1_4$, the hydraulic servo 40 of the third clutch C-3 is located on the side of the planetary gear set DP that is axially opposite the planetary gear unit PU. The hydraulic servo 20 of the first clutch C-1, the hydraulic servo 30 of the second clutch C-2, and the counter gear 15 are located axially intermediate the planetary gear set DP and the planetary gear unit PU, and the hydraulic servo 50 of the fourth clutch C-4 and the hydraulic servo 60 of the first brake B-1 are located on the side of the planetary gear unit PU that is axially opposite the planetary gear set DP.

In the automatic transmission $1_4$ described above, because the fourth clutch C-4 is interposed in the transfer path to selectively connect the input shaft 12 and the sun gear S2, because the second clutch C-2 is interposed in the transfer path to selectively connect the carrier CR1 and the carrier CR2, and because the output side transfer member 103 of the second clutch C-2 is linked to the carrier CR2 at the side facing the planetary gear set DP, need for a member enclosing the planetary gear unit PU is eliminated and the automatic transmission $1_4$ can be more radially compact. In addition, it is possible to shorten the transfer member that requires a high rigidity, to reduce the weight, and to improve the controllability of the automatic transmission $1_4$. Furthermore, the structure allows the lubricating oil to be readily discharged, and the cooling performance to be ensured. In addition, the assembly of the automatic transmission $1_4$ is simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_4$.

In addition, because the hydraulic servo 30 of the second clutch C-2 is located axially intermediate the planetary gear unit PU and the planetary gear set DP, it is possible to supply the working oil to the hydraulic servo 30 of the second clutch C-2 from an oil duct that is provided in the support wall 120. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_4$.

Furthermore, because the hydraulic servo 50 of the fourth clutch C-4 is disposed on the side of the planetary gear unit PU that is axially opposite the planetary gear set DP, it is possible to locate the friction plates 51 of the fourth clutch C-4 on the radially outer side and to enlarge the surface area of the friction plates 51, and thus, it is possible to ensure transfer of a sufficient torque, while reducing the number of friction plates. Furthermore, because working oil is supplied to the hydraulic servo 50 of the fourth clutch C-4 from an oil duct in the boss 3d. In comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_4$.

In addition, because the hydraulic servo 40 of the third clutch C-3 is disposed on the side of the planetary gear set DP that is axially opposite the planetary gear unit PU, it is possible to supply the working oil to the hydraulic servo 40 of the third clutch C-3 from an oil duct in the boss 3b. Thereby, as compared to a structure wherein the working oil is supplied from an oil duct in the input shaft 12, it is possible to reduce the number of seal rings, to reduce the sliding resistance of the seal rings, and to improve the power transfer efficiency of the automatic transmission $1_4$.

Furthermore, because the hydraulic servo 20 of the first clutch C-1 is located axially intermediate the planetary gear set DP and the planetary gear unit PU, in comparison to a structure in which the hydraulic servo 20 of the first clutch C-1 is disposed on the side of the planetary gear set DP that is axially opposite the planetary gear unit PU, it is possible to shorten the distance between the first clutch C-1 and the planetary gear unit PU, to shorten the output side transfer member 102 of the first clutch C-1, which must be strong in order to transfer high torque, to reduce weight, and to improve the controllability of the automatic transmission $1_4$.

In addition, because a first brake B-1 selectively locks the sun gear S2 against rotation and the hydraulic servo 60 of the first brake B-1 is disposed on the side of planetary gear unit PU that is axially opposite the planetary gear set DP, the locking force transfer member of the first brake B-1 and the sun gear S2 can be linked without a complicated configuration, and it is possible to make the automatic transmission $1_4$ more compact.

In the automatic transmission $1_4$ according to the present invention, the transfer member 103 of the output side of the second clutch C-2 is on the radially outer side of the transfer members 101, 102 of the output side of the third and first clutches C-3, C-1, the transfer member 104 of the output side of the fourth clutch C-4 and the transfer member 101 of the output side of third clutch C-3 are linked to the sun gear S2, and the transfer member 104 of the output side of the fourth clutch C-4, the transfer member 101 of the output side of third clutch C-3, and the sun gear S2, which rotate integrally, are radially inward of the transfer member 102 of the output side of the first clutch C-1. Therefore, the transfer member 104, which rotates faster than the transfer member 103, is located more radially inward than the transfer member 102, which is on the radially inner side of the transfer member 103. As a result, it is possible to make the diameter of the transfer member 104 smaller than the diameter of the transfer member 103, and it is possible to reduce weight as compared to a structure in which transfer member 104 is on the radially outer side. In addition, because the inertia is reduced in comparison to a structure in which transfer member 104 is located on the radially outer side, it is possible to improve the controllability of the automatic transmission $1_4$.

The third and first clutches C-3, C-1 are located on the planetary gear set DP side relative to the planetary gear set PU, the transfer members 101, 102 of the output side of the third and first clutches C-3, C-1 are linked respectively to the sun gear S2 and the sun gear S3, the fourth clutch C-4 is located on the side of the planetary gear unit PU that is axially opposite the planetary gear set DP, the transfer member 104 of the output side of the fourth clutch C-4 is linked to the sun gear S2, the second clutch C-2 is disposed on the planetary gear set DP side relative to the planetary unit PU, and the transfer member 103 is linked to the carrier CR2 on the radially outer side of the transfer members 101, 102. Because the transfer member 104 of the output side of the fourth clutch C-4, which rotates faster than the transfer member of the output side of the second clutch C-2, is on the radially inner side, the diameter of the transfer member 104 is smaller than the diameter of the transfer member 103, and it is possible to reduce the weight as compared to a structure in which transfer member 104 is disposed on the radially outer side. In addition, because it is possible to reduce the inertia as compared to a structure in which transfer member 104 is on the outside, it is possible to improve the controllability of the automatic transmission $1_4$.

In addition, in comparison to a structure in which the hydraulic servo 50 of the fourth clutch C-4 is located between the planetary gear unit PU and the planetary gear set DP, it is possible to locate the friction plates 51 of the fourth clutch C-4 more radially outward, and to increase the area of the friction plates. Thus, it is possible to ensure transfer of a sufficient torque, and to reduce the number of friction plates 51. Furthermore, it is possible to shorten the distance between the third and first clutches C-3, C-1 and the planetary gear unit PU, and to shorten the transfer members 101, 102 of the output side of the third and first clutches C-3, C-1, which must be strong in order to transfer a high torque. It is thereby possible to decrease the weight and to improve the controllability of the automatic transmission $1_4$.

The working oil to the hydraulic servo 50 of the fourth clutch C-4 is supplied from an oil duct c50 in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_4$.

In addition, because the transfer member of the input side of the fourth clutch C-4 is linked to the input shaft 12 and the intermediate shaft 13 on the inner side of the planetary gear unit PU and a portion of the transfer member of the input side of the fourth clutch C-4 forms the clutch drum 52 of the hydraulic servo 50 of the fourth clutch C-4, as compared to the case in which the transfer member of the output side of the fourth clutch C-4 forms the clutch drum of the hydraulic servo 50, the clutch drum of the hydraulic servo 50 can also serve as a transfer member that transfers power from the input shaft 12, and thus it is possible to make the transfer member more axially compact.

Furthermore, because counter gear 15 is linked to the ring gear R3, is located axially intermediate the planetary gear unit set PU and the planetary gear set DP and is mounted on a support member 120a, because the hub member 112 of the second clutch C-2 is linked to the carrier CR1 on the radially outer side of the third and first clutches C-3, C-1, because a portion of the transfer member 103 of the output side of the second clutch C-2 forms the clutch drum 32 of the hydraulic servo 30 of the second clutch C-2, and because the hydraulic servo 30 is disposed around the support member 120a between the planetary gear set DP and counter gear 15, it is possible to supply the working oil to the hydraulic servo 30 of the second clutch C-2 from an oil duct c30 in the support member 120a. Thus, in comparison to a structure in which, for example, the working oil is supplied from an oil duct in the input shaft 12, it is possible to reduce the number of seal rings, to reduce the sliding friction of the seal rings, and to improve the power transfer efficiency of the automatic transmission $1_4$.

The boss 3b extends from the side wall 3a of the case 4 and holds the sun gear S1 stationary. The transfer member of the input side of the third clutch C-3 is linked to the ring gear R1, a portion thereof forms the clutch drum 42 of the hydraulic servo 40 of the third clutch C-3. The hydraulic servo 40 is located on the boss 3b axially intermediate the planetary gear set DP and the side wall 3a. The transfer member of the input side of the first clutch C-1 is linked to the transfer member of the input side of the third clutch C-3, and a portion thereof forms the clutch drum 22 of the hydraulic servo 20 of the first clutch C-1, the hydraulic servo 20 being mounted on the support member 120a axially intermediate the planetary gear set DP and the hydraulic servo 30 of the second clutch C-2. Therefore, it is possible to supply the working oil to the hydraulic servo 40 of the third clutch C-3 from an oil duct c40 in the boss 3b. Thus, in comparison to a structure in which the hydraulic servo 40 of the third clutch C-3 is arranged around the input shaft 12 spaced from the boss 3b and the working oil is supplied via an oil duct in the input shaft 12, it is possible to shorten the length of the oil duct by an amount equivalent to the length of the oil duct in the input shaft 12 which is eliminated, and it is possible to improve the controllability of the automatic transmission $1_4$. Because the working oil is supplied to the hydraulic servo 20 of the first clutch C-1 from an oil duct c20 extending through the support wall 120 and the support member 120a, as compared to a structure in which, for example, the working oil is supplied from an oil duct in the input shaft 12, it is possible to reduce the number of seal rings, to reduce the sliding resistance of the seal rings, and to improve the power transfer efficiency of the automatic transmission $1_4$.

Because counter shaft 81 is arranged in parallel with the input shaft 12 and is linked via the counter gear 15 to the ring gear R3 and the output rotation from the ring gear R3 is transferred to the counter shaft 81 via the counter gear 15, it is possible to advantageously use the automatic transmission $1_4$ in an FF-type vehicle.

In addition, because the counter gear 15 is located axially intermediate the planetary gear unit PU and the planetary gear set DP and is supported by support member 120a, it is possible to locate the counter gear 15 closer to the input side. For example, it is possible to position the counter shaft portion 80 and the differential gear portion 90 near the torque converter 7 side, and to thereby make the automatic transmission $1_4$ more compact and to prevent interference between the transmission, differential, etc. and the frame of the vehicle, and to facilitate the mounting of the automatic transmission $1_4$ in the vehicle.

Furthermore, because the carrier CR1 is linked to the input shaft 12 on the planetary gear unit PU relative to the planetary gear set DP and is axially linked to the hub member 112, which is the transfer member of the input side of the second clutch C-2, on the side of the planetary gear set DP that is axially opposite the planetary gear unit PU, it is possible to link the carrier CR1, the transfer member 112 of the input side of the second clutch C-2, and the input shaft 12 without making any complicated configuration, and it is possible to make the automatic transmission $1_4$ more compact.

In addition, because the hub member 116 of the first brake B-1 and the transfer member 104 are axially linked to the sun gear S2 on the side of the planetary gear unit PU that is axially opposite the planetary gear set DP, it is possible to link the hub member 116 of the first brake B-1, the transfer member 104, and the sun gear S2 without making these members complicated, and to make the automatic transmission $1_4$ more compact.

The planetary gear set DP includes the sun gear S1, which is normally held stationary, a carrier CR1 that rotatably supports the pinion gear P1 and the pinion gear P2 and that is coupled to the output shaft 12, and a ring gear R1 that meshes with the pinion gear P2 and outputs a reduced speed rotation. Therefore, it is possible to output rotation at a reduced speed, relative to the input rotation of the input shaft 12, from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and meshes with the short pinion P3, the carrier CR2 that rotatably supports the short pinion P3 and the long pinion P4, and the ring gear R3 that meshes with the long pinion P4, it is possible to prevent high speed rotation of each of the rotary elements and to provide advantageous gear ratios while enabling each of the rotary elements of the planetary gear unit PU and the output side members of each of the clutches and brakes to be linked without any complicated configuration.

The first forward speed can be established by engaging the first clutch C-1 and locking the second brake B-2; the second forward speed can be established by engaging the first clutch C-1 and locking the first brake B-1; the third forward speed can be established by engaging the first clutch C-1 and the third clutch C-3; the fourth forward speed can be established by engaging the first clutch C-1 and the fourth clutch C-4; the fifth forward speed can be established by engaging the first clutch C-1 and the second clutch C-2; the sixth forward speed can be established by engaging the second clutch C-2 and the fourth clutch C-4; the seventh forward speed can be established by engaging the second clutch C-2 and the third clutch C-3; the eighth forward speed can be established by engaging the second clutch C-2 and locking the first brake B-1; and reverse speeds can be established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the far left end of the abscissa and, in sequence from the left, are the carrier CR2, the ring gear R3 that is linked to the counter gear 15, and the sun gear S3.

Note that if the speed change mechanism $2_4$ of the automatic transmission $1_4$ of the fourth embodiment is rotated left-right 180°, the result is the automatic transmission $1_9$ of the ninth embodiment.

Fifth Embodiment

Next, a fifth embodiment, in which a portion of the first embodiment is modified, will be explained with reference to FIG. 8 to FIG. 10. In describing the fifth embodiment, only those features that differ from the automatic transmission $1_1$ according to the first embodiment will be explained. The other features/components are substantially identical, and their description will be omitted.

The automatic transmission $1_5$ of the fifth embodiment differs from the automatic transmission $1_1$ of the first embodiment, in that the hydraulic servo 30 of the second clutch C-2, the hydraulic servo 20 of the first clutch C-1, and the hydraulic servo 50 of the fourth clutch C-4 are all located axially intermediate the planetary gear set DP and the planetary gear unit PU, and the hydraulic servo 40 of the third clutch C-3 is located on the side of the planetary gear set DP that is axially opposite the planetary gear unit PU. Specifically, the hydraulic servo 30 of the second clutch C-2 is located axially intermediate the counter gear 15 and the hydraulic servo 20 of the first clutch C-1 and adjacent the support wall 120, the hydraulic servo 20 of the first clutch C-1 is located on the support member 120a axially intermediate the hydraulic servo 30 of the second clutch C-2 and the hydraulic servo 50 of the fourth clutch C-4, the hydraulic servo 50 of the fourth clutch C-4 is located axially intermediate the hydraulic servo 20 of the first clutch C-1 and the planetary gear set DP, and the hydraulic servo 40 of the third clutch C-3 is located on the boss 3b.

Specifically, in the automatic transmission $1_5$, the hydraulic servo 40 of the third clutch C-3 is disposed on the side of the planetary gear set DP that is axially opposite the planetary gear unit PU. The hydraulic servo 50 of the fourth clutch C-4, the hydraulic servo 20 of the first clutch C-1, the hydraulic servo 30 of the second clutch C-2, and the counter gear 15 are located axially intermediate the planetary gear set DP and the planetary gear unit PU, and the hydraulic servo 60 of the first brake B-1 is disposed on the side of the planetary gear unit PU that is axially opposite the planetary gear set DP.

Because the fourth clutch C-4 is on the input shaft 12, it is possible to eliminate continuous transfer of the input rotation to the intermediate shaft 13. Thus, the input shaft 12 and the intermediate shaft 13 can be separated so as to selectively rotate relative to each other, the intermediate shaft 13 can be used as a power transfer member that transfers the reduced speed rotation from the third clutch C-3 and the input rotation from the fourth clutch C-4, that is, the intermediate shaft 13 can receive rotation from both the output side transfer member 101 of the third clutch C-3 and the output side transfer member 104 of the fourth clutch C-4. Thereby, in comparison to a structure in which the transfer member 101 is covered on the intermediate shaft 13, it is possible to reduce the sliding resistance, and it is possible to improve the transfer efficiency of the automatic transmission $1_5$.

Figure 8:
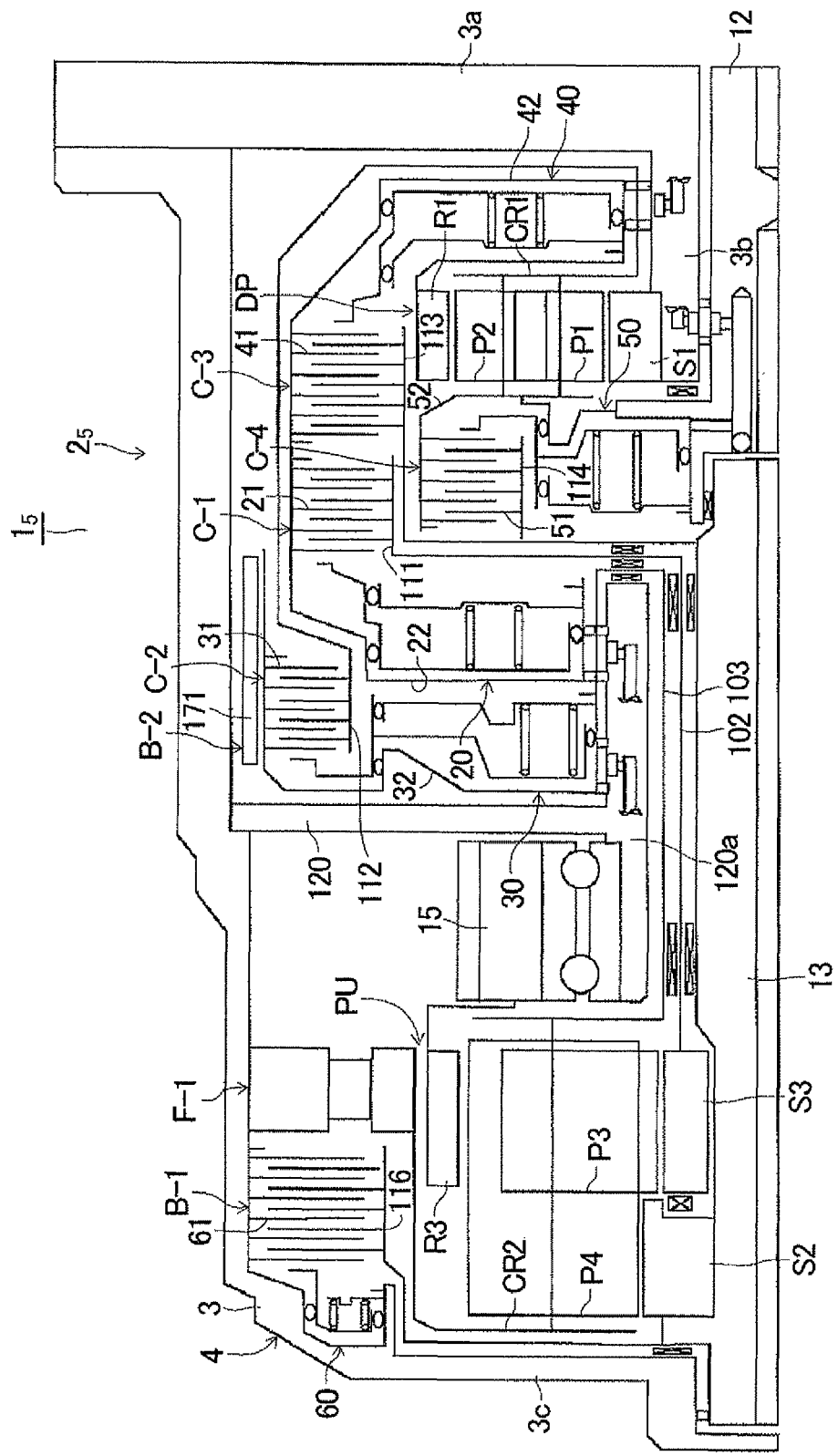
FIG. 8 is a cross-sectional view of an automatic transmission $1_5$ according to a fifth embodiment.
Figure 9:
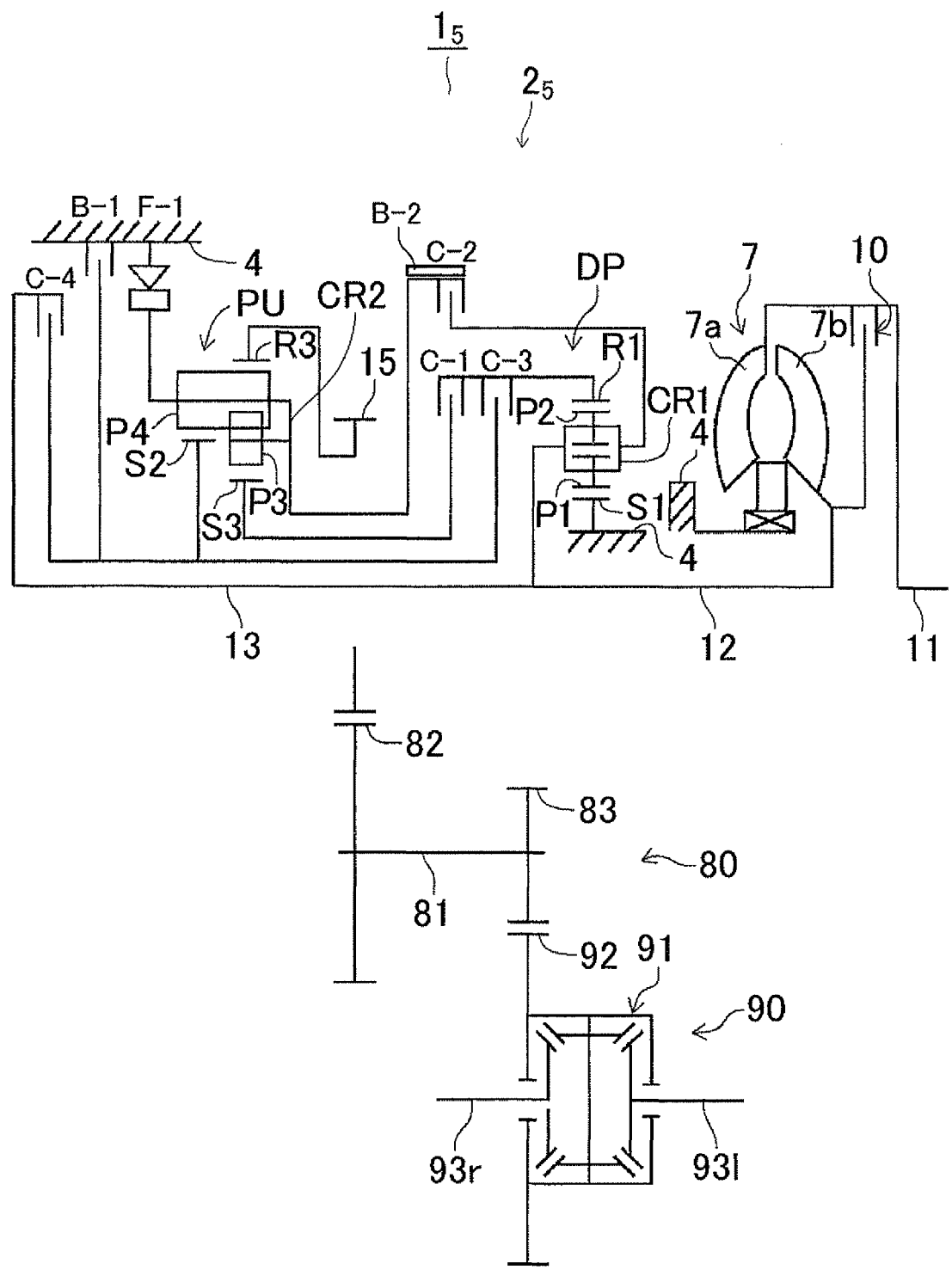
FIG. 9 is a skeletal view drawing of an automatic transmission $1_5$ according to a fifth embodiment.

As shown in FIG. 8 and FIG. 9, the second brake B-2 is what is termed a band brake that locks the clutch drum 32 of the second clutch C-2 to the case 4 by tightening a brake band 171 on the clutch drum 32, and is provided with a one-way clutch F-1 that restricts the rotation of the carrier CR2 of the planetary gear unit PU to one direction.

In the D (drive) range and in the first forward speed (1st), as shown in FIG. 10, the first clutch C-1 and the one-way clutch F-1 are engaged. Thus, as shown in FIG. 9 (and also refer to FIG. 5), the rotation of the ring gear R1, at a speed which is reduced by the sun gear S1, which is stationary, and the carrier CR1, which provides the input rotation, is input to the sun gear S3 via the first clutch C-1. In addition, the rotation of the carrier CR2 is restricted to one direction (the normal rotation direction), that is, the reverse rotation of the carrier CR2 is prevented and held stationary. Thereby, the reduced speed rotation that is input to the sun gear S3 is output to the ring gear R3 via the carrier CR2, which is stationary, and the normal rotation is output from the counter gear 15 as the first forward speed.

During engine braking (i.e., during coasting), by locking the second brake B-2, holding the carrier CR2 stationary, and preventing the normal rotation of this carrier CR2, the state of the first forward speed is maintained. In addition, in the first forward speed, because the reverse rotation of the carrier CR2 is prevented by the one-way clutch F-1 and normal rotation is permitted, establishing the first forward speed when, for example, switching from a non-travel range to a travel range, is smoothly effected by the automatic engagement of the one-way clutch F-1.

Because the second through eighth forward speeds, the first reverse speed, and the second reverse speed are established in a manner identical to the first embodiment, the explanations thereof are omitted.

In the automatic transmission $1_5$ described above, because the fourth clutch C-4 is arranged in the transfer path to connect the input shaft 12 and the sun gear S2 (See FIG. 9), the second clutch C-2 is arranged in the transfer path to connect the carrier CR1 and the carrier CR2, and the output side transfer member 103 of the second clutch C-2 is linked to the side of the carrier CR2 axially facing the planetary gear set DP, it is possible to avoid use of a member enclosing the planetary gear unit PU, whereby the automatic transmission $1_5$ can be made more radially compact. In addition, it is possible to shorten the transfer member that requires a high rigidity, to reduce the weight, and to improve the controllability of the automatic transmission $1_5$. Furthermore, the structure allows the supplied lubricating oil to be readily discharged onto lubricating points, and the cooling performance is ensured. In addition, the assembly of the automatic transmission $1_5$ can be simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_5$.

In addition, because the hydraulic servo 30 of the second clutch C-2 is located axially intermediate the planetary gear unit PU and the planetary gear set DP, it is possible to supply working oil to the hydraulic servo 30 of the second clutch C-2 from an oil duct provided in the support wall 120. Whereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_5$.

In addition, because the hydraulic servo 50 of the fourth clutch C-4 is located axially intermediate the planetary gear unit PU and the planetary gear set DP and adjacent to the planetary gear set DP, a portion of the carrier CR1 and the clutch drum 52 of the hydraulic servo 50 of the fourth clutch C-4 can be formed as a single member, (that is, the clutch drum 52 and the side plate of the carrier CR1) and thus it is possible to reduce both size and weight.

Furthermore, because the hydraulic servo 40 of the third clutch C-3 is located on the side of the planetary gear set DP that is axially opposite the planetary gear unit PU, it is possible to supply working oil to the hydraulic servo 40 of the third clutch C-3 from an oil duct provided in the boss 3b that axially extends from one end of the case 4. Thereby, in comparison to a structure in which working oil is supplied from an oil duct provided in the input shaft 12, it is possible to reduce the number of seal rings, to reduce the sliding resistance of the seal rings, and to improve the power transfer efficiency of the automatic transmission $1_5$.

In addition, because the hydraulic servo 20 of the first clutch C-1 is located on the side of the planetary gear unit PU that is axially opposite the planetary gear set DP, it is possible to supply working oil to the hydraulic servo 20 of the first clutch C-1 from an oil duct provided in the support wall 120. Whereby, in comparison to a structure in which working oil is supplied from an oil duct in the input shaft 12, it is possible to reduce the number of seal rings, and to reduce the sliding resistance of the seal rings, and to improve the power transfer efficiency of the automatic transmission $1_5$.

Furthermore, because a first brake B-1 that selectively locks the sun gear S2 to the case 4 and the hydraulic servo 60 of the first brake B-1 is located on the side of planetary gear unit PU that is axially opposite the planetary gear set DP, the locking force transfer member of the first brake B-1 and the sun gear S2 can be linked without a complicated structure, and it is possible to make the automatic transmission $1_5$ more compact.

In the automatic transmission $1_5$, the transfer member 103 of the output side of the second clutch C-2, which is linked to the carrier CR2, is on the radially outer side of the transfer members 101, 102, the intermediate shaft 13, which in this embodiment is the transfer member of the output side of the fourth clutch C-4, and the transfer member 101 of the output side of third clutch C-3 are linked to the sun gear S2. The intermediate shaft 13, the transfer member 101 of the output side of third clutch C-3, and the sun gear S2, which rotate integrally, are radially inward of the transfer member 102 of the output side of the first clutch C-1. Therefore, the intermediate shaft 13, which is the transfer member of the output side of the fourth clutch C-4, which rotates faster than the transfer member 103 of the output side of the second clutch C-2, is more radially inward than the transfer member 102 of the output side of the first clutch C-1, which is on the inner circumferential side of the transfer member 103 of the output side of the second clutch C-2. Thus, it is possible to make the diameter of the intermediate shaft 13 smaller than the diameter of the transfer member 103, and to reduce weight as compared with a structure in which transfer member 104 is on the radially outer side. In addition, because the inertia is reduced in comparison to a structure in which the transfer member 104 is located on the radially outer side, it is possible to improve the controllability of the automatic transmission $1_5$.

In addition, the third and first clutches C-3, C-1 are disposed on the planetary gear unit PU side of the planetary gear set DP, the transfer members 101, 102 of the output side of the third and first clutches C-3, C-1 are linked respectively to the sun gear S2 and the sun gear S3, the fourth clutch C-4 is located on the side of the planetary gear unit PU that is axially opposite the planetary gear set DP, the intermediate shaft 13 is linked to the sun gear S2, the second clutch C-2 is located axially intermediate planetary gear set DP and the planetary unit PU, and the transfer member 103 of the output side of the second clutch C-2 which is linked to the carrier CR2 axially extends radially outward of the transfer members 101, 102. Thereby, the intermediate shaft 13 which rotates faster than the transfer member of the output side of the second clutch C-2, is on the radially inner side. Thus, the diameter of the intermediate shaft 13 can be made smaller than the diameter of the transfer member 103, thus reducing the weight as compared to a structure in which the transfer member 13 (here, the intermediate shaft) is disposed on the radially outer side. In addition, because it is possible to reduce the inertia in comparison to a structure in which transfer member 104 is on the outside, it is possible to improve the controllability of the automatic transmission $1_5$.

Furthermore, because the transfer member of the input side of the fourth clutch C-4 is directly linked to the carrier CR1 and a portion of the carrier CR1 serves as a portion of the hydraulic servo 50 of the fourth clutch C-4, it is possible to use the portions of the carrier CR1 and the hydraulic servo 50 of the fourth clutch C-4 (that is, a portion of the clutch drum 52 and the side plate of the carrier CR1) in common, and to thereby reduce the weight and size.

Counter gear 15 is linked to the ring gear R3 and is located axially intermediate the planetary gear unit PU and the planetary gear set DP. A support member 120a is integral with the support wall 120 that extends from the case 4 and supports the counter gear 15. The hub member 112 of the second clutch C-2 is linked to the carrier CR1 through the radially outer side of the third and first clutches C-3, C-1. A portion of the transfer member 103 of the output side of the second clutch C-2 forms the clutch drum 32 of the hydraulic servo 30 of the second clutch C-2, and the hydraulic servo 30 is located on the support member 120a between the planetary gear set DP and counter gear 15. Therefore, it is possible to supply the working oil to the hydraulic servo 30 of the second clutch C-2 from an oil duct c30 in the support member 120a. Thus, in comparison to a structure in which, for example, the working oil is supplied from an oil duct in the input shaft 12, it is possible to reduce the number of seal rings, to reduce the sliding friction of the seal rings, and to improve the power transfer efficiency of the automatic transmission $1_5$.

Furthermore, there is a boss 3b that holds the sun gear S1 stationary, the transfer member of the input side of the third clutch C-3 is linked to the ring gear R1 and a portion of the transfer member of the input side of the third clutch C-3 forms the clutch drum 42 of the hydraulic servo 40 of the third clutch C-3, the hydraulic servo 40 is located on the boss 3b axially intermediate the planetary gear set DP and the side wall 3a, the transfer member of the input side of the first clutch C-1 is linked to the transfer member of the input side of the third clutch C-3 and a portion of the transfer member of the input side of the first clutch C-1 forms the clutch drum 22 of the hydraulic servo 20 of the first clutch C-1, and the hydraulic servo 20 is located on the support member 120a axially intermediate the planetary gear set DP and the hydraulic servo 30 of the second clutch C-2. Therefore, it is possible to supply the working oil to the hydraulic servo 40 of the third clutch C-3 from an oil duct c40 in the boss 3b. Thus, in comparison to a structure in which, for example, the hydraulic servo 40 of the third clutch C-3 is arranged on the input shaft 12 spaced from the boss 3b and the working oil is supplied via an oil duct in the input shaft 12, it is possible to shorten the length of the oil duct by an amount equivalent to the length of an oil duct in the input shaft 12, and the controllability of the automatic transmission $1_5$ is thereby improved. In addition, working oil is supplied to the hydraulic servo 20 of the first clutch C-1 from an oil duct c20 extending through the support wall 120 and the support member 120a. Thus, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_5$.

In addition, because counter shaft 81 is arranged in parallel with the input shaft 12 and is linked via the counter gear 15, in turn linked to the ring gear R3, and the output rotation from the ring gear R3 is transferred to the counter shaft 81 via the counter gear 15, it is possible to use the automatic transmission $1_5$ advantageously in an FF-type vehicle.

Furthermore, because the counter gear 15 is located axially intermediate the planetary gear unit PU and the planetary gear set DP and is supported on support member 120a, it is possible to position the counter gear 15 axially closer to the input side. For example, it is possible to position the counter shaft portion 80 and the differential gear portion 90 near the torque converter 7 side, and it is possible to make the automatic transmission $1_5$ more compact. Thereby, it is possible to prevent interference between the transmission differential, etc. and the frame of the vehicle, and to facilitate the mounting of the automatic transmission $1_5$ in the vehicle.

In addition, because the carrier CR1 is linked to the input shaft 12 on the planetary gear unit PU side of the planetary gear set DP and is axially linked to the hub member 112, which serves as the transfer member of the input side of the second clutch C-2, on the side of the planetary gear set DP that is axially opposite the planetary gear unit PU, it is possible to link the carrier CR1, the transfer member 112 of the input side of the second clutch C-2, and the input shaft 12 without making these members complicated, and to make the automatic transmission $1_5$ more compact.

In addition, because the hub member 116 of the first brake B-1 and the transfer member 104, that is linked thereto, are axially linked to the sun gear S2 on the side of the planetary gear unit PU that is axially opposite the planetary gear set DP, it is possible to link the hub member 116 of the first brake B-1, the transfer member 104, and the sun gear S2 without a component of a complicated configuration, and it is possible to make the automatic transmission $1_5$ more compact.

In addition, because the planetary gear set DP includes the sun gear S1, which is normally held so as not to rotate, a carrier CR1 that rotatably supports the pinion gear P1 and the pinion gear P2 and that is coupled to the input shaft 12, and a ring gear R1 that meshes with the pinion gear P2 and outputs a reduced speed rotation, it is possible to output a reduced speed rotation, as compared to speed of the input rotation of the input shaft 12, from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and with the short pinion P3, the carrier CR2 that rotatably supports the short pinion P3 and the long pinion P4, and the ring gear R3 that meshes with the long pinion P4, it is possible to prevent high speed rotation of each of the rotary elements and to provide advantageous gear ratios while enabling each of the rotary elements of the planetary gear unit PU and the output side members of each of the clutches and brakes to be linked without making any complicated configuration of components.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In addition, in a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, the carrier CR2, and the ring gear R3 are shown on the abscissa, the sun gear S2 is positioned at the farthest left end of the ordinate and, in sequence to the right thereof, are the carrier CR2, the ring gear R3 that is linked to the counter gear 15, and the sun gear S3.

If the speed change mechanism $2_5$ of the automatic transmission $1_5$ of the fifth embodiment is rotated left-right 180° the result approximates the automatic transmission $1_{10}$ of the tenth embodiment. However, in the automatic transmission $1_{10}$ according to the tenth embodiment, because the input rotation must be transferred to the fourth clutch C-4 through the inner circumferential side of the planetary gear unit PU, it is not possible to separate the input shaft 12 and the intermediate shaft 13.

Sixth Embodiment

Figure 11:
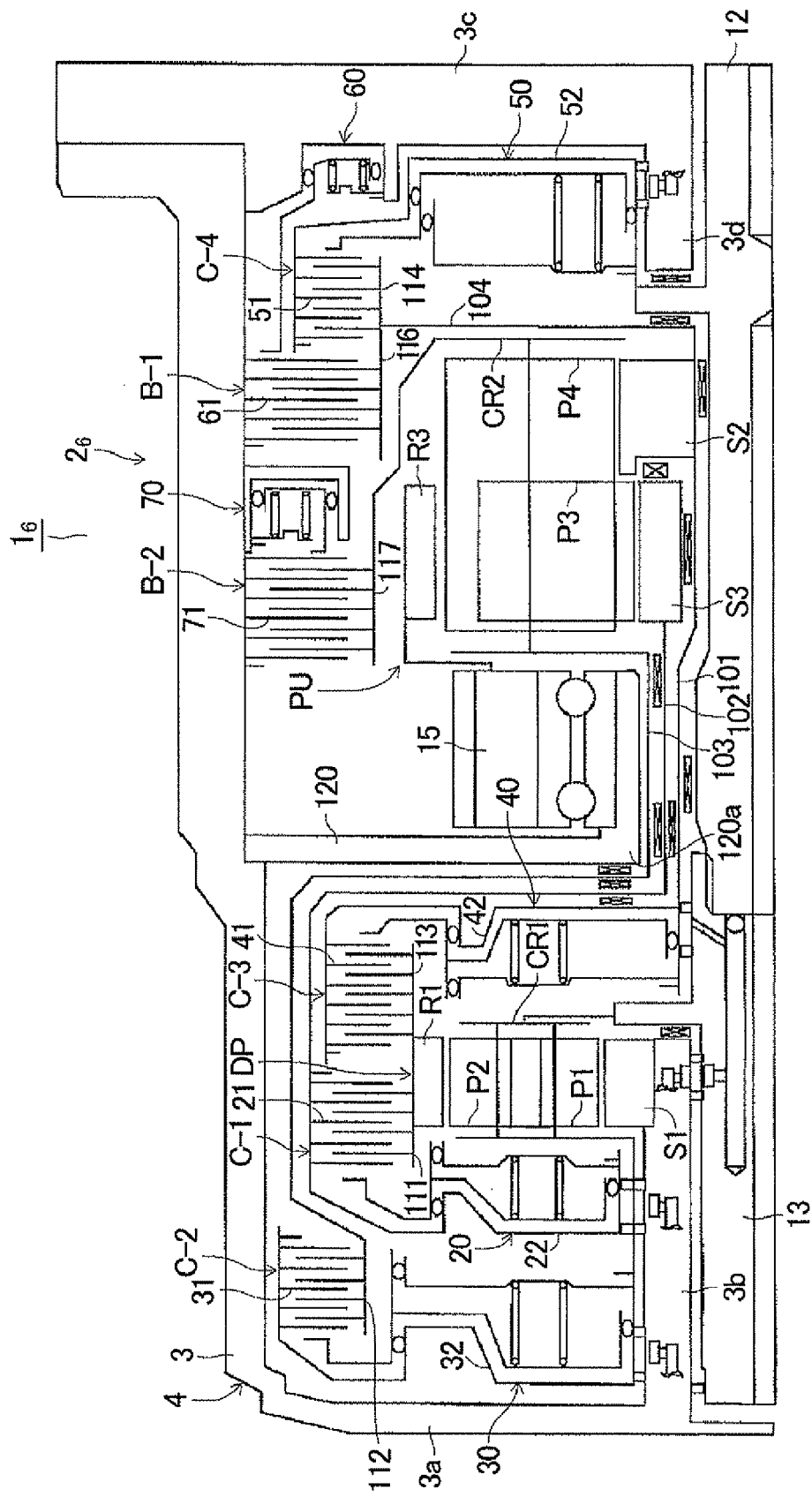
FIG. 11 is a cross-sectional view of an automatic transmission $1_6$ according to a sixth embodiment.

Next, a sixth embodiment, in which a portion of the first embodiment has been modified, will be explained with reference to FIG. 11, which is a cross-sectional view of the automatic transmission $1_6$ of the sixth embodiment. In describing the sixth embodiment below, those structures that are identical to those of the automatic transmission $1_1$ of the first embodiment are denoted by identical reference numerals, and description thereof is omitted.

In the automatic transmission $1_6$ of the sixth embodiment, the input shaft 12 and the intermediate shaft 13 remain as in the first embodiment, but the first through fourth clutches C-1 to C-4, the first and second brakes B-1 and B-2, the planetary gear set DP, the planetary gear unit PU, and the counter gear are bilaterally reversed, that is, the speed change mechanism $2_6$ is rotated left-right 180°.

Thus, in the automatic transmission $1_6$, the hydraulic servo 30 of the second clutch C-2 and the hydraulic servo 20 of the first clutch C-1 are located on the side of the planetary gear set DP that is axially opposite the planetary gear unit PU, the hydraulic servo 40 of the third clutch C-3 and the counter gear 15 are located axially intermediate the planetary gear set DP and the planetary gear unit PU, and the hydraulic servo 50 of the fourth clutch C-4 and the hydraulic servo 60 of the first brake B-1 are located on the side of the planetary gear unit PU that is axially opposite the planetary gear set DP.

In the automatic transmission $1_6$, because the fourth clutch C-4 is located in the transfer path to connect the input shaft 12 and the sun gear S2, the second clutch C-2 is located in the transfer path to connect the carrier CR1 and the carrier CR2, and the output side transfer member 103 of the second clutch C-2 is linked to the carrier CR2 on its side which faces at the planetary gear set DP, there is no member enclosing the planetary gear unit PU, whereby the automatic transmission $1_6$ is made more radially compact. In addition, it is possible to shorten the transfer member that requires a high rigidity, and to thereby reduce the weight and to improve the controllability of the automatic transmission $1_6$. Furthermore, the supplied lubricating oil is readily discharged to those surfaces requiring lubrication. In addition, the assembly of the automatic transmission $1_6$ can be simplified. Furthermore, because the structure includes a support wall 120 and the working oil for the clutches can be supplied from this support wall due to the configuration of the clutches, it is possible to reduce the number of seal rings, to reduce the sliding resistance of the seal rings, and to improve the power transfer efficiency of the automatic transmission $1_6$.

The output side member 101 of the third clutch C-3, the output side member 102 of the first clutch C-1, and the output side transfer member 103 of the second clutch C-2 are linked to the planetary gear unit PU through the inner circumferential side of the counter gear 15, making it is possible to locate the counter gear 15 axially intermediate the planetary gear unit PU and the planetary gear set DP, and to use the automatic transmission $1_6$ in an FF-type vehicle.

Furthermore, because the hydraulic servo 30 of the second clutch C-2 is located on the side of the planetary gear set DP that is axially opposite the planetary gear unit PU, it is possible to supply the working oil to the hydraulic servo 30 of the second clutch C-2 from an oil duct provided in the boss 3*b*. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_6$.

In addition, because the hydraulic servo 50 of the fourth clutch C-4 is located on the side of the planetary gear unit PU that is axially opposite the planetary gear set DP, it is possible to locate the friction plates 51 of the fourth clutch C-4 on the radially outer side and to enlarge the surface area of the friction plates 51, and to thus ensure transfer of a sufficient torque while reducing the number of friction plates 51. Furthermore, it is possible to supply working oil to the hydraulic servo 50 of the fourth clutch C-4 from an oil duct c50 in the boss 3*d*. Whereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_6$.

In addition, because the hydraulic servo 40 of the third clutch C-3 is axially intermediate the planetary gear unit PU and the planetary gear set DP, in comparison to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and to shorten the output side transfer member 101 of the third clutch C-3, which must be strong in order to transfer high torque. It is thereby possible to reduce the weight and to improve the controllability of the automatic transmission $1_6$.

Furthermore, because the hydraulic servo 20 of the first clutch C-1 is located on the side of the planetary gear set DP that is axially opposite the planetary gear unit PU, it is possible to supply working oil to the hydraulic servo 20 of the first clutch C-1 from an oil duct c20 in the boss 3*b*. Thereby, in comparison to a structure in which, for example, the hydraulic servo 20 of the first clutch C-1 is disposed on the input shaft 12 and the working oil is supplied via the input shaft 12, it is possible shorten the length of the oil duct and to improve the controllability of the automatic transmission $1_6$.

Furthermore, because of provision of a first brake B-1 that selectively locks the sun gear S2 against rotation and because the hydraulic servo 60 of the first brake B-1 is located on the side of planetary gear unit PU that is axially opposite the planetary gear set DP, the locking force transfer member of the first brake B-1 and the sun gear S2 can be linked without making a complicated configuration, and the automatic transmission $1_6$ can be made more compact.

In the automatic transmission $1_6$, the transfer member 103 of the output side of the second clutch C-2 extends axially around the outer circumferences of the transfer members 101, 102 to link with the carrier CR2, the transfer member 104 of the output side of the fourth clutch C-4 and the transfer member 101 of the output side of third clutch C-3 are linked to the sun gear S2, and the transfer member 104, the transfer member 101, and the sun gear S2, which rotate integrally, are located on the radially inner side of the transfer member 103. Therefore, the transfer member 104, which rotates faster than the transfer member 103, is further radially inward than the transfer member 102 of the output side of the first clutch C-1, which is on the radially inner side of the transfer member 103. Thus, it is possible to make the diameter of the transfer member 104 smaller than the diameter of the transfer member 103 and to reduce the weight as compared with a structure in which transfer member 104 is on the outer side. In addition, because the inertia is reduced as compared to a structure in which transfer member 104 is disposed on the outer side, it is possible to improve the controllability of the automatic transmission $1_6$.

The third and first clutches C-3, C-1 are located on the planetary gear set DP side, the transfer members 101, 102 are respectively linked to the sun gear S2 and the sun gear S3, the fourth clutch C-4 is located on the side of the planetary gear unit PU that is axially opposite the planetary gear set DP, the transfer member 104 is linked to the sun gear S2, the second clutch C-2 is located on the planetary gear set DP side, and the transfer member 103 axially extends radially outward of members 101, 102. Because the transfer member 104, which rotates faster than the transfer member 103, is on the inner side, the diameter of the transfer member 104 can be made smaller than the diameter of the transfer member 103, and it is possible to reduce the weight as compared to a structure in which transfer member 104 is disposed on the outer side. In addition, because it is possible to reduce the inertia as compared to that of a structure in which transfer member 104 is on the outside, it is possible to improve the controllability of the automatic transmission $1_6$.

In addition, in comparison to a structure in which the hydraulic servo 50 of the fourth clutch C-4 is located between the planetary gear unit PU and the planetary gear set DP, it is possible to locate the friction plates 51 of the fourth clutch C-4 more radially outward, and to increase the area of the friction plates. Thus, it is possible to ensure transfer of a sufficient torque while reducing the number of friction plates 51. Furthermore, it is possible to shorten the distance between the third and first clutches C-3, C-1 and the planetary gear unit PU, and it is possible to shorten the transfer members 101, 102 of the output sides of the third and first clutches C-3, C-1, which must be strong in order to transfer a high torque. In this manner, it is possible to decrease the weight and to improve the controllability of the automatic transmission $1_6$.

Because the working oil is supplied to the hydraulic servo 50 of the fourth clutch C-4 from an oil duct c50 in the boss 3*b*, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_6$.

In addition, because the transfer member of the input side of the fourth clutch C-4 is linked to the input shaft 12 and the intermediate shaft 13 through the inner circumferential side of the planetary gear unit PU and a portion of the transfer member of the input side of the fourth clutch C-4 forms the clutch drum 52 of the hydraulic servo 50 of the fourth clutch C-4, as compared to a structure in which the transfer member of the output side of the fourth clutch C-4 forms the clutch drum of the hydraulic servo 50, in this embodiment the clutch drum of the hydraulic servo 50 can also serve to transfer power from the input shaft 12, and thus it is possible to form the transfer member more axially compact.

Furthermore, because the sun gear S1 is held stationary on boss 3b, because the transfer member of the input side of the second clutch C-2 is linked to the carrier CR1, because a portion of the transfer member of the input side of the second clutch C-2 forms the clutch drum 32 of the hydraulic servo 30 of the second clutch C-2, and because the hydraulic servo 30 is located on the boss 3b axially intermediate the planetary gear set DP and the side wall 3a, it is possible to supply the working oil to the hydraulic servo 30 of the second clutch C-2 from an oil duct c30 in the boss 3b. Thus, in comparison to a structure in which the hydraulic servo 30 of the second clutch C-2 is provided on the input shaft 12 spaced from the boss 3b and the working oil is supplied via an oil duct in the input shaft 12, it is possible to shorten the length of the oil duct by an amount equivalent to the length of an oil duct in the input shaft 12, and it is possible to improve the controllability of the automatic transmission $1_6$.

In addition, because the hub member 111 of the first clutch C-1 is linked to the ring gear R1, the transfer member 102 is linked to the sun gear S3, a portion of the transfer member 102 forms the clutch drum 22 of the hydraulic servo 20 of the first clutch C-1, and the hydraulic servo 20 is located on the boss 3b axially intermediate the planetary gear set DP and the hydraulic servo 20 of the second clutch C-1, it is possible to supply the working oil to the hydraulic servo 20 of the first clutch C-1 from an oil duct c20 in the boss 3b. Thus, in comparison to a structure in which, for example, the hydraulic servo 20 of the first clutch C-1 is disposed around the input shaft 12, separated from the boss 3b, and the working oil is supplied via an oil duct in the input shaft 12, it is possible to shorten the length of the oil duct by an amount equivalent to the oil duct in the input shaft 12 that can be eliminated, and it is possible to improve the controllability of the automatic transmission $1_6$.

Furthermore, because counter shaft 81 is arranged in parallel with the input shaft 12 and is linked via the counter gear 15 to receive output rotation from the ring gear R3, it is possible to advantageously use the automatic transmission $1_6$ in an FF-type vehicle.

In addition, because the counter gear 15 is located axially intermediate the planetary gear unit PU and the planetary gear set DP and is supported by support member 120a, it is possible to locate the counter gear 15 closer to the input side, to position the counter shaft portion 80 and the differential gear portion 90 on the torque converter side, and to thereby make the automatic transmission $1_6$ more compact. Thus, it is possible to prevent interference between the transmission, the differential gear portion, etc. and the frame of the vehicle, and to facilitate the mounting of the automatic transmission $1_6$ in the vehicle.

Because the carrier CR1 is linked to the input shaft 12 on the side facing the planetary gear unit PU and is axially linked to the clutch drum 32 on the side of the planetary gear set DP that is axially opposite the planetary gear unit PU, it is possible to link the carrier CR1, the transfer member 32 of the input side of the second clutch C-2, and the input shaft 12 without a complicated configuration and to make the automatic transmission $1_6$ more compact.

In addition, because the hub member 116 of the first brake B-1 and the transfer member 104 that is linked thereto are axially linked to the sun gear S2 on the side of the planetary gear unit PU that is axially opposite the planetary gear set DP, it is possible to link the hub member 116 of the first brake B-1, the transfer member 104, and the sun gear S2 without a complicated configuration and to make the automatic transmission $1_6$ more compact.

In addition, because the planetary gear set DP includes the sun gear S1 which is normally held stationary, a carrier CR1 that rotatably supports the pinion gear P1 and the pinion gear P2 and that is coupled to the output shaft 12, and a ring gear R1 that meshes with the pinion gear P2 and outputs a reduced speed rotation, it is possible to output a reduced speed rotation, i.e. at a speed less than that of the input rotation of the input shaft 12, from the ring gear R1.

Further, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and meshes with the short pinion P3, the carrier CR2 that rotatably supports the short pinion P3 and the long pinion P4, and the ring gear R3 that meshes with the long pinion P4, it is possible to prevent high speed rotation of the rotary elements and to provide advantageous gear ratios while enabling each of the rotary elements of the planetary gear unit PU and the output side members of each of the clutches and brakes to be linked without a complicated configuration.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the farthest left end of the ordinate and, in sequence to the right thereof, are the carrier CR2, the ring gear R3, and the sun gear S3.

Seventh Embodiment

Figure 12:
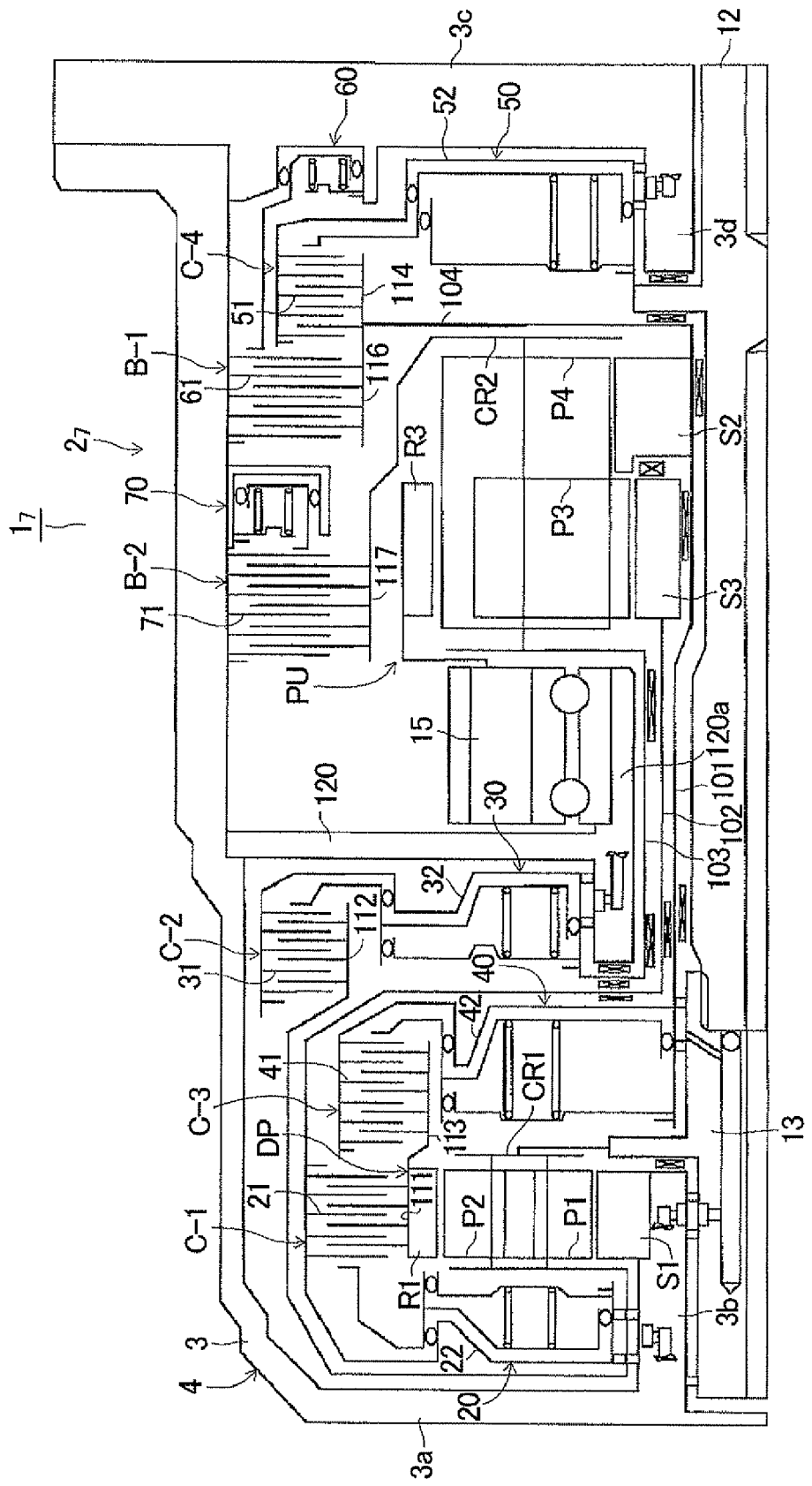
FIG. 12 is a cross-sectional view of an automatic transmission $1_7$ according to a seventh embodiment.

Next, a seventh embodiment, in which a portion of the second embodiment described above is modified, will be explained with reference to FIG. 12 which is a cross-sectional view of an automatic transmission $1_7$ according to the second embodiment. In the description of the seventh embodiment which follows, the structures that are identical to those of the automatic transmission $1_2$ according to the second embodiment are denoted by identical reference numerals, and their description has been omitted.

In the automatic transmission $1_7$ of the seventh embodiment, the input shaft 12 and the intermediate shaft 13 remain as in the second embodiment, but the positions of the first through fourth clutches C-1 to C-4, the first and second brakes B-1 to B-2, the planetary gear set DP, the planetary gear unit PU, and the counter gear 15 are substantially reversed, that is, the speed change mechanism $2_7$ is rotated 180° left-right relative to the speed change mechanism $2_2$ of the second embodiment.

Specifically, in the automatic transmission $1_7$, the hydraulic servo 20 of the first clutch C-1 is located on the side of the planetary gear set DP that is axially opposite the planetary gear unit PU. The hydraulic servo 40 of the third clutch C-3, the hydraulic servo 30 of the second clutch C-2, and the counter gear 15 are located axially intermediate the planetary gear set DP and the planetary gear unit PU, and the hydraulic servo 50 of the fourth clutch C-4 and the hydraulic servo 60 of the first brake B-1 are located on the side of the planetary gear unit PU that is axially opposite the planetary gear set DP.

In this type of automatic transmission $1_7$, because the fourth clutch C-4 is interposed in the transfer path to connect the input shaft 12 and the sun gear S2, the second clutch C-2 is interposed in the transfer path to connect the carrier CR1 and the carrier CR2, and the output side transfer member 103 of the second clutch C-2 is linked to the side of carrier CR2 axially facing the planetary gear set DP, it is possible to avoid need for a member enclosing the planetary gear unit PU. Thereby, the automatic transmission $1_7$ can be made more radially compact. In addition, it is possible to shorten the transfer member that requires a high rigidity, thereby reducing the weight and improving the controllability of the automatic transmission $1_7$. Furthermore, the structure permits lubricating oil to be readily discharged to structures requiring lubrication. In addition, the assembly of the automatic transmission $1_7$ can be simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_7$.

In addition, because the hydraulic servo 30 of the second clutch C-2 is located axially intermediate the planetary gear unit PU and the planetary gear set DP, it is possible to supply working oil to the hydraulic servo 30 of the second clutch C-2 from an oil duct in the support wall 120. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_7$.

Furthermore, because the hydraulic servo 50 of the fourth clutch C-4 is located on the side of the planetary gear unit PU that is axially opposite the planetary gear set DP, it is possible to locate the friction plates 51 of the fourth clutch C-4 more radially outward and to enlarge the surface area of the friction plates 51, and thus, it is possible to ensure transfer of a sufficient torque, and to reduce the number of friction plates. Furthermore, it is possible to supply working oil to the hydraulic servo 50 of the fourth clutch C-4 from an oil duct in the boss 3d. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_7$.

In addition, because the hydraulic servo 40 of the third clutch C-3 is located axially intermediate the planetary gear unit PU and the planetary gear set DP, in comparison to a structure in which the hydraulic servo 40 of the third clutch C-3 is located on the side of the planetary gear set DP that is axially opposite the planetary gear unit PU, it is possible to shorten both the distance between the third clutch C-3 and the planetary gear unit PU and the output side transfer member 101 of the third clutch C-3, which must be strong in order to transfer high torque. Thereby, it is possible to reduce the weight and to improve the controllability of the automatic transmission $1_7$.

Furthermore, because the hydraulic servo 20 of the first clutch C-1 is located on the side of the planetary gear set DP that is axially opposite the planetary gear unit PU, it is possible to supply working oil to the hydraulic servo 20 of the first clutch C-1 from an oil duct in the boss 3b. Thereby, in comparison to a structure in which working oil is supplied from an oil duct in the input shaft 12, it is possible to reduce the number of seal rings, to reduce the sliding resistance of the seal rings, and to improve the power transfer efficiency of the automatic transmission $1_7$.

In addition, because of provision of a first brake B-1 that selectively locks the sun gear S2 against rotation and because the hydraulic servo 60 of the first brake B-1 is located on the side of planetary gear unit PU that is axially opposite the planetary gear set DP, the locking force transfer member of the first brake B-1 and the sun gear S2 can be linked without making the these components complicated, and it is possible to make the automatic transmission $1_7$ more compact.

In the automatic transmission $1_7$, the transfer member 103 of clutch C-2 axially extends on the radially outer side of the transfer members 101, 102, the transfer member 104 of the output side of the fourth clutch C-4 and the transfer member 101 of the output side of third clutch C-3 are linked to the sun gear S2, and the transfer member 104 of the output side of the fourth clutch C-4, the transfer member 101 of the output side of third clutch C-3, and the sun gear S2, which rotate integrally, are disposed on the inner side of the transfer member 102. Therefore, the transfer member 104, which rotates faster than the transfer member 103, is located further toward the radially inner side than the transfer member 102, which is on the inner side of the transfer member 103. Thus, it is possible to make the diameter of the transfer member 104 smaller than the diameter of the transfer member 103, and to reduce the weight more than in a structure in which transfer member 104 is on the outer side. In addition, because the inertia is reduced in comparison to a structure in which transfer member 104 is located on the outer side, it is possible to improve the controllability of the automatic transmission $1_7$.

The third and first clutches C-3, C-1 are disposed on the side of the planetary gear set that is axially opposite the planetary gear set DP, the transfer members 101, 102 are respectively linked to the sun gear S2 and the sun gear S3, the fourth clutch C-4 is located on the side of the planetary gear unit PU that is axially opposite the planetary gear set DP, the transfer member 104 is linked to the sun gear S2, the second clutch C-2 is disposed on the side of the planetary gear set DP facing the planetary unit PU, and the transfer member 103 links to the carrier CR2 by extending along the radially outer side of the transfer members 101, 102. Thereby, because the transfer member 104, which rotates faster than the transfer member of the output side of the second clutch C-2, is more radially inward, the diameter of the transfer member 104 of the output side of the fourth clutch C-4 can be made smaller than the diameter of the transfer member 103 of the output side of the second clutch C-2, it is possible to reduce the weight as compared to a structure in which transfer member 103 is disposed on the outer side. In addition, because inertia is reduced the controllability of the automatic transmission $1_7$ is improved.

In addition, in comparison to a structure in which the hydraulic servo 50 of the fourth clutch C-4 is located between the planetary gear unit PU and the planetary gear set DP, it is possible to locate the friction plates 51 of the fourth clutch C-4 more radially outward and to increase the area of the friction plates 51. Thus, transfer of a sufficient torque is ensured, while enabling a reduction in the number of friction plates 51. Furthermore, it is possible to shorten the distance between the third and first clutches C-3, C-1 and the planetary gear unit PU, and to shorten the transfer members 101, 102, which must be strong in order to transfer a high torque. Thus, it is possible to decrease weight, and to improve the controllability of the automatic transmission $1_7$.

Furthermore, it is possible to supply the working oil to the hydraulic servo 50 of the fourth clutch CA from an oil duct c50 in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_7$.

In addition, because the transfer member of the input side of the fourth clutch C-4 is linked to the input shaft 12 and the intermediate shaft 13 through the inner circumferential side of the planetary gear unit PU and because a portion of the transfer member of the input side of the fourth clutch C-4 serves as the clutch drum 52 of the hydraulic servo 50 of the fourth clutch C-4, in comparison to a structure in which the transfer member of the output side of the fourth clutch C-4 forms the clutch drum 52, the clutch drum 52 of the hydraulic servo 50 can also serve to transfer power from the input shaft 12, and thus it is possible to form the transfer member more axially compact.

Furthermore, because a counter gear 15 is linked to the ring gear R3 and is located axially intermediate the planetary gear unit PU and the planetary gear set DP, because support member 120a supports the counter gear 15, because the hub member 112 of the second clutch C-2 links to the carrier CR1 by axially extending on the outer side of the third and first clutches C-3, C-1, because a portion of the transfer member 103 of the output side of the second clutch C-2 forms the clutch drum 32 of the hydraulic servo 30 of the second clutch C-2, and because the hydraulic servo 30 is supported on the support member 120a, between the planetary gear set DP and counter gear 15, it is possible to supply the working oil to the hydraulic servo 30 of the second clutch C-2 from an oil duct c30 in the support member 120a. Thus, in comparison to a structure in which the working oil is supplied from an oil duct in the input shaft 12, it is possible to reduce the number of seal rings, to reduce the sliding friction of the seal rings, and to improve the power transfer efficiency of the automatic transmission $1_7$.

In addition, because counter shaft 81 is arranged in parallel with the input shaft 12 and linked via the counter gear 15 to the ring gear R3 for receiving the output rotation, it is possible to advantageously use the automatic transmission $1_7$ in an FF-type vehicle.

Furthermore, because the counter gear 15 is located axially intermediate the planetary gear unit PU and the planetary gear set DP and is supported by support member 120a, it is possible to position the counter gear 15 axially closer to the input side and to position the counter shaft portion 80 and the differential gear portion 90 near the torque converter 7, thereby making the automatic transmission $1_7$ more compact. Thus, interference between transmission, differential, etc. and the frame is more easily avoided, and the mounting of the automatic transmission $1_7$ in the vehicle is facilitated.

In addition, because the carrier CR1 is linked to the input shaft 12 on its side which faces the planetary gear unit PU and is linked to the hub member 112 on the side of the planetary gear set DP that is axially opposite the planetary gear unit PU, it is possible to link the carrier CR1, the transfer member 112 of the input side of the second clutch C-2, and the input shaft 12 without making these members complicated, and it is possible to make the automatic transmission $1_7$ more compact.

In addition, because the hub member 116 of the first brake B-1 and the transfer member 104 are axially linked to the sun gear S2 on the side of the planetary gear unit PU that is axially opposite the planetary gear set DP, it is possible to link the hub member 116 of the first brake B-1, the transfer member 104, and the sun gear S2 without making these members complicated, and it is possible to make the automatic transmission $1_7$ more compact.

In addition, because the planetary gear set DP includes the sun gear S1, which is normally held stationary, a carrier CR1 that rotatably supports the pinion gear P1 and the pinion gear P2 and that is linked to the output shaft 12, and a ring gear R1 that meshes with the pinion gear P2 and outputs a reduced speed rotation, it is possible to output a reduced speed rotation, i.e. rotation at a speed less than that of the input rotation of the input shaft 12, from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and with the short pinion P3, the carrier CR2 that selectively rotatably supports the short pinion P3 and the long pinion P4, and the ring gear R3 that meshes with the long pinion P4, it is possible to prevent high speed rotation of the rotary elements and to provide advantageous gear ratios while enabling each of the rotary elements of the planetary gear unit PU and the output side members of each of the clutches and brakes to be linked without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In addition, in a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the farthest left end of the ordinate and, arrayed in sequence to the right thereof, are the carrier CR2, the ring gear R3 that is linked to the counter gear 15, and the sun gear S3.

Eighth Embodiment

Figure 13:
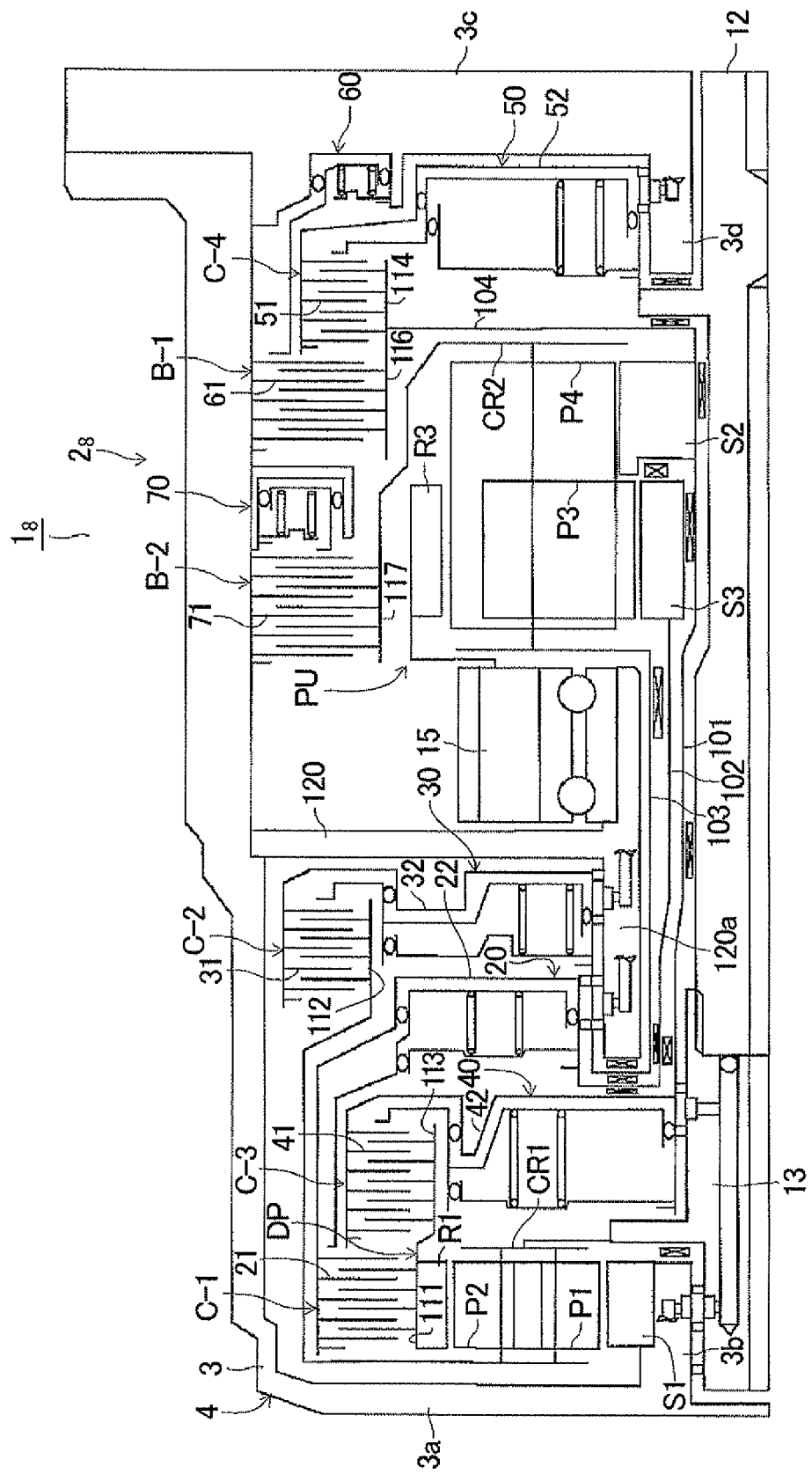
FIG. 13 is a cross-sectional view of an automatic transmission $1_8$ according to an eighth embodiment.

Next, an eighth embodiment, in which a portion of the third embodiment is modified, will be explained with reference to FIG. 13 which is a cross-sectional view of an automatic transmission $1_8$ according to the eighth embodiment. Note that in the description of the eighth embodiment which follows, structures that are identical to those of the automatic transmission $1_3$ of the third embodiment are denoted by identical reference numerals, and their description is omitted.

In the automatic transmission $1_8$ of the eighth embodiment, the input shaft 12 and the intermediate shaft 13 remain arranged as in third embodiment, and the arrangement of the first through fourth clutches C-1 to C-4, the first and second brakes B-1 to B-2, the planetary gear set DP, the planetary gear unit PU, and the counter gear 15 are substantially reversed, that is, the speed change mechanism $2_8$ is rotated left-right 180° as compared to the speed change mechanism $2_3$.

The automatic transmission $1_8$, the hydraulic servo 40 of the third clutch C-3, the hydraulic servo 20 of the first clutch C-1, the hydraulic servo 30 of the second clutch C-2, and the counter gear 15 are located axially intermediate the planetary gear set DP and the planetary gear unit PU, and the hydraulic servo 50 of the fourth clutch C-4 and the hydraulic servo 60 of the first brake B-1 are located on the side of the planetary gear unit PU that is axially opposite the planetary gear set DP.

Because the fourth clutch C-4 is interposed in the transfer path to connect the input shaft 12 and the sun gear S2, because the second clutch C-2 is interposed in the transfer path to connect the carrier CR1 and the carrier CR2, and because the output side transfer member 103 of the second clutch C-2 is linked to the side of carrier CR2 axially facing the planetary gear set DP, it is possible to avoid need for a member enclosing the planetary gear unit PU. Thereby, the automatic transmission $1_8$ can be made more radially compact. In addition, it is possible to shorten the transfer member that requires a high rigidity, to reduce the weight, and to improve the controllability of the automatic transmission $1_8$. Furthermore, the structure allows lubricating oil to be readily discharged to structures requiring lubrication. In addition, the assembly of the automatic transmission $1_8$ for a vehicle is simplified. Furthermore, because working oil for the clutches is supplied from support wall 120, it is possible to reduce the number of seal rings, to reduce the sliding resistance of the seal rings, and to improve the power transfer efficiency of the automatic transmission $1_8$.

In addition, because the hydraulic servo 30 of the second clutch C-2 is located axially intermediate the planetary gear unit PU and the planetary gear set DP, it is possible to supply working oil to the hydraulic servo 30 of the second clutch C-2 from an oil duct in the support wall 120. Thereby, as compared to a structure wherein the working oil is supplied from an oil duct in the input shaft 12, it is possible to reduce the number of seal rings, to reduce the sliding resistance of the seal rings, and to improve the power transfer efficiency of the automatic transmission $1_8$.

Furthermore, because the hydraulic servo 50 of the fourth clutch C-4 is located on the side of the planetary gear unit PU that is axially opposite the planetary gear set DP, it is possible to locate the friction plates 51 of the fourth clutch C-4 more radially outward and to enlarge the surface area of the friction plates 51, and thus, it is possible to transfer sufficient torque while reducing the number of friction plates. Furthermore, because working oil is supplied to the hydraulic servo 50 of the fourth clutch C-4 from an oil duct in the boss 3d, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_8$.

In addition, because the hydraulic servo 40 of the third clutch C-3 is located axially intermediate the planetary gear unit PU and the planetary gear set DP, as compared to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and to shorten the output side transfer member 101 of the third clutch C-3, which must be strong in order to transfer high torque. It is thereby possible to reduce the weight and to improve the controllability of the automatic transmission $1_2$.

Furthermore, because the hydraulic servo 20 of the first clutch C-1 is located axially intermediate the planetary gear unit PU and the planetary gear set DP, as compared to a structure in which the hydraulic servo 20 of the first clutch C-1 is located on the side of the planetary gear set DP that is axially opposite the planetary gear unit PU, it is possible to shorten the distance between the first clutch C-1 and the planetary gear unit PU, and to shorten the output side transfer member 102 of the first clutch C-1, which must be strong in order to transfer high torque. It is thereby possible to reduce the weight, and to improve the controllability of the automatic transmission $1_8$.

In addition, because a first brake B-1 selectively locks the rotation of the sun gear S2 and the hydraulic servo 60 of the first brake B-1 is located on the side of planetary gear unit PU that is axially opposite the planetary gear set DP, the locking force transfer member of the first brake B-1 and the sun gear S2 can be linked without making these members complicated, and it is possible to make the automatic transmission $1_8$ more compact.

In the automatic transmission $1_8$, the transfer member 103 of the output side of the second clutch C-2, which is linked to the carrier CR2, extends axially on the radially outer side of the transfer members 101, 102, the transfer member 104 and the transfer member 101 are linked to the sun gear S2, and the transfer member 104, the transfer member 101, and the sun gear S2, which rotate integrally, are arranged radially inward of the transfer member 102. Therefore, the transfer member 104 of the output side of the fourth clutch C-4, which rotates faster than the transfer member 103, is more radially inward than the transfer member 102, which is on the inner side of the transfer member 103. Thus, it is possible to make the diameter of the transfer member 104 smaller than the diameter of the transfer member 103, and to reduce weight as compared with a structure in which transfer member 104 is on the outer circumferential side. In addition, because the inertia is reduced in comparison to a structure in which the transfer member is located on the radially outer side, it is possible to improve the controllability of the automatic transmission $1_8$.

The third and first clutches C-3, C-1 are located on the side of the planetary gear set DP, the transfer members 101, 102 are respectively linked to the sun gear S2 and the sun gear S3, the fourth clutch C-4 is located on the side of the planetary gear unit PU that is axially opposite the planetary gear set DP, the transfer member 104 of the output side of the fourth clutch C-4 is linked to the sun gear S2, the second clutch C-2 is located on the side of the planetary gear set DP, and the transfer member 103 extends axially on the radially outer side of the transfer members 101, 102 to link to the carrier CR2. Thus, because the transfer member 104, which rotates faster than the transfer member of the output side of the second clutch C-2, is on the radially inner side, the diameter of the transfer member 104 can be made smaller than the diameter of the transfer member 103 thus reducing weight as compared to a structure in which the transfer member 104 is located on the outer side. In addition, because the inertia is thereby reduced, it is possible to improve the controllability of the automatic transmission $1_8$.

In comparison to a structure in which the hydraulic servo 50 of the fourth clutch C-4 is located between the planetary gear unit PU and the planetary gear set DP, it is possible to locate the friction plates of the fourth clutch C-4 more radially outward, and to increase the area of the friction plates 51. Thus, it is possible to ensure transfer of a sufficient torque, while reducing the number of friction plates 51. Furthermore, it is possible to shorten the distance between the third and first clutches C-3, C-1 and the planetary gear unit PU, and to shorten the transfer members 101, 102, which must be strong in order to transfer a high torque. Weight is thereby decreased, and the controllability of the automatic transmission $1_8$ is improved.

The working oil is supplied to the hydraulic servo 50 of the fourth clutch C-4 from an oil duct c50 in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_8$.

In addition, because the transfer member of the input side of the fourth clutch C-4 is linked to the input shaft 12 and the intermediate shaft 13 by extending through the inner circumferential side of the planetary gear unit PU and a portion of the transfer member of the input side of the fourth clutch C-4 forms the clutch drum 52 of the hydraulic servo 50 of the fourth clutch C-4, as contrasted with a structure in which the transfer member of the output side of the fourth clutch C-4 forms the clutch drum of the hydraulic servo 50, the clutch drum of the hydraulic servo 50 can also serve to transfer power from the input shaft 12, and thus it is possible to form the transfer member more axially compact.

Furthermore, because counter gear 15 is linked to the ring gear R3 and is located axially intermediate the planetary gear unit PU and the planetary gear set DP, because a support wall 120a supports the counter gear 15, because the hub 112 of the second clutch C-2 extends around the outer circumferences of the third and first clutches C-3, C-1 to link with the carrier CR1, because a portion of the transfer member 103 of the output side of the second clutch C-2 forms the clutch drum 32 of the hydraulic servo 30 of the second clutch C-2, and because the hydraulic servo 30 is located on the support member 120a, between the planetary gear set DP and counter gear 15, it is possible to supply the working oil to the hydraulic servo 30 of the second clutch C-2 from an oil duct c30 in the support member 120a. Thus, in comparison to a structure in which the working oil is supplied from an oil duct in the input shaft 12, it is possible to reduce the number of seal rings, to reduce the sliding friction of the seal rings, and to improve the power transfer efficiency of the automatic transmission $1_8$.

Furthermore, because the transfer member 102 of the output side of the first clutch C-1 is linked to the sun gear S3, because a portion of the transfer member 102 of the output side of the first clutch C-1 forms the clutch drum 22 of the hydraulic servo 20 of the first clutch C-1, because the hydraulic servo 20 is mounted on the support member 120a axially intermediate the planetary gear set DP and the hydraulic servo 30 of the second clutch C-2, because the transfer member 101 of the output side of the third clutch C-3 is linked to the sun gear S2, because a portion of the transfer member 101 forms the drum clutch 42 of the hydraulic servo 40 of the third clutch C-3, and because the hydraulic servo 40 is located axially intermediate the planetary gear set DP and the hydraulic servo 20 of the first clutch C-1, it is possible to provide the working oil to the hydraulic servo 20 of the first clutch C-1 from an oil duct c20 that extends through the support wall 120 and the support member 120a. Thus, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_8$. In addition, because the hydraulic servo 40 of the third clutch C-3 is located axially intermediate the planetary gear unit PU and the planetary gear set DP, in comparison to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and to shorten the transfer member 101, which must be strong in order to transfer a high torque. It is thereby possible to reduce the weight and to improve the controllability of the automatic transmission.

Because counter shaft 81 is arranged in parallel with the input shaft 12 and linked via the counter gear 15 for receipt of output rotation from the ring gear R3, it is possible to advantageously use the automatic transmission $1_8$ in an FF-type vehicle.

Furthermore, because the counter gear 15 is located axially intermediate the planetary gear unit PU and the planetary gear set DP and is supported on a support member 120a, it is possible to position the counter gear 15 axially closer to the input side, to position the counter shaft portion 80 and the differential gear portion 90 near the torque converter 7, and to thereby make the automatic transmission $1_8$ more compact. Accordingly, it is possible to prevent interference between the transmission, differential, etc. and the frame, and to facilitate the mounting of the automatic transmission $1_8$ in the vehicle.

In addition, because the carrier CR1 is linked to the input shaft 12 on its side facing the planetary gear unit PU and is linked to the hub member 112, which is the transfer member of the input side of the second clutch C-2, on its side axially opposite the planetary gear unit PU, it is possible to link the carrier CR1, the transfer member 112 of the input side of the second clutch C-2, and the input shaft 12 without making these members complicated, and to make the automatic transmission $1_8$ more compact.

In addition, because the hub member 116 of the first brake B-1 and the transfer member 104 that is linked thereto are axially linked to the sun gear S2 on the side of the planetary gear unit PU that is opposite the planetary gear set DP, it is possible to link the hub member 116 of the first brake B-1, the transfer member 104, and the sun gear S2 without a complicated configuration, and to make the automatic transmission $1_8$ more compact.

In addition, because the planetary gear set DP includes the sun gear S1 which is non-rotatably mounted on the case 4, a carrier CR1 that rotatably supports the pinion gear P1 and the pinion gear P2 and that is connected to the output shaft 12, and a ring gear R1 that meshes with the pinion gear P2 and that outputs a reduced speed rotation, it is possible to output a reduced speed rotation, i.e. at a speed less than that of the input rotation of the input shaft 12, from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and with the short pinion P3, the carrier CR2 that rotatably supports the short pinion P3 and the long pinion P4, and the ring gear R3 that meshes with the long pinion P4, it is possible to prevent high speed rotation of each of the rotary elements and to provide advantageous gear ratios while enabling each of the rotary elements of the planetary gear unit PU and the output side members of each of the clutches and brakes to be linked without a complicated configuration.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the farthest left end on the ordinate and, in sequence to the right thereof, are the carrier CR2, the ring gear R3 that is linked to the counter gear 15, and the sun gear S3.

Ninth Embodiment

Figure 14:
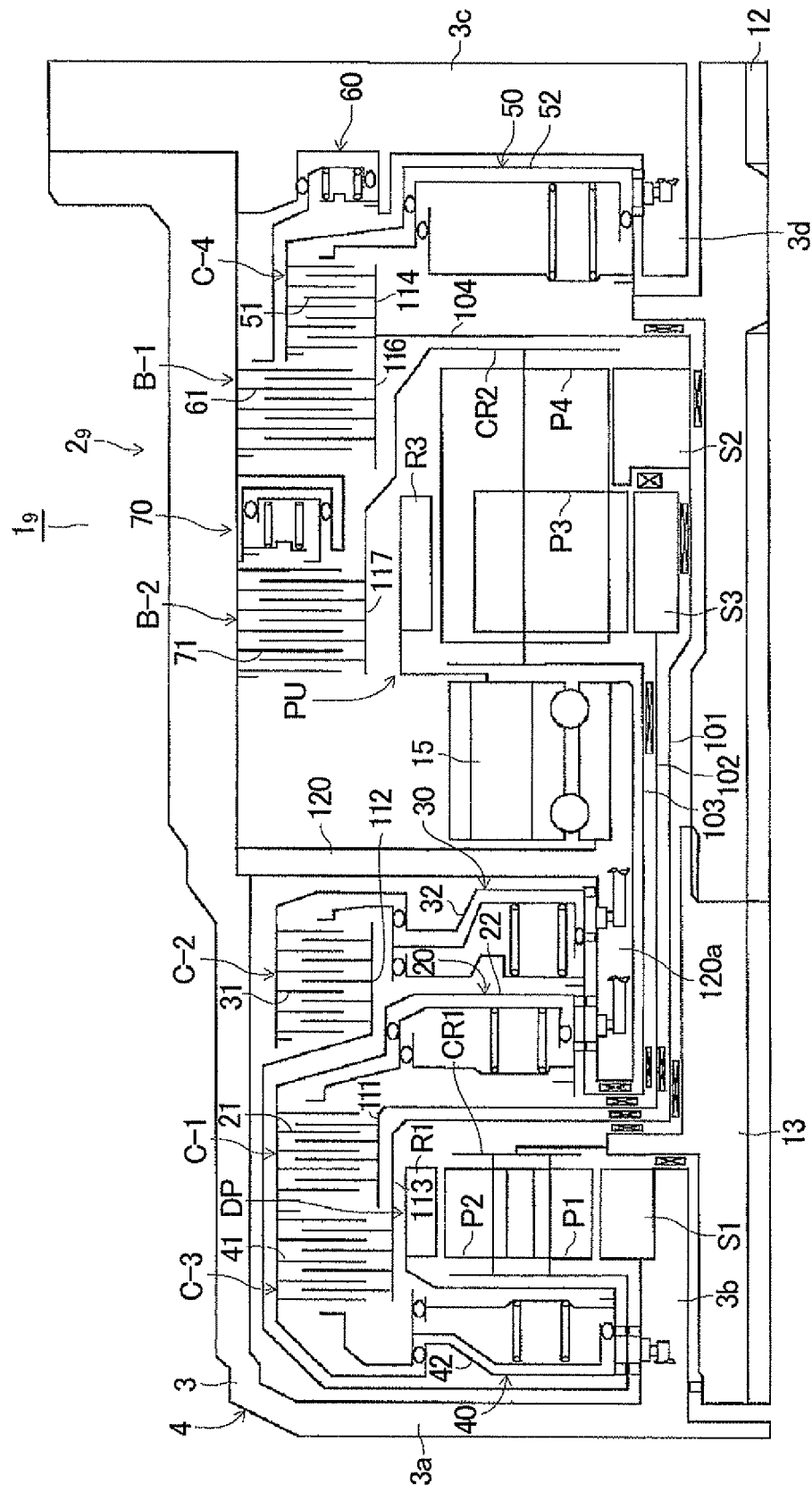
FIG. 14 is a cross-sectional view of an automatic transmission $1_9$ according to a ninth embodiment.

Next, a ninth embodiment, in which a portion of the fourth embodiment is modified, will be explained with reference to FIG. 14 which is a cross-sectional view of an automatic transmission $1_9$ according to the ninth embodiment. In the description of the ninth embodiment, structures that are identical to those of the automatic transmission $1_4$ according to the fourth embodiment are denoted by identical reference numerals, and their description has been omitted.

In the automatic transmission $1_9$ according to the ninth embodiment, the input shaft 12 and the intermediate shaft 13 and the engine retain the same arrangement. However, the relative disposition of the first through fourth clutches C-1 to C-4, the first and second brakes B-1 and B-2, the planetary gear set DP, the planetary gear unit PU, and the counter gear 15 are substantially reversed, that is, the speed change mechanism $2_9$ is substantially obtained by rotating the speed change mechanism $2_4$ of the fourth embodiment left-right 180°.

Specifically, in the automatic transmission $1_9$, the hydraulic servo 40 of the third clutch C-3 is located on the side of the planetary gear set DP that is axially opposite the planetary gear unit PU, the hydraulic servo 20 of the first clutch C-1, the hydraulic servo 30 of the second clutch C-2, and the counter gear 15 are located axially intermediate the planetary gear set DP and the planetary gear unit PU, and the hydraulic servo 50 of the fourth clutch C-4 and the hydraulic servo 60 of the first brake B-1 are located on the side of the planetary gear unit PU that is axially opposite the planetary gear set DP.

Because the fourth clutch C-4 is interposed in the transfer path to connect the input shaft 12 and the sun gear S2, the second clutch C-2 is interposed in the transfer path to connect the carrier CR1 and the carrier CR2, and the output side transfer member 103 of the second clutch C-2 is linked to the side of the carrier CR2 facing the planetary gear set DP, it is possible to avoid provision of a member enclosing the planetary gear unit PU. The automatic transmission $1_9$ can thereby be made more radially compact. In addition, it is possible to shorten the transfer member that requires a high rigidity, to reduce the weight, and to improve the controllability of the automatic transmission $1_9$. Furthermore, this structure allows lubricating oil to be readily discharged where needed, and cooling performance can be ensured. In addition, the assembly of the automatic transmission $1_9$ is simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_9$.

Because the hydraulic servo 30 of the second clutch C-2 is located axially intermediate the planetary gear unit PU and the planetary gear set DP, it is possible to supply working oil to the hydraulic servo 30 of the second clutch C-2 from an oil duct provided in the support wall 120. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_9$.

Furthermore, because the hydraulic servo 50 of the fourth clutch C-4 is located on the side of the planetary gear unit PU that is axially opposite the planetary gear set DP, it is possible to locate the friction plates 51 of the fourth clutch C-4 more radially outward and to enlarge the surface area of the friction plates 51, and thus, it is possible to transfer sufficient torque while reducing the number of friction plates. Working oil is supplied to the hydraulic servo 50 of the fourth clutch C-4 from an oil duct in the boss 3d. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_9$.

Because the hydraulic servo 40 of the third clutch C-3 is located on the side of the planetary gear set DP that is axially opposite the planetary gear unit PU, it is possible to supply the working oil to the hydraulic servo 40 of the third clutch C-3 from an oil duct in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of an automatic transmission $1_9$.

Furthermore, because the hydraulic servo 20 of the first clutch C-1 is located axially intermediate the planetary gear unit PU and the planetary gear set DP, in comparison to a structure in which the hydraulic servo 20 of the first clutch C-1 is located on the side of the planetary gear set DP that is axially opposite the planetary gear unit PU, it is possible to shorten the distance between the first clutch C-1 and the planetary gear unit PU, and to thereby shorten the output side transfer member 102 of the first clutch C-1, which requires strength in order to transfer a high torque. Thereby, it is possible to reduce the weight and to improve the controllability of the automatic transmission $1_9$.

First brake B-1 selectively locks the sun gear S2 to the case 4 thereby preventing rotation. Because the hydraulic servo 60 of the first brake B-1 is located on the side of planetary gear unit PU that is axially opposite the planetary gear set DP, the locking force transfer member of the first brake B-1 and the sun gear S2 can be linked without making these members complicated, and it is possible to make the automatic transmission $1_9$ more compact.

In the automatic transmission $1_9$, the transfer member 103 of the output side of the second clutch C-2, which is linked to the carrier CR2, extends along the outer circumferential side of the transfer members 101, 102 of the output side of the third and first clutches C-3, C-1, the transfer member 104 of the output side of the fourth clutch C-4 and the transfer member 101 of the output side of third clutch C-3 are linked to the sun gear S2, and the transfer member 104 of the output side of the fourth clutch C-4, the transfer member 101 of the output side of third clutch C-3, and the sun gear S2, which rotate integrally, are located on the inner circumferential side of the transfer member 102. Therefore, the transfer member 104, which rotates faster than the transfer member 103, is positioned more radially inward than is the transfer member 102 of the output side of the first clutch C-1, which is on the inner circumferential side of the transfer member 103 of the output side of the second clutch C-2. Thus, it is possible to make the diameter of the transfer member 104 smaller than the diameter of the transfer member 103, and to reduce the weight as compared to a structure in which the transfer member 104 is on the outer circumferential side of transfer member 102. In addition, because the inertia is reduced in comparison to a structure in which transfer member 104 is disposed on the outer circumferential side of transfer member 102, it is possible to improve the controllability of the automatic transmission $1_9$.

In addition, the third and first clutches C-3, C-1 are disposed on the planetary gear set DP side, the transfer members 101, 102 are respectively linked to the sun gear S2 and the sun gear S3, the fourth clutch C-4 is located on the side of the planetary gear unit PU that is axially opposite the planetary gear set DP, the transfer member 104 is linked to the sun gear S2, the second clutch C-2 is located on the planetary gear set DP side, and the transfer member 103 which is linked to the carrier CR2 is coaxial with and radially outward of the transfer members 101, 102. Thereby, because the transfer member 104, which rotates faster than the transfer member of the output side of the second clutch C-2, is more radially inward, its diameter can be made smaller than the diameter of the transfer member 103, and it is possible to reduce the weight as compared to a structure in which transfer member 104 is located on the outer circumferential side of transfer members 101,102. In addition, because the inertia is reduced in comparison to a structure in which transfer member 104 is on the outside, it is possible to improve the controllability of the automatic transmission $1_9$.

In addition, in comparison to a structure in which the hydraulic servo 50 of the fourth clutch C-4 is located between the planetary gear unit PU and the planetary gear set DP, it is possible to locate the friction plates 51 of the fourth clutch C-4 more radially outward, and to enlarge the area of the friction plates. Thus, it is possible to transfer sufficient torque while reducing the number of friction plates 51. Furthermore, it is possible to shorten the distance between the third and first clutches C-3, C-1 and the planetary gear unit PU, and to thereby shorten the transfer members 101, 102, which must be strong in order to transfer a high torque. It is thereby possible to decrease the weight, and to improve the controllability of the automatic transmission $1_9$.

Working oil is supplied to the hydraulic servo 50 of the fourth clutch C-4 from an oil duct c50 in the boss 3b. Thereby, in comparison to a structure in which working oil is supplied from an oil duct in the input shaft 12, it is possible to reduce the number of seal rings, to reduce the sliding resistance of the seal rings, and to improve the power transfer efficiency of the automatic transmission $1_9$.

A portion of the transfer member of the input side of the fourth clutch C-4 forms the clutch drum 52 of the hydraulic servo 50 of the fourth clutch C-4. Accordingly, compared to a structure in which the transfer member of the output side of the fourth clutch C-4 forms the clutch drum of the hydraulic servo 50, the clutch drum of the hydraulic servo 50 can also serve to transfer power from the input shaft 12, and thus it is possible to form the transfer member more axially compact.

Furthermore, because counter gear 15 is linked to the ring gear R3 and is located axially intermediate the planetary gear unit PU and the planetary gear set DP, because support member 120a supports the counter gear 15, because the hub 112 of the second clutch C-2 links to the carrier CR1 by extending around the outer circumference of the third and first clutches C-3, C-1, because a portion of the transfer member 103 forms the clutch drum 32 of the hydraulic servo 30 of the second clutch C-2, and because the hydraulic servo 30 is mounted on the support member 120a between the planetary gear set DP and counter gear 15, it is possible to supply the working oil to the hydraulic servo 30 of the second clutch C-2 from an oil duct c30 in the support member 120a. Thus, in comparison to a structure in which the working oil is supplied from an oil duct in the input shaft 12, it is possible to reduce the number of seal rings, to reduce the sliding friction of the seal rings, and to improve the power transfer efficiency of the automatic transmission $1_9$.

Boss 3b which extends from the side wall 3a of the case 4 supports the sun gear S1 and fixes it against rotation, the transfer member of the input side of the third clutch C-3 is linked to the ring gear R1 and a portion thereof forms the clutch drum 42 of the hydraulic servo 40 of the third clutch C-3. The hydraulic servo 40 is mounted on the boss 3b axially intermediate the planetary gear set DP and the side wall 3a. The transfer member of the input side of the first clutch C-1 is linked to the transfer member of the input side of the third clutch C-3, and a portion of the transfer member of the input side of the first clutch C-1 forms the clutch drum 22 of the hydraulic servo 20 of the first clutch C-1. The hydraulic servo 20 is mounted on the support member 120a axially intermediate the planetary gear set DP and the hydraulic servo 30 of the second clutch C-2. Accordingly, it is possible to supply the working oil to the hydraulic servo 40 of the third clutch C-3 from an oil duct c40 in the boss 3b. Thus, in comparison to a structure in which the hydraulic servo 40 of the third clutch C-3 is disposed on the input shaft 12 and spaced from the boss 3b and in which the working oil is supplied via an oil duct in the input shaft 12, it is possible to shorten the length of the oil duct by an amount equivalent to the length of an oil duct in the input shaft 12, and to improve the controllability of the automatic transmission $1_9$. In addition, it is possible to supply the working oil to the hydraulic servo 20 of the first clutch C-1 from an oil duct c20 which extends through the support wall 120 and the support member 120a. Thus, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_9$.

In addition, because counter shaft 81 is arranged in parallel with the input shaft 12 and linked via the counter gear 15 to the ring gear R3 so as to receive the output rotation from the ring gear R3, it is possible to advantageously use the automatic transmission $1_9$ in an FF-type vehicle.

Furthermore, because the counter gear 15 is located axially intermediate the planetary gear unit PU and the planetary gear set DP and is supported by a support member 120a, it is possible to position the counter gear 15 axially closer to the input side, to position the counter shaft portion 80 and the differential gear portion 90 near the torque converter 7, and to make the automatic transmission $1_9$ more compact. It is thereby possible to prevent interference between transmission, differential, etc. and the frame of the vehicle, and to facilitate the mounting of the automatic transmission $1_9$ in the vehicle.

In addition, because the carrier CR1 is linked to the input shaft 12 on the planetary gear unit PU side and is axially linked to the hub member 112, which is the transfer member of the input side of the second clutch C-2, at the side of the planetary gear set DP that is axially opposite the planetary gear unit PU, it is possible to link the carrier CR1, the transfer member 112, and the input shaft 12 without making these members complicated, and it is possible to make the automatic transmission $1_9$ more compact.

In addition, because the hub member 116 of the first brake B-1 and the transfer member 104 that is linked thereto are axially linked to the sun gear S2 on the side of the planetary gear unit PU that is axially opposite the planetary gear set DP, it is possible to link the hub member 116 of the first brake B-1, the transfer member 104, and the sun gear S2 without making these members complicated and to thereof make the automatic transmission $1_9$ more compact.

In addition, because the planetary gear set DP includes the non-rotary sun gear S1, a carrier CR1 that rotatably supports the pinion gear P1 and the pinion gear P2 and that is linked to the output shaft 12, and a ring gear R1 that meshes with the pinion gear P2 and outputs a reduced speed rotation, it is possible to output a reduced speed rotation, i.e. at a speed that is less than that of the input rotation of the input shaft 12, from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and with the short pinion P3, the carrier CR2 that selectively rotatably supports the short pinion P3 and the long pinion P4, and the ring gear R3 that meshes with the long pinion P4, it is possible to prevent high speed rotation of each of the rotary elements and to provide advantageous gear ratios while enabling each of the rotary elements of the planetary gear unit PU and the output side members of each of the clutches and brakes to be linked without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, a structure becomes possible in which the sun gear S2 is positioned at the farthest left end of the ordinate and, in sequence to the right thereof, are the carrier CR2, the ring gear R3 that is linked to the counter gear 15, and the sun gear S3.

Tenth Embodiment

Figure 15:
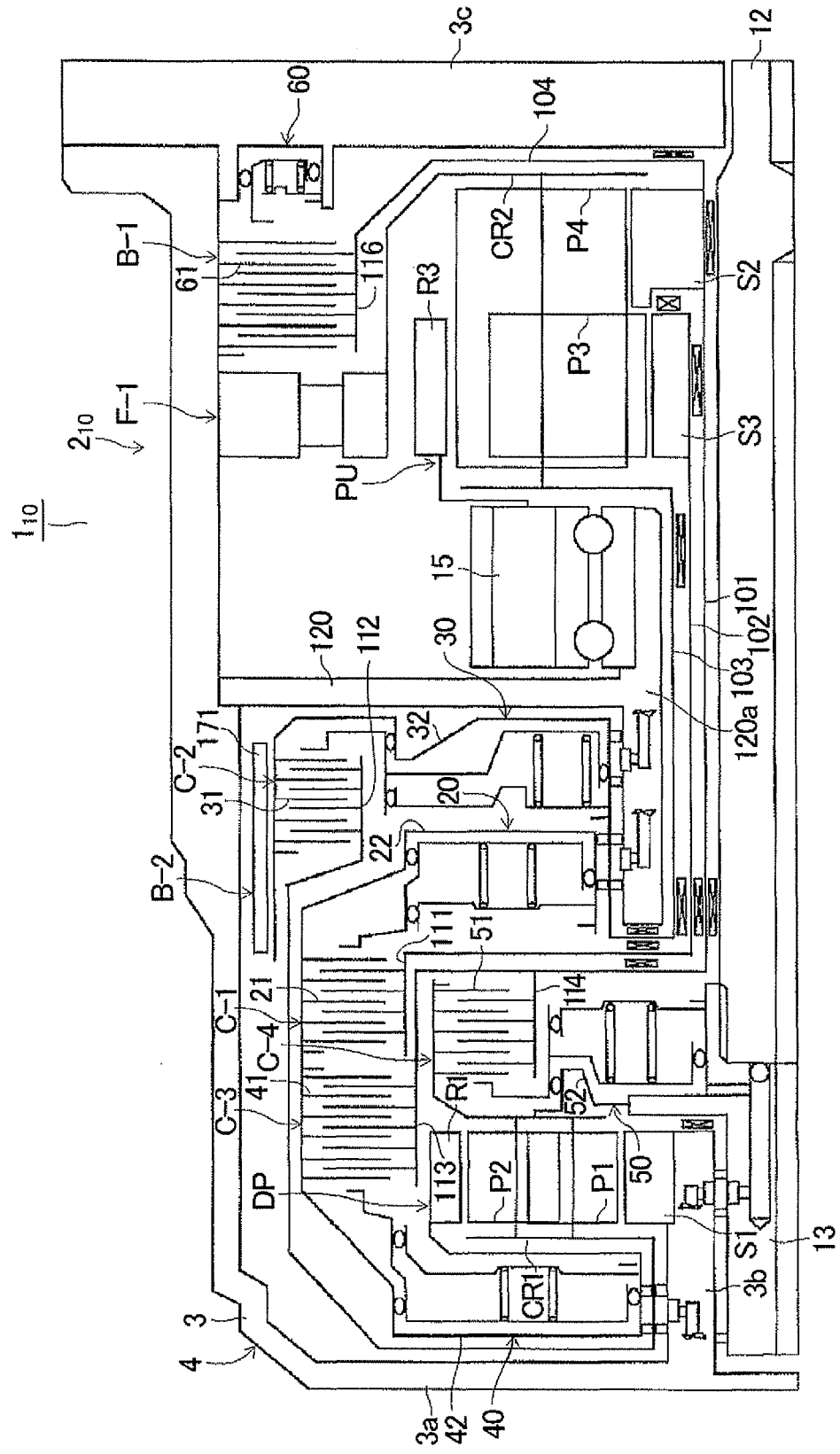
FIG. 15 is a cross-sectional view of an automatic transmission $1_{10}$ according to a tenth embodiment.

Next, a tenth embodiment, in which a portion of the fifth embodiment is modified, will be explained with reference to FIG. 15 which is a cross-sectional view of an automatic transmission $1_{10}$ according to the tenth embodiment. In the description of the tenth embodiment below, the structures that are identical to those of the automatic transmission $1_5$ according to the fifth embodiment are denoted by identical reference numerals, and their description is omitted.

In the automatic transmission $1_{10}$ according to a tenth embodiment the general arrangement of the input shaft 12, the intermediate shaft 13 and the engine is retained. However, the disposition of the first to fourth clutches C-1 to C-4, the first and second brakes B-1 and B-2, the one-way clutch F-1, the planetary gear set DP, the planetary gear unit PU, and the counter gear 15 is substantially reversed, that is, the speed change mechanism $2_{10}$ is similar to the speed change mechanism $2_5$ rotated left-right 180°.

Specifically, in the automatic transmission $1_{10}$, the hydraulic servo 40 of the third clutch C-3 is located on the side of the planetary gear set DP that is axially opposite the planetary gear unit PU. The hydraulic servo 50 of the fourth clutch C-4, the hydraulic servo 20 of the first clutch C-1, the hydraulic servo 30 of the second clutch C-2, and the counter gear 15 are located axially intermediate the planetary gear set DP and the planetary gear unit PU, and the hydraulic servo 60 of the first brake B-1 is located on the side of the planetary gear unit PU that is axially opposite the planetary gear set DP.

In the automatic transmission $1_{10}$ of the tenth embodiment, because it is necessary to transfer the input rotation to the fourth clutch C-4 through the inner circumferential side of the planetary gear unit PU, it is not possible to separate the input shaft 12 from the intermediate shaft 13. Accordingly, in this embodiment, the input shaft 12 and the intermediate shaft 13 are splined together.

In the automatic transmission $1_{10}$, because the fourth clutch C-4 is interposed in the transfer path to connect the input shaft 12 and the sun gear S2, the second clutch C-2 is interposed in the transfer path to connect the carrier CR1 and the carrier CR2, and the output side transfer member 103 of the second clutch C-2 is linked to the side of the carrier CR2 facing the planetary gear set DP, it is possible to avoid inclusion of a member enclosing the planetary gear unit PU. Thereby, the automatic transmission $1_{10}$ can be made more radially compact. In addition, it is possible to shorten the transfer member that requires a high rigidity, to reduce the weight, and to improve the controllability of the automatic transmission $1_{10}$. Furthermore, the structure allows lubricating oil to be readily discharged where needed to ensure cooling performance. In addition, the assembly of the automatic transmission $1_{10}$ is simplified. Furthermore, because the working oil for the clutches is supplied from support wall 120, due to the configuration of each of the clutches, it is possible to reduce the number of seal rings, to reduce the sliding resistance of the seal rings, and to improve the power transfer efficiency of the automatic transmission $1_{10}$.

In addition, because the hydraulic servo 30 of the second clutch C-2 is located axially intermediate the planetary gear unit PU and the planetary gear set DP, it is possible to supply working oil to the hydraulic servo 30 of the second clutch C-2 from an oil duct provided in the support wall 120. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{10}$.

In addition, because the hydraulic servo 50 of the fourth clutch C-4 is located axially intermediate the planetary gear unit PU and the planetary gear set DP and adjacent to the planetary gear set DP, it is possible for portions of the carrier CR1 and the clutch drum 52 to be shared in common (that is, the clutch drum 52 and the side plate of the carrier CR1), and to thereby reduce the weight and size.

Furthermore, because the hydraulic servo 40 of the third clutch C-3 is located on the side of the planetary gear set DP that is axially opposite the planetary gear unit PU, it is possible to supply the working oil to the hydraulic servo 40 of the third clutch C-3 from an oil duct in the boss 3b. Thereby, in comparison to a structure in which the working oil is supplied from an oil duct provided in the input shaft 12, it is possible to reduce the number of seal rings, to reduce the sliding resistance of the seal rings, and to improve the power transfer efficiency of the automatic transmission $1_{10}$.

In addition, because the hydraulic servo 20 of the first clutch C-1 is located axially intermediate the planetary gear unit PU and the planetary gear set DP, it is possible to supply the working oil to the hydraulic servo 20 of the first clutch C-1 from an oil duct in the support wall 120. Thereby, in comparison to a structure in which the working oil is supplied from an oil duct provided in the input shaft 12, it is possible to reduce the number of seal rings, to reduce the sliding resistance of the seal rings, and to improve the power transfer efficiency of the automatic transmission $1_{10}$.

Because of provision of a first brake B-1 that selectively locks the sun gear S2 to the case 4 against rotation and because the hydraulic servo 60 of the first brake B-1 is located on the side of planetary gear unit PU that is axially opposite the planetary gear set DP, the locking force transfer member of the first brake B-1 and the sun gear S2 can be linked without making these members complicated, and it is possible to make the automatic transmission $1_{10}$ more compact.

In the automatic transmission $1_{10}$ of the tenth embodiment, the transfer member 103 of the output side of the second clutch C-2 extends around the outer circumference side of the transfer members 101, 102, the hub 114 of the fourth clutch C-4, through the transfer member 101, is linked to the sun gear S2, and the transfer member 104, the transfer member 101, the output side of third clutch C-3, and the sun gear S2, which rotate integrally, are disposed radially inward of the transfer member 102. The transfer member 101, which rotates faster than the transfer member 103, is located further toward the radially inner side than the transfer member 102, which is on the inner circumferential side of the transfer member 103. Thus, it is possible to make the diameter of the transfer member 101 of the output side of the fourth clutch C-4, smaller than the diameter of the transfer member 103 of the output side of the second clutch C-2, and to reduce the weight as compared to a structure in which transfer member 101 is on the outer circumferential side. In addition, because the inertia is reduced in comparison to a structure in which transfer member 101 is disposed on the outer circumferential side, it is possible to improve the controllability of the automatic transmission $1_{10}$.

The third and first clutches C-3, C-1 are located on the planetary gear set DP side, the transfer members 101, 102 are respectively linked to the sun gear S2 and the sun gear S3, the fourth clutch C-4 is located on the side of the planetary gear unit PU that is axially opposite the planetary gear set DP, the transfer member 101 is linked to the sun gear S2, the second clutch C-2 is located on the planetary gear set DP side, and the transfer member 103 of the output side of the second clutch C-2 extends axially with and on the outer circumferential side of the transfer members 101, 102. Because the transfer member 101, which rotates faster than the transfer member 103, is on the radially inner side, the diameter of the transfer member 101 can be made smaller than the diameter of the transfer member 103, and it is possible to thereby reduce the weight as compared to a structure in which the transfer member 101 is on the outer circumferential side of transfer member 103. In addition, because the inertia is reduced as compared to a structure in which transfer member 101 is on the radially outer side, it is possible to improve the controllability of the automatic transmission $1_{10}$.

Furthermore, because the transfer member of the input side of the fourth clutch C-4 is linked to the carrier CR1 and a portion of the carrier CR1 forms a portion of the hydraulic servo 50 of the fourth clutch C-4, it is possible to use portions of the carrier CR1 and the hydraulic servo 50 (that is, portions of the clutch drum 52 and the side plate of the carrier CR1) in common, and thereby reduce size and weight.

Counter gear 15 is linked to the ring gear R3 and is located axially intermediate the planetary gear unit PU and the planetary gear set DP. A support member 120a supports the counter gear 15. The hub 112 of the second clutch C-2 extends around the outer circumference of the third and first clutches C-3, C-1 to link with the carrier CR1. A portion of the transfer member 103 of the output side of the second clutch C-2 forms as the clutch drum 32 of the hydraulic servo 30 of the second clutch C-2, and the hydraulic servo 30 is supported on the support member 120a between the planetary gear set DP and the counter gear 15. Therefore, it is possible to supply the working oil to the hydraulic servo 30 of the second clutch C-2 from an oil duct c30 in support member 120a. Thus, in comparison to a structure in which the working oil is supplied from an oil duct in the input shaft 12, it is possible to reduce the number of seal rings, to reduce the sliding friction of the seal rings, and to improve the power transfer efficiency of the automatic transmission $1_{10}$.

In addition, boss 3b holds the sun gear S1 stationary, a portion of the transfer member of the input side of the third clutch C-3 forms a portion of a clutch drum 42 of the hydraulic servo 40 of the third clutch C-3, and the hydraulic servo 40 is supported on the boss 3b axially intermediate the planetary gear set DP and the side wall 3a. The transfer member of the input side of the first clutch C-1 is linked to the transfer member of the input side of the third clutch C-3, and a portion of the transfer member of the input side of the first clutch C-1 forms the clutch drum 22 of the hydraulic servo 20 of the first clutch C-1. The hydraulic servo 20 is supported on the support member 120a axially intermediate the planetary gear set DP and the hydraulic servo 30 of the second clutch C-2. Therefore, it is possible to supply the working oil to the hydraulic servo 40 of the third clutch C-3 from an oil duct c40. Thus, in comparison to a structure in which, for example, the hydraulic servo 40 of the third clutch C-3 is disposed on the input shaft 12, spaced from the boss 3b, and the working oil is supplied via an oil duct in the input shaft 12, it is possible to shorten the length of the oil duct by an amount equivalent to the length of an oil duct in the input shaft 12, and to improve the controllability of the automatic transmission $1_{10}$. In addition, it is possible to supply the working oil to the hydraulic servo 20 of the first clutch C-1 from an oil duct c20 that extends through the support wall 120 and the support member 120a. Thus, in comparison to a structure in which, for example, the working oil is supplied from an oil duct in the input shaft 12, it is possible to reduce the number of seal rings, to reduce the sliding resistance of the seal rings, and to improve the power transfer efficiency of the automatic transmission $1_{10}$.

Because a counter shaft 81 is arranged in parallel with the input shaft 12 and is linked via the counter gear 15 to the ring gear R3 so as to receive the output rotation from the ring gear R3, it is possible to advantageously use the automatic transmission $1_{10}$ in an FF-type vehicle.

Furthermore, because the counter gear 15 is located axially intermediate the planetary gear unit PU and the planetary gear set DP and is supported by support member 120a, it is possible to locate the counter gear 15 axially closer to the input side, to position the counter shaft portion 80 and the differential gear portion 90 near the torque converter 7 side, and to make the automatic transmission $1_{10}$ more compact. It is thereby possible to prevent interference between the differential, transmission, etc. and the frame of the vehicle, and to facilitate the mounting of the automatic transmission $1_{10}$ in the vehicle.

In addition, because the carrier CR1 is linked to the input shaft 12 on its side facing the planetary gear unit PU and is axially linked to the hub member 112, which is the transfer member of the input side of the second clutch C-2, at the side of the planetary gear set DP that is axially opposite the planetary gear unit PU, it is possible to link the carrier CR1, the transfer member 112 of the input side of the second clutch C-2, and the input shaft 12 without making these members complicated, and to make the automatic transmission $1_{10}$ more compact.

In addition, because the hub 116 of the first brake B-1 and the transfer member 104 are axially linked to the sun gear S2 on the side of the planetary gear unit PU that is axially opposite the planetary gear set DP, it is possible to link the hub member 116 of the first brake B-1, the transfer member 104, and the sun gear S2 without making these members complicated, and it is possible to make the automatic transmission $1_{10}$ more compact.

In addition, because the planetary gear set DP includes the sun gear S1, which is held stationary by the case 4, a carrier CR1 that rotatably supports the pinion gear P1 and the pinion gear P2 and is linked to the output shaft 12, and a ring gear R1 that meshes with the pinion gear P2 and outputs a reduced speed rotation, it is possible to output a reduced speed rotation, i.e. at a speed less than that of the input rotation of the input shaft 12, from the ring gear R1.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and with the short pinion P3, the carrier CR2 that selectively rotatably supports the short pinion P3 and the long pinion P4, and the ring gear R3 that meshes with the long pinion P4, it is possible to prevent high speed rotation of each of the rotary elements and to provide advantageous gear ratios, while enabling the linking of each of the rotary elements of the planetary gear unit PU and the output side members of each of the clutches and brakes without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the farthest left end of the ordinate and, in sequence to the right thereof, are the carrier CR2, the ring gear R3 that is linked to the counter gear 15, and the sun gear S3.

Eleventh Embodiment

Next, an eleventh embodiment which is a modification of the first through tenth embodiments, will be explained with reference to FIG. 16 which is a cross-sectional view of the automatic transmission $1_{11}$ according to the eleventh embodiment.

Figure 16:
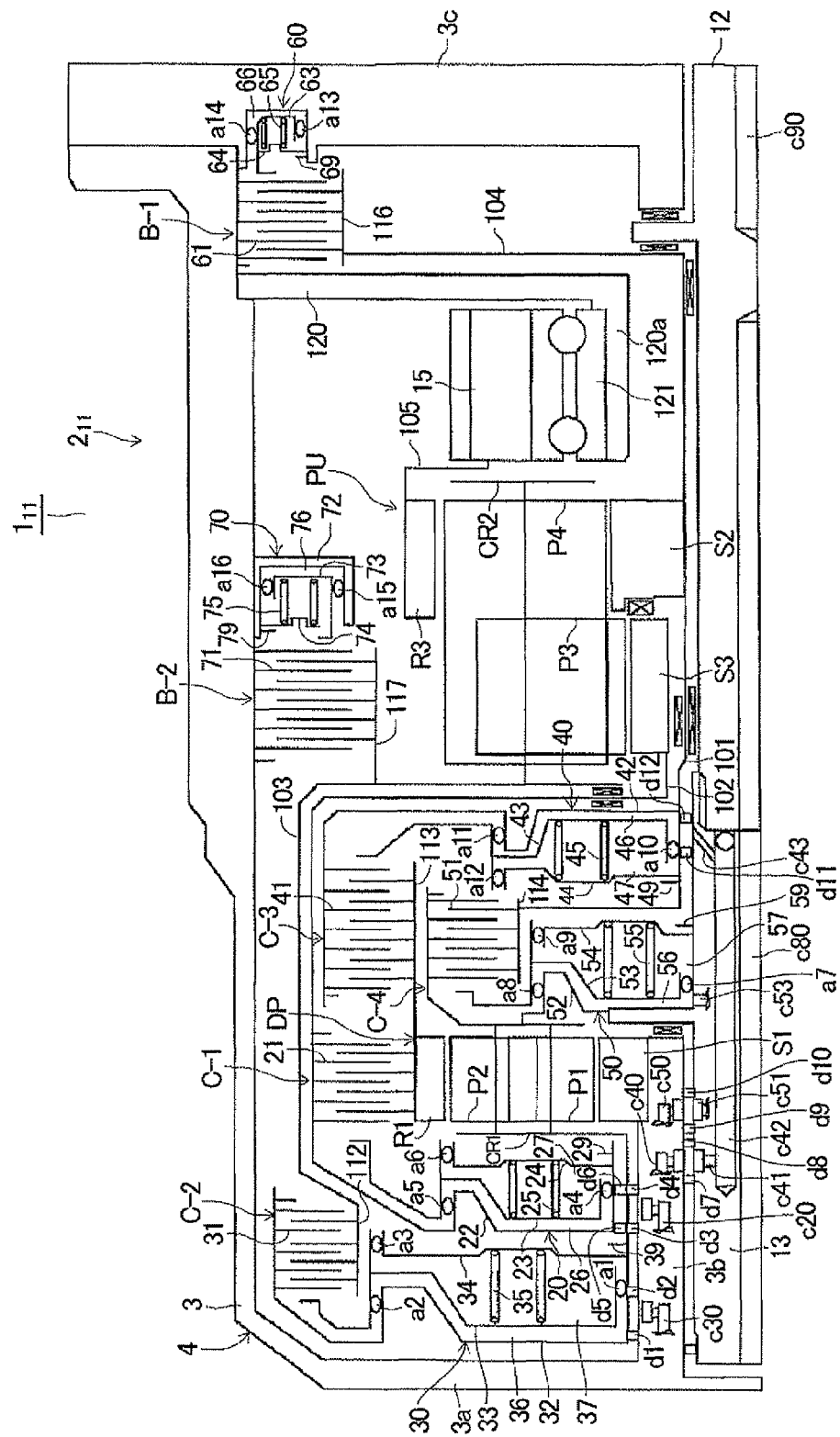
FIG. 16 is a cross-sectional view of an automatic transmission $1_{11}$ according to an eleventh embodiment.

FIG. 16 shows the schematic structure of the overall automatic transmission $1_{11}$ of the eleventh embodiment. The relationships of the various components will first be explained.

As shown in FIG. 16, the automatic transmission $1_{11}$ has a speed change mechanism $2_{11}$ housed in transmission case 3. In the transmission case 3, the planetary gear unit PU is disposed around the input shaft 12, and axially arranged in sequence from the left side, are the second clutch C-2, the first clutch C-1, the planetary gear set DP, the fourth clutch C-4, and the third clutch C-3, on the left side of the planetary gear unit PU. The counter gear 15 and the first brake B-1 are axially arranged on the right side of the planetary gear unit PU. The second brake B-2 is located on the outer circumferential side of the planetary gear unit PU.

On the left side of the planetary gear unit PU, arranged in axial sequence from the left, are the friction plates 31 of the second clutch C-2, the friction plates 21 of the first clutch C-1, and the friction plates 41 of the third clutch C-3 are disposed at a relatively outer radial side inside the transmission case 3, while the friction plates 51 of the fourth clutch C-4 are located radially inward of the friction plates 41 of the third clutch C-3.

A boss 3b extends from the inner side wall portion 3a of the transmission case 3, and the hydraulic servo 30 of the second clutch C-2 and the hydraulic servo 20 of the first clutch C-1 are supported on the boss 3b. The planetary gear set DP is located radially inward of the friction plates 21, and the hydraulic servo 50 of the fourth clutch C-4 is disposed adjacent the right side of the planetary gear set DP. The hydraulic servo 40 of the third clutch C-3 is located to the right side of the hydraulic servo 50 of the fourth clutch C-4. Specifically, on the left side of the transmission case 3, supported on the boss 3b, are the hydraulic servo 30, the hydraulic servo 20, and the planetary gear set DP, and on the intermediate shaft 13, the hydraulic servo 50 and the hydraulic servo 40.

A flange-shaped support wall (center support member) 120 extends from the inner circumferential surface of the transmission case 3, and includes an axially extending leg portion (support member) 120*a* which rotatably supports the counter gear 15 via the ball bearing assembly 121.

The friction plates 71 of the second brake B-2 and the hydraulic servo 70 of the second brake B-2 are located radially outward of the planetary gear unit PU. The counter gear 15, which is rotatably supported on the support member 120*a*, is located on the right side of the transmission in the figure, that is, on the right side of the planetary gear unit PU, and the friction plates 61 of the first brake B-1 and the hydraulic servo 60 of the first brake B-1 are located on the right side of support wall 120.

In this manner, the hydraulic servo 30 of the second clutch C-2 and the hydraulic servo 20 of the first clutch C-1 are located on the side of the planetary gear set DP that is axially opposite the planetary gear unit PU, the hydraulic servo 50 of the fourth clutch C-4 and the hydraulic servo 40 of the third clutch C-3 are located axially intermediate the planetary gear set DP and the planetary gear unit PU, and the counter gear 15 and the hydraulic servo 60 of the first brake B-1 are located on the side of the planetary gear unit PU that is axially opposite the planetary gear set DP.

The structure of the various components inside of the transmission case 3 will now be explained with reference to FIG. 16.

The planetary gear set DP includes a sun gear S1, a carrier CR1, and a ring gear R1. The sun gear S1 is held stationary by the boss 3*b*. The carrier CR1 has two carrier plates, right and left, and rotatably supports the pinions P1 and P2. These pinions P1 and P2 mesh with each other, and at the same time, the former pinion P1 meshes with the sun gear S1 and the latter pinion P2 meshes with the ring gear R1. The right-side carrier plate is connected to the intermediate shaft 13, and the left-side carrier plate is connected to the clutch drum 32 that is spline engaged with the outer friction plates 31 of the second clutch C-2. The inner friction plates 21 of the first clutch C-1 are spline engaged with the outer circumferential surface of the ring gear R1. In addition, the hub member 113 is connected to the right side of the ring gear R1, and the inner friction plates 41 of the third clutch C-3 are spline engaged with the hub member 113.

The first clutch C-1 is supported on the boss 3*b* via the radially inner portion of the clutch drum 32, on the right side of the planetary gear set DP described above. The first clutch C-1 includes friction plates 21 and a hydraulic servo 20 that engages/disengages these friction plates 21. Hydraulic servo 20 includes a clutch drum 22, a piston member 23, a cancel plate 24, and a return spring 25, an oil chamber 26 and the cancel oil chamber 27. The radially inner portion of the clutch drum 22 is located on the radially outer side of the radially inner portion of the clutch drum 32 of the second clutch C-2, and the outer friction plates of the friction plates 21 are spline engaged to the inner circumferential surface of the radially outer portion of the clutch drum 22. The distal end of the radially outer portion is connected to the transfer member 102 that links to the sun gear S3 of the planetary gear unit PU. The inner friction plates 21 are spline engaged to the outer circumferential surface of the ring gear R1. The piston member 23 is mounted for axial movement toward and away from the right side of the clutch drum 22, and an oil-tight oil chamber 26 is formed in the space between the piston 23 the clutch drum 22 by the seal rings a1 and a2. The cancel plate 24 is prevented from moving toward the right side by a snap ring 29 that is fit on the clutch drum 22. A return spring 25 is compressed between the cancel plate 24 and the piston 23 that is disposed to the left side thereof, and an oil-tight cancel oil chamber 27 is formed by the sealing rings a4 and a6.

The second clutch C-2 is disposed on the left side of the first clutch C-1, and is supported on the boss 3*b*. The second clutch C-2 includes friction plates 31 and a hydraulic servo 30 that operates these friction plates 31. The hydraulic servo 30 includes a clutch drum 32, a piston 33, a cancel plate 34, a return spring 35, the oil chamber 36 and the cancel oil chamber 37. The right side portion of the radially inner portion of the clutch drum 32 is linked to the carrier CR1 of the planetary gear set DP, the hydraulic servo 20 of the first clutch C-1 is disposed on the radially outer portion on the right side of the clutch drum 32, and the hydraulic servo 30 is enclosed on its left side by the clutch drum 32. In addition, the outer friction plates 31 are spline engaged to the inner circumferential surface of the radially outer portion of the clutch drum 22, and the inner friction plates 31 are spline engaged to the hub 112. This hub 112 extends around the outer circumference side of the first clutch C-1, the planetary gear set DP, the fourth clutch C-4, and the third clutch C-3, to link with the transfer member 103 that is connected to the left side plate of the carrier CR2. The piston 33 is mounted for axial movement on the right side of the clutch drum 32, and an oil-tight oil chamber 36 is formed in the space between the piston 33 and the clutch drum 32 by the seal rings a1 and a2. The cancel plate 34 is prevented from moving toward the right by a snap ring 39 that is fit on the clutch drum 32. A return spring 35 is compressed between the cancel plate 34 and the piston member 33 that is located to the right of the cancel plate 34, and an oil-tight cancel oil chamber 37 is formed by the seal rings a1 and a3.

Because the clutch drum 32 of second clutch C-2 is connected to the input shaft 12 via the intermediate shaft 13 and the carrier CR1, for receiving input rotation at the same speed as that of the rotation of the input shaft 12, it is possible to provide an input rotational speed sensor on the outer circumferential side of the clutch drum 32 for measuring the input rotational speed, and, in comparison to an arrangement in which the input rotational speed sensor is located so as to directly measure the rotational of the input shaft 12, it is possible to more easily mount the input rotational speed sensor.

The fourth clutch C-4, on the right side of the planetary gear unit PU, is located radially inward of the friction plates 41 of the third clutch C-3, and includes friction plates 41 and a hydraulic servo 50 that engages/disengages the friction plates 51. The inner friction plates 51 are spline engaged with the hub 114, and the hub 114 is linked to the transfer member 101 through the inner circumferential side of the hydraulic servo 40 of the third clutch C-3. The outer friction plates 51 are spline engaged with the inner circumferential surface of the clutch drum 52, the clutch drum 52 shares the right side plate of the carrier CR1 with the input shaft 12, that is, the clutch drum 52 is linked to the input shaft 12 via the intermediate shaft 13. In this manner, the fourth clutch C-4 can be directly engaged to and released from the input shaft 12 (intermediate shaft 13) and the sun gear S2, and not, for example, through the carrier CR1 of the planetary gear set DP.

The hydraulic servo 50 includes the clutch drum 52, a piston 53, a cancel plate 54, a return spring 55, an oil chamber 56 and the cancel oil chamber 57. As described above, the inner circumferential side of the clutch drum 52 is connected to the intermediate shaft 13, and a portion of the outer circumferential surface of the intermediate shaft 13 and hydraulic servo 50 is formed by portions of the outer circumferential surface of the intermediate shaft 13 and the clutch drum 52. The piston 53 is mounted for axial movement toward and away from the clutch drum 52, and an oil-tight oil chamber 56 is formed between the piston 53 and the clutch drum 52 by the seal rings a7 and a8. Thus, a portion of the clutch drum serves as the cylinder of hydraulic servo 50. The piston 53 is arranged to engage the front surface of the friction plates 51. Furthermore, the cancel plate 54 is prevented from moving toward the right side by a snap ring 59 that is fit on the outer circumferential surface of the radially inner portion of the clutch drum 52 described above, and a return spring 55 is compressed between the cancel plate 54 and the piston 53 that is disposed on the left side thereof to form an oil-tight cancel oil chamber 57 via the seal rings a7 and a9.

The third clutch C-3 is on the right side of the fourth clutch C-4 is supported on the intermediate shaft 13 via the transfer member 101, and includes friction plates 41 and a hydraulic servo 40 that engages/disengages these friction plates 41. The inner friction plates 41 are spline engaged to the outer circumferential surface of the hub 113, which is linked to the ring gear R1 as described above. The outer friction plates 41 are spline engaged to the inner circumferential surface of the clutch drum 42, and the clutch drum 42 is linked to the transfer member 101, which in turn is linked to the sun gear S2 of the planetary gear unit PU.

The hydraulic servo 40 includes a clutch drum 42, a piston 43, a cancel plate 44, and a return spring 45, the oil chamber 46 and the cancel oil chamber 47. At its inner circumference, the clutch drum 42 is connected to the transfer member 101, and a hydraulic servo 40 is formed by portions of the outer circumferential surface of the transfer member 101 and the clutch drum 42. The piston 43 is mounted for axial movement relative to the clutch drum 42, and an oil-tight oil chamber 46 is formed between the piston 43 and the clutch drum 42 by the seal rings a10 and a11. An outer radial extension of the piston 43 is axially opposite the front surface of the friction plates 41. The cancel plate 44 is prevented from moving toward the left by a snap ring 49 that is fit on the outer circumferential surface of the transfer member 101, and a return spring 45 is compressed between the cancel plate 44 and the piston 43 that is disposed on the right side thereof, and an oil-tight cancel oil chamber 47 is formed by the seal rings a10 and a12.

The second brake B-2 is located radially outward of the ring gear R3 of the planetary gear unit PU. The second brake B-2 includes friction plates 71 and a hydraulic servo 70 that operates these friction plates 71. The outer friction plates 71 are spline engaged to the inner circumferential surface of the transmission case 3, and the inner friction plates 71 are spline engaged to the hub 117 that is linked to the transfer member 103 described above (specifically, linked to the carrier CR2 of the planetary gear unit PU).

The hydraulic servo 70 includes a cylinder 72, a piston 73, a cancel plate 74, a return spring 75, and oil chamber 76 which is formed between the cylinder 72 and the piston 73. The piston 73 is mounted for axial movement, and its left side end is axially opposite the friction plates 71. An oil-tight oil chamber 76 is formed between the piston 73 and the transmission case 3 by the two seal rings a15 and a16. The cancel plate 74 is prevented from moving toward the left side by a snap spring 79 that is fit on the inner circumferential surface of the transmission case 3.

The first brake B-1 extends between the right side inner surface of the transmission case 3 and the partition wall 3c that separates the transmission case 3 and a housing case (not illustrated). The first brake B-1 includes friction plates 61 and a hydraulic servo 60 that operates these friction plates 61. The outer friction plates 61 are spline engaged to the inner circumferential surface of the transmission case 3, and the inner friction plates 61 are spline engaged to the hub 116 that is connected to the sun gear S2 of the planetary gear unit PU via the transfer member 104.

The hydraulic servo 60 includes a piston 63, a cancel plate 64, a return spring 65, and an oil chamber 66 formed in the space between the piston 63 and the cylinder formed by the partition wall 3c. The piston 63 is mounted for axial movement with its left side end axially aligned with the friction plates 61 in opposition thereto. An oil-tight oil chamber 66 is formed between the piston 63 and the cylindrical recess in the partition wall portion 3c by the two seal rings a13 and a14. The cancel plate 64 is prevented from moving toward the left by a snap spring 69 that is fit within the cylindrical recess in the partition wall 3c.

The planetary gear unit PU includes a sun gear S2, a sun gear S3, a short pinion P3 that meshes with the sun gear S3, a long pinion P4 that meshes with the sun gear S2 and the short pinion P3, and a carrier CR2 that rotatably supports the short pinion P3 and the long pinion P4 between side plates, and a ring gear R3 that meshes with the long pinion P4 to form what is termed a Ravigneaux planetary gear set.

A transfer member 104 that passes through the inner circumferential side of the counter gear 15 is linked to the right side of the sun gear S2, and the sun gear S2 connects to the hub 116 of the first brake B-1 via this transfer member 104. In addition, the transfer member 101 described above is linked to the left side of the sun gear S2, and the sun gear S2 is linked to the hub 114 of the fourth clutch C-4 and the clutch member 101 of the third clutch C-3 via this transfer member 101. The transfer member 102 is linked to the left side of the sun gear S3, and the sun gear S3 is linked to the clutch drum 22 of the first clutch C-1 via this linking member 102.

The left side plate of the carrier CR2, that is, the plate on the planetary gear set DP side, is linked to the transfer member 103, and the carrier CR2 is linked to the hub member 112 of the second clutch C-2 via this transfer member 103. In addition, the carrier CR2 is linked to the hub 117 of the second brake B-2 via this transfer member 103. The ring gear R3 is linked to the counter gear 15 via the transfer member 105. The counter gear 15 meshes with the large diameter gear 82 that is linked with the counter shaft 81 to transfer rotation to the left and right wheels 93l and 93r (that is, the drive wheels) via the counter shaft portion 80 and the differential gear portion 90.

Next, the structure of each of the oil ducts and the supply of the working oil will be briefly explained. The oil duct c30 in the boss 3b communicates with the oil chamber 36 of the hydraulic servo 30 of the second clutch C-2, that is, the oil chamber 36 that is formed by sealing the space between the clutch drum 32 and the piston 33 by the seal rings a1 and a2. Oil is supplied through the space between the clutch drum 32 and the boss 3b defined between the seal rings d1 and d2, from an oil duct (not illustrated) to the cancel oil chamber 37 that is formed by sealing the space between the piston 33 and the cancel plate 34 with the seal rings a1 and a3.

In addition, the oil duct c20 in the boss 3b communicates with the oil chamber 26 of the hydraulic servo 20 of the first clutch C-1, that is, the oil chamber 26 that is formed by sealing the space between the clutch drum 22 and the piston member 23 with the seal rings a4 and a5. This supply is through the space between the clutch drum 32 of the second clutch C-2 and the boss 3b defined between the seal rings d3 and d4 and through the space between the clutch drum 32 and the clutch drum 22 defined between the seal rings d5 and d6. Note that oil is supplied from an oil duct (not illustrated) to the cancel oil chamber 27 that is formed by sealing the space between the piston member 23 and the cancel plate 24 by the seal rings a4 and a6.

In addition, the oil duct c50 in the boss 3b communicates, via the oil duct c51 in the intermediate shaft 13, an axial oil duct (not illustrated), and the oil duct c53, with the oil chamber 56 of the hydraulic servo 50 of the fourth clutch C-4, that is, the oil chamber 56 formed by sealing the space between the clutch drum 52 and the piston member 53 by the sealing rings a7 and a8. This communication is through the space between the boss 3b and the intermediate shaft 13 defined between the seal rings d9 and d10. Note that oil is supplied from an oil duct (not illustrated) to the cancel oil chamber 57 that is formed by sealing the space between the piston member 53 and the cancel plate 54 with the seal rings a7 and a9.

In addition, the oil duct c40 in the boss 3b communicates, via the oil ducts c41, c42, and c43 in the intermediate shaft 13, with the oil chamber 46 of the hydraulic servo 40 of the third clutch C-3, that is, the oil chamber 46 formed by sealing the space between the clutch drum 42 and the piston member 43 with the seal rings a10 and a11. This communication is through a the space between the boss 3b and the intermediate shaft 13 defined by the seal rings d7 and d8 and by sealing the space between the intermediate shaft 13 and the transfer member 101 (that is, the clutch drum) defined between the seal rings d11 and d12. Note that oil is also supplied from an oil duct (not illustrated) to the cancel oil chamber 47 that is formed by sealing the space between the piston member 43 and the cancel plate 44 by the seal rings a10 and a12.

In addition, working oil is supplied from an oil duct (not illustrated) in the partition wall portion 3c to the oil chamber 66 of the hydraulic servo 60 of the first brake B-1, that is, the oil chamber 66 that is formed by sealing the space between the side wall 3c of the transmission case 3 and the piston member 63 with the seal rings a13 and a14.

In addition, working oil is supplied from an oil duct in the transmission case 3 (not illustrated) to the oil chamber 76 of the hydraulic servo 70 of the second brake B-2, that is, the oil chamber 76 that is formed by sealing the space between the cylinder member 72 and the piston member 73 by the seal rings a15 and a16.

An oil duct c80 extends axially within the input shaft 12 and the intermediate shaft 13, and receives lubricating oil from an oil duct (not illustrated) in the boss 3b. A plurality of holes (not illustrated) bored into the input shaft 12 and the intermediate shaft 13 extend radially from the oil duct c80, through which lubricating oil is supplied to the speed change mechanism $2_{11}$ in the form of a spray.

An axial oil duct c90 formed in the input shaft 12 communicates with the lock-up clutch 10 described above via an oil duct (not illustrated), and responsive to supply of working oil from a hydraulic control apparatus (not illustrated) via an oil duct (not illustrated) in the partition wall 3c, the lock-up clutch 10 is engaged.

The automatic transmission $1_{11}$ eliminates a member enclosing the planetary gear unit PU because the fourth clutch C-4 is interposed in the transfer path to connect input shaft 12 and the sun gear S2, the second clutch C-2 is interposed in the transfer path to connect the carrier CR1 and the carrier CR2, and the output side transfer member 103 of the second clutch C-2 is axially linked to the side of the carrier CR2 facing the planetary gear set DP. The automatic transmission $1_{11}$ is thereby made more radially compact. In addition, it is possible to shorten the transfer member, which requires a high rigidity, to reduce the weight, and to improve the controllability of the automatic transmission. Furthermore, the structure enables lubricating oil to be readily discharged where needed, and to ensure the cooling capacity/performance. In addition, it is possible to simplify the assembly of the automatic transmission $1_{11}$ for a vehicle. Furthermore, the configuration of each of the clutches enables supply of working oil thereto from the support wall 120. Thus, it is possible to reduce the number of seal rings, to reduce the sliding resistance of the seal rings, and to improve the power transfer efficiency of the automatic transmission $1_{11}$.

In addition, because the hydraulic servo 50 of the fourth clutch C-4 is located axially intermediate the planetary gear unit PU and the planetary gear set DP and adjacent the planetary gear set DP, it is possible to partially form the carrier CR1 and the clutch drum 52 (that is, the clutch drum 52 and the side plate of the carrier CR1) in common, and it is possible to reduce the size and weight.

Furthermore, because the hydraulic servo 30 second clutch C-2 is located on the side of the planetary gear set DP that is axially opposite the planetary gear unit PU, it is possible to supply the working oil from the oil duct that is provided in the boss 3b to the hydraulic servo 30 of the second clutch C-2. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{11}$.

Furthermore, because the hydraulic servo 40 of the third clutch C-3 is located axially intermediate the planetary gear unit PU and the planetary gear set DP, in comparison to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and to shorten the output side transfer member of the third clutch C-3, which requires strength for transferring a high torque. Thereby, it is possible to reduce the weight, and to improve the controllability of the automatic transmission $1_{11}$.

Furthermore, because the hydraulic servo 20 of the first clutch C-1 is disposed on the side of the planetary gear set DP that is axially opposite the planetary gear unit PU, it is possible to supply the working oil to the hydraulic servo 20 of the first clutch C-1 from an oil duct in the boss 3b. Thereby, in comparison to a structure in which working oil is supplied from an oil duct in the input shaft 12, it is possible to reduce the number of seal rings, to reduce the sliding resistance of the seal rings, and to improve the power transfer efficiency of the automatic transmission $1_{11}$.

Because first brake B-1 that selectively locks the rotation of the sun gear S2 has a hydraulic servo 60 located on the side of counter gear set 15 that is axially opposite the planetary gear unit PU, and because the locking force transfer member of the first brake B-1 links to the sun gear S2 by passing through the inner circumferential side of the counter gear 15, it is possible to link the locking force transfer member of the first brake B-1 and the sun gear S2 without making these members complicated, and to make the automatic transmission $1_{11}$ more compact.

In the automatic transmission $1_{11}$ according to the present invention as explained above, the transfer member 103 of the output side of the second clutch C-2 extends coaxially with and radially outward of the transfer members 101, 102 of the output side of the third and first clutches C-3, C-1. The transfer member 101 of the output sides of the fourth clutch C-4 and the third clutch C-3 is linked to the sun gear S2, and the transfer member 104 of the output sides of the fourth clutch C-4 and the third clutch C-3, which rotate integrally, are disposed radially inward of the transfer member 102 of the output side of the first clutch C-1. Thereby, the transfer member 101 of the output side of the fourth clutch C-4, which rotates faster than the transfer member 103 of the output side of the second clutch C-2, is further radially inward than the transfer member 102 of the output side of the first clutch C-1, which, in turn, is radially inward of the transfer member 103 of the output side of the second clutch C-2. Therefore, the diameter of the transfer member 101 of the output side of the fourth clutch C-4 is smaller than the diameter of the transfer member 103 of the output side of the second clutch C-2, and it is possible to reduce the weight as compared to a structure in which transfer member 101 is the radially outermost member. In addition, because the inertia is reduced in comparison to a structure in which the transfer member 101 is disposed on the radially outer side, it is possible to improve the controllability of the automatic transmission $1_{11}$.

In addition, the third and first clutches C-3, C-1 are disposed on the planetary gear set DP, the transfer members 101, 102 of the output sides of the third and first clutches C-3, C-1 are linked respectively to the sun gear S2 and the sun gear S3, the fourth clutch C-4 is disposed on the side of the planetary gear unit PU that is axially opposite the planetary gear set DP, the transfer member 101 of the output side of the fourth clutch C-4 is linked to the sun gear S2, the second clutch C-2 is located on the planetary gear set DP side, and the transfer member 103 of the output sides of the second clutch C-2, C-1 extends around the outer circumference of the transfer members 101, 102 to link to the carrier CR2. Thereby, because the transfer member 101 of the output side of the fourth clutch C-4, which rotates faster than the transfer member of the output side of the second clutch C-2, is on the radially inner side, the diameter of the transfer member 101 can be made smaller than the diameter of the transfer member 103, and it is possible to reduce the weight as compared to a structure in which transfer member 101 is disposed on the outer side. In addition, because it is possible to reduce the inertia in comparison to a structure in which transfer member 101 is on the outside, it is possible to improve the controllability of the automatic transmission $1_{11}$.

Furthermore, because the transfer member of the input side of the fourth clutch C-4 is directly linked to the carrier CR1 and a portion of the carrier CR1 forms a portion of the hydraulic servo 50, i.e. because portions of the clutch drum 52 and the side plate of the carrier CR1 are used in common, it is possible to reduce the weight and size.

Because the transfer member of the input side of the second clutch C-2 is linked to the carrier CR1, because a portion of the transfer member of the input side of the second clutch C-2 forms a portion of the clutch drum 32, and because the hydraulic servo 30 is supported on the boss 3b axially intermediate the planetary gear set DP and the side wall 3a, it is possible to supply the working oil to the hydraulic servo 30 of the second clutch C-2 from an oil duct c30 in the boss 3b. Thus, in comparison to a structure in which, for example, the hydraulic servo 30 of the second clutch C-2 is disposed on the input shaft 12, separated from the boss 3b, and the working oil is supplied via an oil duct in the input shaft 12, it is possible to shorten the length of the oil duct by the length of an oil duct in the input shaft 12, and it is possible to improve the controllability of the automatic transmission $1_{11}$.

In addition, because the hub 111 of the first clutch C-1 is linked to the ring gear R1, because the transfer member 102 clutch C-1 is linked to the sun gear S3, because a portion of the transfer member 102 of clutch C-1 forms as the clutch drum 22 of the hydraulic servo 20 of the first clutch C-1, and because the hydraulic servo 20 is mounted on the boss 3b axially intermediate the planetary gear set DP and the hydraulic servo 20 of the first clutch C-1, it is possible to supply the working oil to the hydraulic servo 20 of the first clutch C-1 from an oil duct c20 in the boss 3b. Thus, in comparison to a structure in which, for example, the hydraulic servo 20 of the first clutch C-1 is disposed on the input shaft 12, separated from the boss 3b, and the working oil is supplied via an oil duct in the input shaft 12, it is possible to shorten the length of an oil duct in the input shaft 12, and to improve the controllability of the automatic transmission $1_{11}$.

In addition, because a counter gear 15, which is linked to the ring gear R3 of the planetary gear unit PU, is located on the side of the planetary gear unit PU that is axially opposite the planetary gear set DP, and because the friction plates 71 of brake B-2 are located radially outward of the planetary gear unit PU, the hub member 117 of the second brake B-2 can use the transfer member 103 and the output side of the second clutch C-2 in common to link to the carrier CR2 and, as compared, for example, to a structure in which a band brake is disposed around the outer circumference of the transfer member 103, it is possible to dispose multi-plate brakes in a space on the radially outer side of the planetary gear unit PU, in a relatively compact structure.

Furthermore, because a counter shaft 81 is arranged in parallel with the input shaft 12 and linked to the counter gear 15 to receive the output rotation from the ring gear R3, the automatic transmission $1_{11}$ is advantageously used in an FF-type vehicle.

In addition, because the counter gear 15 is located on the side of the planetary gear unit PU that is axially opposite the planetary gear set DP and is supported by the support member 120a, it is possible to shorten the distance between the planetary gear set DP and the planetary gear unit PU, and to shorten the output side member 101 of the third clutch C-3 and the output side member 102 of the first clutch C-1, which must in particular be strong in order to transfer a high torque. Thereby, it is possible to reduce the weight and to improve the controllability of the automatic transmission $1_{11}$.

Because the carrier CR1 is connected to the input shaft 12 on its side facing the planetary gear unit PU and is linked to the clutch drum 32, which is the transfer member of the input side of the second clutch C-2, on its side axially opposite the planetary gear unit PU, it is possible to link the carrier CR1, the transfer member 112 of the input side of the second clutch C-2, and the input shaft 12 without making these members complicated, and it is possible to make the automatic transmission $1_{11}$ more compact.

In addition, because the hub 116 of the first brake B-1 and the transfer member 104 that is linked thereto are axially linked to the sun gear S2 at a side of the planetary gear unit PU that is axially opposite the planetary gear set DP, it is possible to link the hub member 116 of the first brake B-1, the transfer member 104, and the sun gear S2 without making these members complicated, and to make the automatic transmission $1_{11}$ more compact.

With the planetary gear set DP which includes a sun gear S1 which is held stationary on the case 4, a carrier CR1 that rotatably supports the pinion gear P1 and the pinion gear P2 and is linked to the input shaft 12, and a ring gear R1 that meshes with the pinion gear P2 and outputs a reduced speed rotation, it is possible to output a reduced speed rotation less than that of the input rotation of the input shaft 12 at the ring gear R1.

In addition, because the planetary gear unit PU is a Ravigneaux-type planetary gear unit PU that includes a sun gear S2, a sun gear S3, short pinion P3 that meshes with the sun gear S3, a long pinion P4 that meshes with the sun gear S2 and with the short pinion P3, a carrier CR2 that rotatably supports the short pinion P3 and the long pinion P4, and the ring gear R3 that meshes with the long pinion P4, it is possible to prevent high speed rotation of each of the rotary members, and it is possible to provide favorable gear ratios while enabling each of the rotary elements of the planetary gear unit PU and the output side members of each of the clutches and brakes to be linked without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, the carrier CR2, and the ring gear R3 are shown on the abscissa, the sun gear S2 is positioned at the farthest left end of the ordinate and, in sequence to its right, are the carrier CR2, the ring gear R3 that is linked to the counter gear 15, and the sun gear S3.

The automatic transmission $1_{11}$ according to the eleventh embodiment substantially becomes an automatic transmission $1_{13}$ according to the thirteenth embodiment described below by rotating the speed change mechanism $2_{11}$ left-right.

Twelfth Embodiment

Figure 17:
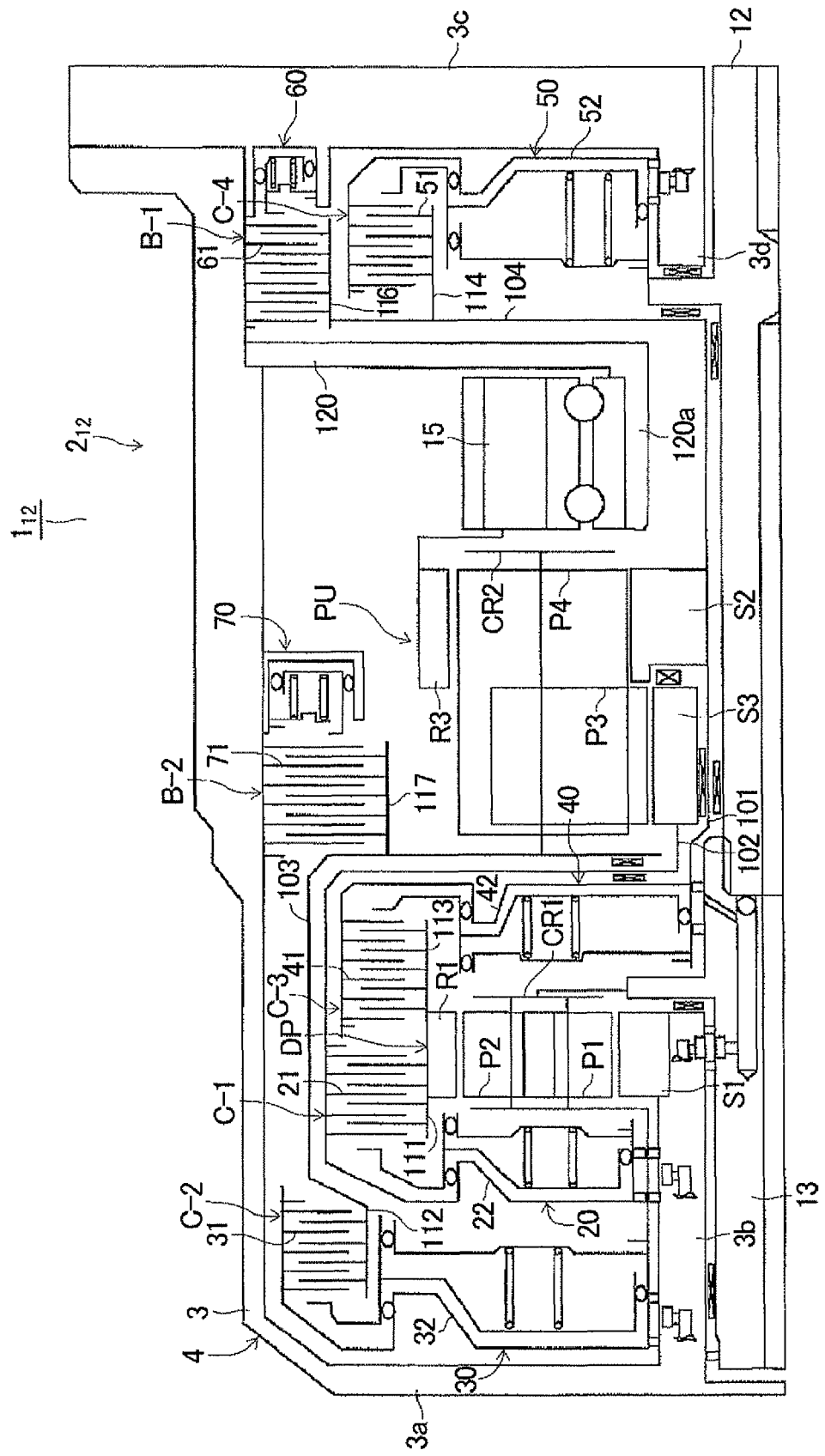
FIG. 17 is a cross-sectional view of an automatic transmission $1_{12}$ according to a twelfth embodiment.

Next, a twelfth embodiment, in which a portion of the eleventh embodiment has been modified, will be explained with reference to FIG. 17 which is a cross-sectional view of the automatic transmission $1_{12}$ according to the twelfth embodiment. In describing the twelfth embodiment below, only those features that differ from the automatic transmission $1_{11}$ of the eleventh embodiment will be explained, the others are substantially identical and the explanation thereof will be omitted.

In the automatic transmission $1_{12}$ according to the twelfth embodiment, in contrast to the automatic transmission $1_{11}$ according to the eleventh embodiment, the hydraulic servo 50 of the fourth clutch C-4 is located on the side of the planetary gear unit PU that is axially opposite the planetary gear unit PU. Specifically, the hydraulic servo 50 of the fourth clutch C-4 is disposed adjacent the support wall 120, to the right of the counter gear 15, on the boss 3d that extends from the partition wall 3c.

The hydraulic servo 30 of the second clutch C-2 and the hydraulic servo 20 of the first clutch C-1 are located on the side of the planetary gear set DP that is axially opposite the planetary gear unit PU, the hydraulic servo 40 of the third clutch C-3 is located axially intermediate the planetary gear set DP and the planetary gear unit PU, and the counter gear 15, the hydraulic servo 50 of the fourth clutch C-4, and the hydraulic servo 60 of the first brake B-1 are located on the side of the planetary gear unit PU that is axially opposite the planetary gear set DP.

Because the fourth clutch C-4 is interposed in the transfer path to connect the input shaft 12 and the sun gear S2, the second clutch C-2 is interposed in the transfer path to connect the carrier CR1 and the carrier CR2, and the output side transfer member 103 of the second clutch C-2 is linked to the side of the carrier CR2 axially facing the planetary gear set DP, it is possible to eliminate a member that encloses the planetary gear unit PU. Thereby, the automatic transmission $1_{12}$ can be made more radially compact. In addition, it is possible to shorten the transfer member that requires a high rigidity, it is possible to reduce the weight, and it is possible to improve the controllability of the automatic transmission $1_7$. Furthermore, the structure allows lubricating oil to be readily discharged where needed, and the cooling performance to be ensured. In addition, the assembly of the automatic transmission $1_{12}$ is simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_{12}$.

In addition, because the hydraulic servo 30 of the second clutch C-2 is located on the side of the planetary gear set DP that is axially opposite the planetary gear unit PU, it is possible to supply the working oil to the hydraulic servo 30 of the second clutch C-2 from an oil duct provided in the boss 3b that extends from one end of the case 4. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{12}$.

Furthermore, because the hydraulic servo 50 of the fourth clutch C-4 is disposed on the side of the planetary gear unit PU that is axially opposite the planetary gear set DP and the friction plates 51 are located more radially outward, it is possible to enlarge the surface area of the friction plates 51 and to ensure transfer of a sufficient torque, while reducing the number of friction plates 51. Furthermore, it is possible to supply working oil to the hydraulic servo 50 of the fourth clutch C-4 from an oil duct provided in the boss 3d that extends from one end of the case 4. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{12}$.

In addition, because the hydraulic servo 40 of the third clutch C-3 is located axially intermediate the planetary gear unit PU and the planetary gear set DP, in comparison to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and to shorten the output side transfer member 101 of the third clutch C-3, which requires strength for transferring a high torque. Thereby, it is possible to reduce the weight and to improve the controllability of automatic transmission $1_{12}$.

Likewise, because the hydraulic servo 20 of the first clutch C-1 is located on the side of the planetary gear set DP that is axially opposite the planetary gear unit PU, it is possible to supply the working oil to the hydraulic servo 20 of the first clutch C-1 from an oil duct in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{12}$.

The first brake B-1 that selectively locks the rotation of the sun gear S2 has a hydraulic servo 60 located on the side of the counter gear 15 that is axially opposite the planetary gear set DP, and a locking force transfer member linked to the sun gear S2 and extending along the radially inner side. Therefore, it is possible to link the locking force transfer member of the first brake B-1 and the sun gear S2 without making these members complicated, and to make the automatic transmission 13 more compact.

The transfer member 103 of the output side of the second clutch C-2 is linked to the carrier CR2 and extends coaxial with and radially outward of the transfer members 101, 102 of the output sides of the third and first clutches C-3, C-1. The transfer member 104 of the output side of the fourth clutch C-4 and the transfer member 101 of the output side of the third clutch C-3 are linked to the sun gear S2, and the transfer member 104, the transfer member 101, and the sun gear S2, which rotate integrally, are disposed radially inward of the transfer member 102. Therefore, the transfer member 104, which rotates faster than the transfer member 103, is further radially inward than the transfer member 102, which is inward of the transfer member 103. Thus, the diameter of the transfer member 104 is smaller than the diameter of the transfer member 103, and it is possible to reduce the weight as compared to a structure in which the transfer member is on the radially outer side. In addition, because the inertia is reduced in comparison to a structure in which it is disposed on the radially outer side, it is possible to improve the controllability of the automatic transmission $1_{12}$.

Because the transfer member of the input side of the second clutch C-2 forms a portion of a clutch drum 32 of the hydraulic servo 30 of the second clutch C-2, and because the hydraulic servo 30 is supported on the boss 3b axially intermediate the planetary gear set DP and the side wall 3a, it is possible to supply the working oil to the hydraulic servo 30 of the second clutch C-2 from an oil duct c30 in the boss 3b. Thus, in comparison to a structure in which, for example, the hydraulic servo 30 of the second clutch C-2 is disposed on the input shaft 12, separated from the boss 3b, and the working oil is supplied via an oil duct in the input shaft 12, it is possible to shorten the length of the oil duct by an amount equivalent to the length of an oil duct in the input shaft 12, and to improve the controllability of the automatic transmission $1_{12}$.

In addition, because the hub 111 of the first clutch C-1 is linked to the ring gear R1, the transfer member 102 of the output side of the first clutch C-1 is linked to the sun gear S3, a portion of the transfer member 102 forms the clutch drum 22 of the hydraulic servo 20 of the first clutch C-1, and the hydraulic servo 20 is supported on the boss 3b axially intermediate the planetary gear set DP and the hydraulic servo 20 of the first clutch C-1, it is possible to supply the working oil to the hydraulic servo 20 of the first clutch C-1 from an oil duct c20 in the boss 3b. Thus, in comparison to a structure in which, for example, the hydraulic servo 20 of the first clutch C-1 is disposed on the input shaft 12, separated from the boss 3b, and the working oil is supplied via an oil duct in the input shaft 12, it is possible to shorten the length of the oil duct by an amount equivalent to the length of the oil duct in the input shaft 12, and it is possible to improve the controllability of the automatic transmission $1_{12}$.

In addition, because counter gear 15 is located on the side of the planetary gear unit PU that is axially opposite the planetary gear set DP, and because the multi-plate brakes are disposed around the outer circumference of the planetary gear unit PU, in comparison to a structure in which, for example, the counter gear 15 is between the planetary gear unit PU and the planetary gear set DP, the hub member 117 of the second brake B-2 can use the transfer member 103 of the output side of the second clutch C-2 in common to link to the carrier CR2.

Also, in comparison to a structure in which a band brake is disposed around the outer circumference of the transfer member 103 of the output side of the second clutch C-2, it is possible to use multi-plate brakes, located radially outward of the planetary gear unit PU, while maintaining compactness.

Furthermore, because a counter shaft 81 is arranged in parallel with the input shaft 12 and is linked to the counter gear 15 to receive the output rotation from the ring gear R3, it is possible to advantageously use the automatic transmission $1_{12}$ in an FF-type vehicle.

In addition, because the counter gear 15 is located on the side of the planetary gear unit PU that is axially opposite the planetary gear set DP and is supported by the support member 120a, it is possible to shorten the distance between the planetary gear set DP and the planetary gear unit PU, and to shorten the output side member 101 of the third clutch C-3 and the output side member 102 of the first clutch C-1, which must in particular be strong in order to transfer a high torque. Thereby, it is possible to reduce the weight and to improve the controllability of the automatic transmission $1_{12}$.

In addition, because the carrier CR1 is linked to the input shaft 12 on the side facing planetary gear unit PU and is linked to the hub member 112 at the side of the planetary gear set DP that is axially opposite the planetary gear unit PU, it is possible to link the carrier CR1, the transfer member 112 of the input side of the second clutch C-2, and the input shaft 12 without making these members complicated, to make the automatic transmission $1_{12}$ more compact.

In addition, because the hub 116 of the first brake B-1 and the transfer member 104 that is linked thereto are axially linked to the sun gear S2 on the side of the planetary gear unit PU that is axially opposite the planetary gear set DP, it is possible to link the hub 116 of the first brake B-1, the transfer member 104, and the sun gear S2 without making these members complicated, and to make the automatic transmission $1_{12}$ more compact.

The planetary gear set DP includes a non-rotatable sun gear S1, a carrier CR1 that rotatably supports the pinion gear P1 and the pinion gear P2 and is linked to the input shaft 12, and a ring gear R1 that meshes with the pinion gear P2 and outputs a reduced speed rotation, and provides output of a reduced speed rotation, i.e. at a speed less than that of the input rotation of the input shaft 12, at the ring gear R1.

Because the planetary gear unit PU is a Ravigneaux-type planetary gear unit PU that includes a sun gear S2, a sun gear S3, short pinion P3 that meshes with the sun gear S3, a long pinion P4 that meshes with the sun gear S2 and with the short pinion P3, a carrier CR2 that rotatably supports the short pinion P3 and the long pinion P4, and the ring gear R3 that meshes with the long pinion P4, it is possible to prevent high speed rotation of the rotary members and to provide favorable gear ratios while enabling each of the rotary elements of the planetary gear unit PU and the output side members of each of the clutches and brakes to be linked without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, the carrier CR2, and the ring gear R3 are shown in the abscissa, the sun gear S2 is positioned at the farthest left end of the ordinate and, arranged in sequence to its right, are the carrier CR2, the ring gear R3, and the sun gear S3.

Thirteenth Embodiment

Figure 18:
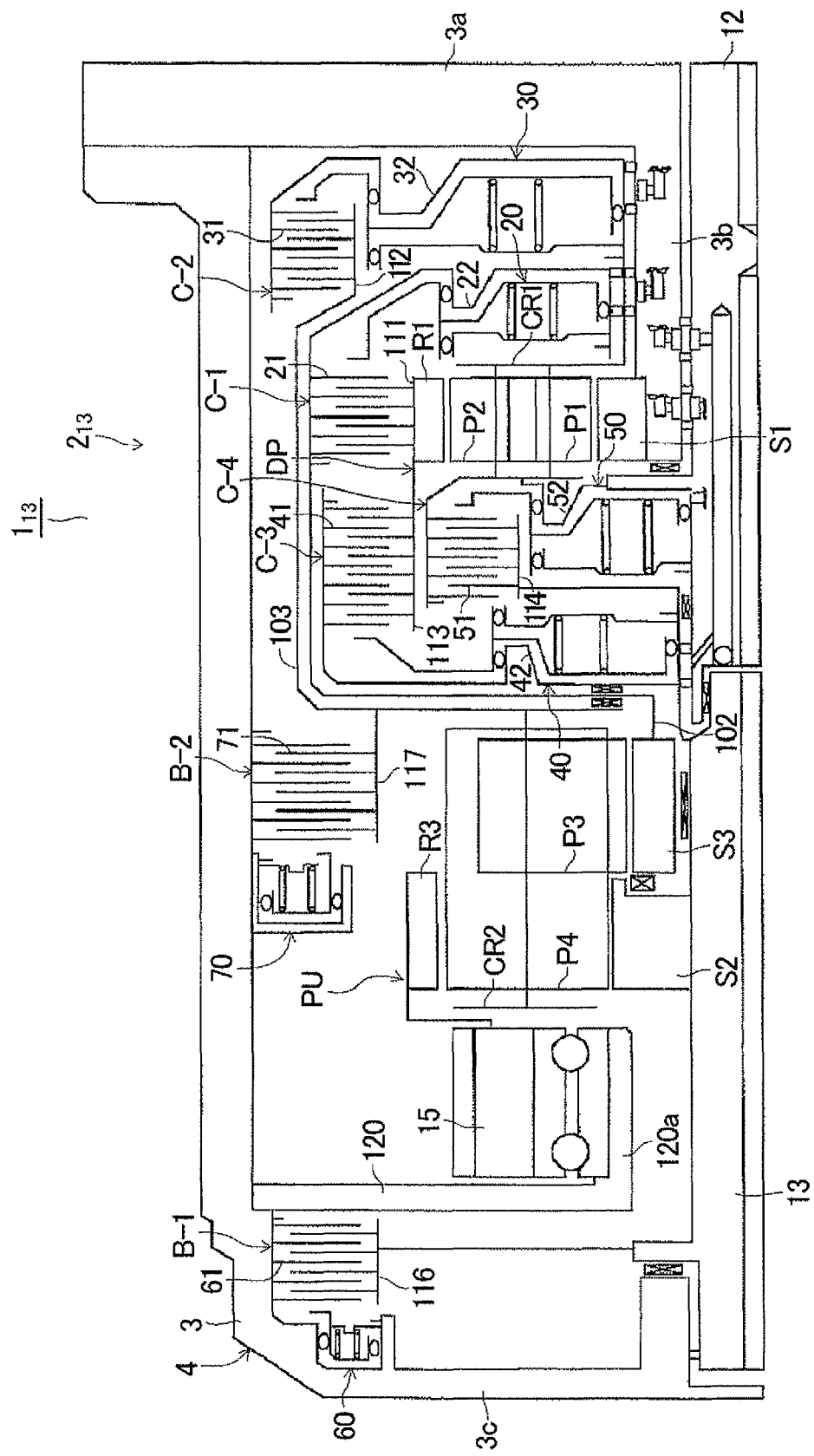
FIG. 18 is a cross-sectional view of an automatic transmission $1_{13}$ according to a thirteenth embodiment.

The thirteenth embodiment may be regarded as a modification of the eleventh embodiment. FIG. 18 is a cross-sectional view of the automatic transmission $1_{13}$ of the thirteenth embodiment. In the description of the thirteenth embodiment which follows, features having a structure that is identical to the automatic transmission $1_{11}$ of the eleventh embodiment are denoted by identical reference numerals, and the explanation thereof is omitted.

In the automatic transmission $1_{13}$ of the thirteenth embodiment, the input shaft 12 and the intermediate shaft 13 and engine orientation are not changed. However, the orientations of the first through fourth clutches C-1 to C-4, the first and second brakes B-1 and B-2, the planetary gear set DP, the planetary gear unit PU, and the counter gear 15 are substantially reversed right-left, i.e. the speed change mechanism $2_{13}$ is substantially the speed change mechanism $2_{11}$ rotated 180° right-left.

The hydraulic servo 30 of the second clutch C-2 and the hydraulic servo 20 of the first clutch C-1 are located on the side of the planetary gear set DP that is axially opposite the planetary gear unit PU. The hydraulic servo 50 of the fourth clutch C-4 and the hydraulic servo 40 of the third clutch C-3 are located axially intermediate the planetary gear set DP and the planetary gear unit PU, and the counter gear 15 and the hydraulic servo 60 of the first brake B-1 are located on the side of the planetary gear unit PU that is axially opposite the planetary gear set DP.

In automatic transmission $1_{13}$ described above, because the fourth clutch C-4 is interposed in the transfer path to connect the input shaft 12 and the sun gear S2, the second clutch C-2 is interposed in the transfer path to connect the carrier CR1 and the carrier CR2, and the output side transfer member 103 of the second clutch C-2 is linked to the carrier CR2 on the side facing the planetary gear set DP, it is possible to eliminate a member that encloses the planetary gear unit PU. Thereby, the automatic transmission $1_{13}$ can be made more radially compact. In addition, it is possible to shorten the transfer member that requires a high rigidity, to reduce the weight, and to improve the controllability of the automatic transmission $1_{13}$. Furthermore, the structure allows lubricating oil to be readily discharged where needed, and the cooling performance to be ensured. In addition, the assembly of the automatic transmission $1_{13}$ can be simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_{13}$.

In addition, because the hydraulic servo 50 of the fourth clutch C-4 is located axially intermediate the planetary gear unit PU and the planetary gear set DP, axially adjacent the planetary gear set DP, it is possible to use in common portions of the carrier CR1 and the clutch drum 52 of the hydraulic servo 50 of the fourth clutch C-4 (that is, the clutch drum 52 and the side plate of the carrier CR1), and thereby reduce the size and weight.

Furthermore, because the hydraulic servo 30 of the second clutch C-2 is located on the side of the planetary gear set DP that is axially opposite the planetary gear unit PU, it is possible to supply the working oil to the hydraulic servo 30 of the second clutch C-2 from an oil duct in the boss 3b. Thereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{13}$.

In addition, because the hydraulic servo 40 of the third clutch C-3 is located axially intermediate the planetary gear unit PU and the planetary gear set DP, as compared to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and it is possible to shorten the output side transfer member 101 of the third clutch C-3, which must be strong in order to transfer high torque. Thereby, it is possible to reduce the weight and to improve the controllability of the automatic transmission $1_{13}$.

Furthermore, because the hydraulic servo 20 of the first clutch C-1 is located on the side of the planetary gear set DP that is axially opposite the planetary gear unit PU, it is possible to supply the working oil to the hydraulic servo 20 of the first clutch C-1 from an oil duct provided in the boss 3b. Thereby, in comparison to a structure in which the working oil is supplied from an oil duct in the input shaft 12, it is possible to reduce the number of seal rings, and to reduce the sliding resistance of the seal rings, and to improve the power transfer efficiency of the automatic transmission $1_{13}$.

A first brake B-1 selectively locks the sun gear S2 against rotation, and the hydraulic servo 60 of the first brake B-1 is located on the side of the counter gear 15 that is axially opposite the planetary gear unit PU, and the output side transfer member of the first brake B-1 is linked to the sun gear S2 through the inner circumferential side of the counter gear 15. Therefore, the output side transfer member of the first brake B-1 and the sun gear S2 can be linked without making these members complicated, and the automatic transmission $1_{13}$ can be made more compact.

The transfer member 103 of the output side of the second clutch C-2 is linked to the carrier CR2 radially outward of the transfer members 101, 102 of the output side of the third and first clutches C-3, C-1. The intermediate shaft 13, which is the transfer member of the output side of the fourth clutch C-4, and the transfer member 101 of the output side of the third clutch C-3 are linked to the sun gear S2, and the intermediate shaft 13, the transfer member 101, and the sun gear S2, which rotate integrally, are arranged on the inner side of the transfer member 102. Therefore, the intermediate shaft 13, which rotates faster than the transfer member 103 of the output side of the second clutch C-2, is further radially inward than the transfer member 102 of the output side of the first clutch C-1, which is on the inner side of the transfer member 103 of the output side of the second clutch C-2. Thus, it is possible to make the diameter of the intermediate shaft 13 smaller than the diameter of the transfer member, and to reduce the weight as compared to a structure wherein the intermediate shaft 13 is on the outer side. In addition, because inertia is reduced as compared to a structure in which intermediate shaft 13 is on the outer side, it is possible to improve the controllability of the automatic transmission $1_{13}$.

The third and first clutches C-3, C-1 are disposed on the side of the planetary gear set DP. The transfer members 101, 102 of the output sides of the third and first clutches C-3, C-1 are respectively linked to the sun gear S2 and the sun gear S3. The fourth clutch C-4 is disposed on the side of the planetary gear set DP. The intermediate shaft 13, which is the transfer member of the output side of the fourth clutch C-4, is linked to the sun gear S2, the second clutch C-2 is on the side of the planetary gear set DP, the transfer member 103 of the output side of the second clutch C-2 extends around the outer circumferences of the transfer members 101, 102 of output sides of the third and first clutches C-3, C-1 to link with the carrier CR2. Because the intermediate shaft 13, which is the transfer member of the output side of the fourth clutch C-4 and which rotates faster than the transfer member 103 of the output side of the second clutch C-2, is disposed radially inward, the diameter of the intermediate shaft 13, can be made smaller than the diameter of the transfer member 103 of the output side of the second clutch C-2, thereby reducing weight as compared to a structure in which the intermediate shaft 13 is disposed on the outer circumferential side. In addition, compared to the case in which it is disposed on the outer circumferential side, it is possible to reduce inertia, and thus improve the controllability of the automatic transmission $1_{13}$.

Furthermore, because the transfer member of the output side of the fourth clutch C-4 is directly linked to the carrier CR1 and a portion of the carrier CR1 forms a portion of the hydraulic servo 50 of the fourth clutch C-4, i.e. a portion of the clutch drum 52 and the side plate of the carrier CR1 are used in common, it is possible to reduce the size and weight.

The boss 3b which extends from the side wall 3a of the case 4 holds the sun gear S1 stationary, the transfer member of the input side of the second clutch C-2 is linked to the carrier CR1, a portion of the transfer member of the input side of the second clutch C-2 forms a portion of a clutch drum 32 of the hydraulic servo 30 which is supported on the boss 3b axially intermediate the planetary gear set DP and the side wall 3a. Therefore, it is possible to supply the working oil to the hydraulic servo 30 of the third clutch C-3 from an oil duct c30 in the boss 3b. Thus, in comparison to a structure in which, for example, the hydraulic servo 30 of the second clutch C-2 is disposed around the input shaft 12 spaced from the boss 3b and the working oil is supplied via an oil duct in the input shaft 12, it is possible to shorten the length of the oil duct by an amount equivalent to the length of the oil duct in the input shaft 12, and it is possible to improve the controllability of the automatic transmission $1_{13}$.

In addition, because the hub member 111 of the first clutch C-1 is linked to the ring gear R1, because the transfer member 102 of the output side of the first clutch C-1 is linked to the sun gear S3, because a portion of the transfer member 102 of the output side of the first clutch C-1 forms the clutch drum 22 of the hydraulic servo 20 of the first clutch C-1, and because the hydraulic servo 20 is disposed on the boss 3b, axially intermediate the planetary gear set DP and the hydraulic servo 20 of the first clutch C-1, it is possible to supply the working oil to the hydraulic servo 20 of the first clutch C-1 from an oil duct c20 in the boss 3b. Thus, in comparison to a structure in which, for example, the hydraulic servo 20 of the first clutch C-1 is disposed around the input shaft 12, spaced from the boss 3b, and the working oil is supplied via an oil duct in the input shaft 12, it is possible to shorten the length of the oil duct by the length of an oil duct in the input shaft 12, and it is possible to improve the controllability of the automatic transmission $1_{13}$.

Because counter gear 15, linked to the ring gear R3 of the planetary gear unit PU, is disposed on the side of the planetary gear unit PU that is axially opposite the planetary gear set DP, and the multi-plate brakes are disposed radially outward of the planetary gear unit PU, in comparison to a structure in which, for example, the counter gear 15 is between the planetary gear unit PU and the planetary gear set DP, the hub member 117 of the second brake B-2 and the transfer member 103 of the output side of the second clutch C-2 are used in common to link to the carrier CR2, and, in contrast to the case in which a band brake is disposed around the outer circumference of the transfer member 103, it is possible to maintain compactness with multi-plate brakes.

Furthermore, because a counter shaft 81 is arranged in parallel with the input shaft 12 and linked to the counter gear 15 to receive the output rotation from the ring gear, it is possible to advantageously use the automatic transmission $1_{13}$ in an FF-type vehicle.

In addition, because the counter gear 15 is located on the side of the planetary gear unit PU that is axially opposite the planetary gear set DP and is supported by the support member 120a, it is possible to shorten the distance between the planetary gear set DP and the planetary gear unit PU, and to shorten the output side member 101 of the third clutch C-3 and the output side member 102 of the first clutch C-1, which must in particular be strong in order to transfer a high torque. It is thereby possible to reduce weight and to improve the controllability of the automatic transmission $1_{13}$.

In addition, because the carrier CR1 is linked to the input shaft 12 on the side of the planetary gear set DP facing the planetary gear set DP and linked to the clutch drum 32, which is the transfer member of the input side of the second clutch C-2, on the side of the planetary gear set DP that is axially opposite the planetary gear unit PU, it is possible to link the carrier CR1 and the input shaft 12 without making these members complicated and to make the automatic transmission $1_{13}$ more compact.

In addition, because the hub 116 of the first brake B-1 and the transfer member 104 are axially linked to the sun gear S2 on the side of the planetary gear unit PU that is axially opposite the planetary gear set DP, it is possible to link the hub member 116 of the first brake B-1, the transfer member 104, and the sun gear S2 without making these members complicated and to make the automatic transmission $1_{13}$ more compact.

In addition, because the planetary gear set DP includes the non-rotatable sun gear S1, a carrier CR1 that rotatably supports the pinion gear P1 and the pinion gear P2 and is linked to the output shaft 12, and a ring gear R1 that meshes with the pinion gear P2 and outputs a reduced speed rotation, it is possible to output a reduced speed rotation, i.e. at a speed less than that of the input rotation of the input shaft 12, from the ring gear R1.

Because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and meshes with the short pinion P3, the carrier CR2 that rotatably supports the short pinion P3 and the long pinion P4, and the ring gear R3 that meshes with the long pinion P4, it is possible to prevent high speed rotation of each of the rotary elements and to obtain advantageous gear ratios while enabling each of the rotary elements of the planetary gear unit PU and the output side members of each of the clutches and brakes to be linked without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the farthest left end of the ordinate and, in sequence to the right thereof, are the carrier CR2, the ring gear R3 that is linked to the counter gear 15, and the sun gear S3.

Fourteenth Embodiment

Next, a fourteenth embodiment, in which a portion of the twelfth embodiment described above has been modified, will be explained with reference to FIG. 19 which is a cross-sectional view of automatic transmission $1_{14}$. Features which are identical to those of the automatic transmission $1_{12}$ of the twelfth embodiment are denoted by identical reference numerals, and explanation thereof is omitted.

In the automatic transmission $1_{14}$ of the fourteenth embodiment, the arrangement of the input shaft 12, the intermediate shaft 13 and the engine is unchanged. However, the arrangement of the first through fourth clutches C-1 to C-4, the first and second brakes B-1 to B-2, the planetary gear set DP, the planetary gear unit PU, and the counter gear 15 is substantially reversed. In other words, the speed change mechanism $2_{14}$ is substantially reversed 180° left-right.

The automatic transmission $1_{14}$, the hydraulic servo 30 of the second clutch C-2 and the hydraulic servo 20 of the first clutch C-1 are located on the side of the planetary gear set DP that is axially opposite the planetary gear unit PU, the hydraulic servo 40 of the third clutch C-3 is located axially intermediate the planetary gear set DP and the planetary gear unit PU, and the counter gear 15, the hydraulic servo 50 of the fourth clutch C-4, and the hydraulic servo 60 of the first brake B-1 are located on the side of the planetary gear unit PU that is axially opposite the planetary gear set DP.

In the automatic transmission $1_{14}$, because the fourth clutch C-4 is interposed in the transfer path to connect the input shaft 12 and the sun gear S2, the second clutch C-2 is interposed in the transfer path to connect the carrier CR1 and the carrier CR2, and the output side transfer member 103 of the second clutch C-2 is linked to the side of the carrier CR2 axially facing the planetary gear set DP, it is possible to eliminate a member that encloses the planetary gear unit PU. Thereby, the automatic transmission $1_{14}$ can be made more radially compact. In addition, it is possible to shorten the transfer member that requires a high rigidity, to reduce the weight, and it to improve the controllability of the automatic transmission $1_{14}$. Furthermore, the structure allows lubricating oil to be readily discharged where needed, and the cooling performance to be ensured. In addition, the assembly of the automatic transmission $1_{14}$ can be simplified. Furthermore, because the working oil for the clutches can be supplied from support wall 120 due to the configuration of each of the clutches, it is possible to reduce the number of seal rings, to reduce the sliding resistance of the seal rings, and to improve the power transfer efficiency of the automatic transmission $1_{14}$.

In addition, because the hydraulic servo 30 of the second clutch C-2 is located on the side of the planetary gear set DP that is axially opposite the planetary gear unit PU, it is possible to supply the working oil to the hydraulic servo 30 of the second clutch C-2 from an oil duct in the boss 3b. Thereby, in comparison with a structure in which the working oil is supplied from an oil duct in the input shaft 12, it is possible to reduce the number of seal rings, to reduce the sliding resistance of the seal rings, and to improve the power transfer efficiency of the automatic transmission $1_{14}$.

Furthermore, because the hydraulic servo 50 of the fourth clutch C-4 is disposed on the side of the planetary gear unit PU that is axially opposite the planetary gear set DP, it is possible to dispose the friction plates 51 of the fourth clutch C-4 more radially outward and to enlarge the surface area of the friction plates 51, and thus, it is possible to provide transfer of sufficient torque, while reducing the number of friction plates. Furthermore, the working oil is supplied to the hydraulic servo 50 of the fourth clutch C-4 from an oil duct in the boss 3d, whereby, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{14}$.

In addition, because the hydraulic servo 40 of the third clutch C-3 is located axially intermediate the planetary gear unit PU and the planetary gear set DP, in comparison to a structure in which the hydraulic servo 40 of the third clutch C-3 is located on the side of the planetary gear set DP that is axially opposite the planetary gear unit PU, it is possible to shorten the distance between the third clutch C-3 and the planetary gear unit PU, and to shorten the output side transfer member 101 of the third clutch C-3, which must be strong in order to transfer high torque. Thereby, it is possible to reduce the weight, and to improve the controllability of the automatic transmission $1_{14}$.

Furthermore, because the hydraulic servo 20 of the first clutch C-1 is located on the side of the planetary gear set DP that is axially opposite the planetary gear unit PU, it is possible to supply the working oil to the hydraulic servo 20 of the first clutch C-1 from an oil duct in the boss 3b. Thereby, in comparison to a structure in which working oil is supplied from an oil duct in the input shaft 12, it is possible to reduce the number of seal rings, to reduce the sliding resistance of the seal rings, and to improve the power transfer efficiency of the automatic transmission $1_{14}$ for an engine.

In addition, a first brake B-1 selectively locks the sun gear S2 against rotation, the hydraulic servo 60 of the first brake B-1 is located on the side of the counter gear 15 that is axially opposite the planetary gear set DP, and the locking force transfer member of the first brake B-1 axially extends on the radially inner side to link to the sun gear S2. Therefore, it is possible to link the locking force transfer member of the first brake B-1 and the sun gear S2 without making these members complicated, and to make the automatic transmission $1_{14}$ more compact.

In the automatic transmission $1_{14}$ according to the present invention as explained above, the transfer member 103 of the output side of the second clutch C-2 extends around the outer circumference of the transfer members 101, 102 of the output sides of the third and first clutches C-3, C-1 to link with the carrier CR2, the transfer member 104 of the output side of the fourth clutch C-4 and the transfer member 101 are linked to the sun gear S2, and the transfer member 104, the transfer member 101, and the sun gear S2, which rotate integrally, are disposed on the radially inner side of the transfer member 102. Therefore, the transfer member 104, which rotates faster than the transfer member 103, is more radially inward than the transfer member 102, which is on the radially inner side of the transfer member 103. Thus, it is possible to make the diameter of the transfer member 104 smaller than the diameter of the transfer member 103, and to reduce the weight as compared to a structure in which the transfer member 104 is on the radially outer side. In addition, because the inertia is reduced in comparison to a structure in which transfer member 104 is disposed on the radially outer side, it is possible to improve the controllability of the automatic transmission $1_{14}$.

In addition, the third and first clutches C-3, C-1 are disposed on the side of the planetary gear set DP, the transfer members 101, 102 of the output side of the third and first clutches C-3, C-1 are respectively linked to the sun gear S2 and the sun gear S3, the fourth clutch C-4 is located on the side of the planetary gear unit PU that is axially opposite the planetary gear set DP, the transfer member 104 is linked to the sun gear S2, the second clutch C-2 is disposed on the planetary gear set DP side, and the transfer member 103 extends around the outer circumferences of the transfer members 101, 102 to link with carrier CR2. Thereby, the diameter of the transfer member 104 can be made smaller than the diameter of the transfer member 103. Because the transfer member 104, which rotates faster than the transfer member 103, is disposed on the radially inner side, it is possible to reduce the weight as compared to a structure in which the transfer member 104 is disposed on the radially outer side. In addition, compared to the case in which the transfer member 104 is disposed on the outside, it is possible to reduce the inertia, and to thereby improve the controllability of the automatic transmission $1_{14}$.

In addition, in comparison to a structure in which the hydraulic servo 50 of the fourth clutch C-4 is located axially between the planetary gear unit PU and the planetary gear set DP, it is possible to dispose the friction plates 51 of the fourth clutch C-4 more radially outward and to increase the area of the friction plates and, thus, it is possible to transfer sufficient torque while reducing the number of the friction plates 51. Furthermore, it is possible to shorten the distance between the third and first clutches C-3, C-1 and the planetary gear unit PU, and to shorten the transfer members 101, 102 of the output side of the third and first clutches C-3, C-1, which must be strong in order to transfer a high torque. Thereby, it is possible to reduce the weight and to improve the controllability of the automatic transmission $1_{14}$.

Because the working oil is supplied to the hydraulic servo 50 of the fourth clutch C-4 from an oil duct c50 in the boss 3b, in comparison to a structure in which the working oil is supplied from an oil duct in the input shaft 12, it is possible to reduce the number of seal rings, to reduce the sliding resistance of the seal rings, and to improve the power transfer efficiency of the automatic transmission $1_{14}$.

In addition, because the transfer member of the input side of the fourth clutch C-4 is linked to the input shaft 12 and the intermediate shaft 13 through the inner circumferential side of the planetary gear unit PU and a portion of the transfer member of the input side of the fourth clutch C-4 forms the clutch drum 52 of the hydraulic servo 50 of the fourth clutch C-4, in contrast to a structure in which the transfer member of the output side of the fourth clutch C-4 forms the clutch drum of the hydraulic servo 50, the clutch drum 52 can be used as a member to transfer power from the input shaft 12, and thus, it is possible to make the transfer member more axially compact.

In addition, because of provision of boss 3b which holds the sun gear S1 stationary, because the transfer member of the input side of the second clutch C-2 is linked to the carrier CR1, because a portion of the transfer member of the input side of the second clutch C-2 forms a portion of clutch drum 32 of the hydraulic servo 30 of the second clutch C-2, and because the hydraulic servo 30 is supported on the boss 3b axially intermediate the planetary gear set DP and the side wall 3a, it is possible to supply the working oil to the hydraulic servo 30 of the third clutch C-3 from an oil duct c30 in the boss 3b. Thus, in comparison to a structure in which, for example, the hydraulic servo 30 of the second clutch C-2 is disposed around the input shaft 12, separated from the boss 3b, and the working oil is supplied via an oil duct in the input shaft 12, it is possible to shorten the length of the oil duct by the length of an oil duct in the input shaft 12, thereby improving the controllability of the automatic transmission $1_{14}$.

In addition, because the hub 111 of the first clutch C-1 is linked to the ring gear R1, the transfer member 102 of the output side of the first clutch C-1 is linked to the sun gear S3, a portion of the transfer member 102 of the output side of the first clutch C-1 forms the clutch drum 22 of the hydraulic servo 20 of the first clutch C-1, and the hydraulic servo 20 is supported on the boss 3b axially intermediate the planetary gear set DP and the hydraulic servo 20 of the first clutch C-1, it is possible to supply the working oil to the hydraulic servo 20 of the first clutch C-1 from an oil duct c20 in the boss 3b. Thus, in comparison to a structure in which, for example, the hydraulic servo 20 of the first clutch C-1 is disposed around the input shaft 12, separated from the boss 3b, and the working oil is supplied via an oil duct in the input shaft 12, it is possible to shorten the length of the oil duct by an amount equivalent to the length of an oil duct in the input shaft 12, thereby improving the controllability of the automatic transmission $1_{14}$.

Further, because counter gear 15 is located on the side of the planetary gear unit PU that is axially opposite the planetary gear set DP, because the second brake B-2 is a multi-plate brake with a plurality of friction plates 71, and the multi-plate brakes are disposed on the outer circumferential side of the planetary gear unit PU, in contrast with a structure in which, for example, the counter gear 15 is between the planetary gear unit PU and the planetary gear set DP, the hub 117 of the second brake B-2 can use the transfer member 103 of the output side of the second clutch C-2 to link to the carrier CR2, and, for example, in comparison to a structure in which a band brake is disposed around the outer circumference of the transfer member 103, it is possible to locate the multi-plate brakes radially outward of the planetary gear unit PU, to maintain compactness and to make the brakes multi-plate.

Furthermore, because a counter shaft 81 is arranged in parallel with the input shaft 12 and linked to the counter gear 15 for receipt of the output rotation from the ring gear R3, the automatic transmission $1_{14}$ is advantageously used in an FF-type vehicle.

In addition, because the counter gear 15 is located on the side of the planetary gear unit PU that is axially opposite the planetary gear set DP and is supported on the support member 120a that is linked to the support wall 120 that extends from the case 4, it is possible to shorten the distance between the planetary gear set DP and the planetary gear unit PU, and it is possible to shorten the output side member 101 of the third clutch C-3 and the output side member 102 of the first clutch C-1, which must in particular be strong in order to transfer a high torque. Thereby, it is possible to reduce the weight and to improve the controllability of the automatic transmission $1_{14}$.

Further, because the carrier CR1 is linked to the input shaft 12 on the side of the planetary gear set DP side facing the planetary gear unit PU and is linked to the hub member 114, which is the transfer member of the input side of the second clutch C-2, on the side of the planetary gear unit PU that is axially opposite the planetary gear set DP, it is possible to link the carrier CR1, the transfer member 114 of the input side of the second clutch C-2, and the input shaft 12 without making these members complicated, and to thereby make the automatic transmission $1_{14}$ more compact.

In addition, because the hub member 116 of the first brake B-1 and the transfer member 104 that is linked thereto are axially linked to the sun gear S2 on the side of the planetary gear unit PU that is axially opposite the planetary gear set DP, it is possible to link the hub member 116 of the first brake B-1, the transfer member 104, and the sun gear S2 without making these members complicated, and it is possible to make the automatic transmission $1_{14}$ more compact.

Because the planetary gear set DP includes the sun gear S1, which is held stationary, a carrier CR1 that rotatably supports the pinion gear P1 and the pinion gear P2 and is linked to the output shaft 12, and a ring gear R1 that meshes with the pinion gear P2 and outputs a reduced speed rotation, it is possible to output a reduced speed rotation from the ring gear R1, i.e. at a speed less than that of the input rotation of the input shaft 12.

In addition, because the planetary gear unit PU is a Ravigneaux-type planetary gear unit PU that includes the sun gear S2, the sun gear S3, the short pinion P3 that meshes with the sun gear S3, the long pinion P4 that meshes with the sun gear S2 and meshes with the short pinion P3, the carrier CR2 that selectively rotatably supports the short pinion P3 and the long pinion P4, and the ring gear R3 that meshes with the long pinion P4, it is possible to prevent high speed rotation of each of the rotary elements and to provide advantageous gear ratios while enabling each of the rotary elements of the planetary gear unit PU and the output side members of each of the clutches and brakes to be linked without making these members complicated.

The first forward speed is established by engaging the first clutch C-1 and locking the second brake B-2; the second forward speed is established by engaging the first clutch C-1 and locking the first brake B-1; the third forward speed is established by engaging the first clutch C-1 and the third clutch C-3; the fourth forward speed is established by engaging the first clutch C-1 and the fourth clutch C-4; the fifth forward speed is established by engaging the first clutch C-1 and the second clutch C-2; the sixth forward speed is established by engaging the second clutch C-2 and the fourth clutch C-4; the seventh forward speed is established by engaging the second clutch C-2 and the third clutch C-3; the eighth forward speed is established by engaging the second clutch C-2 and locking the first brake B-1; and reverse speeds are established by engaging the third clutch C-3 or the fourth clutch C-4 and locking the second brake B-2.

In a velocity diagram in which the respective speeds of the sun gear S2, the sun gear S3, the carrier CR2, and the ring gear R3 of the planetary gear unit PU are shown on the ordinate, and the corresponding gear ratios of the sun gear S2, the sun gear S3, and carrier CR2, and the ring gear R3 are shown on the abscissa, the sun gear S2 is positioned at the farthest left end of the ordinate and, extending in sequence to the right thereof, are the carrier CR2, the ring gear R3 that is linked to the counter gear 15, and the sun gear S3.

While in the first through fourteenth embodiments described above, the automatic transmission is described as including a torque converter 7, a start-up clutch may be used instead of torque converter 7.

Moreover, the automatic transmission 1 of the first through fourteenth embodiments is not limited to use in an FF-type vehicle. For example, the present invention may be applied to an automatic transmission for a vehicle that is used in a four-wheel drive-type vehicle and to an automatic transmission in a hybrid vehicle.

Further, while the fifth and tenth embodiments have a one-way clutch F-1 whereby the automatic transmission 1 establishes the first forward speed relatively smoothly, but it is not necessary to provide a one-way clutch F-1 and, instead, the first forward speed may be established by engaging the second brake B-2. Conversely, while the first through fourth embodiments, the sixth through ninth embodiments, and the eleventh through fourteenth embodiments, as described, do not include a one-way clutch F-1, a one-way clutch F-1 may be included in these embodiments to establish the first forward speed relatively smoothly.

In addition, while the first through fourteenth embodiments are described as including the planetary gear set DP that outputs a reduced speed rotation and which is a double pinion planetary gear set in which the rotation of the sun gear S1 is held stationary, the rotation of the input shaft 12 is input to the carrier CR1, and the ring gear R1 outputs the reduced speed rotation, instead, the planetary gear set may be a double pinion planetary gear in which, for example, the ring gear R1 is held stationary, the rotation of the input shaft 12 is output to the carrier CR1, and the reduced speed rotation is output from the sun gear S1, or any other planetary gear structure that outputs a reduced speed rotation.

The automatic transmission according to the present invention may be used in any vehicle such as a passenger vehicle, a truck, a bus, and the like, and in particular, in vehicles that require multi-speed automatic transmissions in order to improve fuel economy and/or reductions in weight and improved controllability.

The invention claimed is:
1. An automatic transmission for a vehicle, comprising:
a case including a sidewall;
an input shaft;
a speed reduction planetary gear set that comprises a stationary element which is held against rotation by the case, an input rotary element that receives the input rotation of the input shaft, and a reduced speed rotary element that outputs a reduced speed rotation at a speed less than that of the input rotation;
a planetary gear unit that includes first, second, third, and fourth rotary elements that are arranged in a rotational speed relationship according to their gear relationships;
a first input transfer clutch for selective transfer of the input rotation to the first rotary element;
a second input transfer clutch for selective transfer of the input rotation to the third rotary element;
a first speed reduction transfer clutch for transfer of a reduced speed rotation through the speed reduction planetary gear set to the first rotary element;
a second speed reduction transfer clutch for transfer of a reduced speed rotation through the speed reduction planetary gear set to the second rotary element;
a first brake for selectively stopping the rotation of the first rotary element by locking it to the case; and
a second brake for selectively stopping the rotation of the third rotary element by locking it to the case; and wherein the automatic transmission outputs rotation from the fourth rotary element;

wherein the first and second speed reduction transfer clutches are disposed on the speed reduction planetary gear set side relative to the planetary gear unit and have output side transfer members which are respectively linked to the first rotary element and the second rotary element;

wherein the first input transfer clutch and the speed reduction planetary gear set are disposed on axially opposite sides of the planetary gear unit;

wherein the first input transfer clutch has an output side transfer member which is linked to the first rotary element;

wherein the second input transfer clutch and the planetary gear unit are disposed on the same axial side of the speed reduction planetary gear set; and wherein the second input transfer clutch has an output side transfer member which extends coaxially with and radially outward of the output side transfer members of the first and second speed reduction transfer clutches to link with the third rotary element.

2. The automatic transmission for a vehicle according to claim 1, further comprising:

a first hydraulic servo, including a drum, for operating the first input transfer clutch; and wherein the first input transfer clutch has an input side transfer member linked to the input shaft at a radially inner side of the planetary gear unit; and wherein a portion of the input side transfer member of the first input transfer clutch forms the clutch drum of the hydraulic servo of the first input transfer clutch.

3. The automatic transmission for a vehicle according to claim 1, further comprising:

a first hydraulic servo, including a drum, for operating the second input transfer clutch; and a boss extending from the side wall of the case and on which the stationary element is mounted; and wherein the second input transfer clutch has an input side transfer member linked to the input rotary element;

wherein a portion of the input side transfer member of the second input transfer clutch forms the clutch drum of the first hydraulic servo; and wherein the first hydraulic servo and the sidewall are disposed on axially opposite side of the speed reduction planetary gear set.

4. The automatic transmission for a vehicle according to claim 3, further comprising:

a counter gear linked to the fourth rotary element of the planetary gear set; and wherein the planetary gear unit and the speed reduction planetary gear set are disposed on opposite sides of the counter gear; and wherein the second brake is a multi-plate brake comprising a plurality of friction plates and is disposed radially outward of the planetary gear set.

5. The automatic transmission for a vehicle according to claim 1, further comprising:

a first hydraulic servo, including a drum, for operating the second input transfer clutch;

a counter gear linked to the fourth rotary element and disposed axially intermediate the planetary gear unit and the speed reduction planetary gear set;

a support wall extending radially inward from the case and a support member appended to the inner circumference of the support wall, with the counter gear mounted on the support member; and wherein the second input transfer clutch has an input side transfer member which extends around the outer circumferences of the first and second speed reduction transfer clutches to link to the input rotary element;

wherein a portion of the output side transfer member of the second input transfer clutch forms the clutch drum of the first hydraulic servo; and wherein the first hydraulic servo is disposed around the support member axially intermediate the speed reduction planetary gear set and the counter gear.

6. The automatic transmission for a vehicle according to claim 1, further comprising:

a counter gear linked to the fourth rotary element;

a second shaft arranged in parallel with the input shaft and linked to the counter gear for receipt of output rotation from the fourth rotary element.

7. The automatic transmission for a vehicle according to claim 6, further comprising:

a support wall extending radially inward from the case and a support member extending in parallel to the input shaft and appended to the inner circumference of the support wall; and wherein the counter gear is disposed axially intermediate the planetary gear unit and the speed reduction planetary gear set and is supported by the support member.

8. The automatic transmission for a vehicle according to claim 6, further comprising:

a support wall extending radially inward from the case and a support member extending in parallel to the input shaft and appended to the inner circumference of the support wall;

wherein the counter gear and the speed reduction planetary gear set are disposed on axially opposite sides of the planetary gear unit; and wherein the counter gear is supported by the support member.

9. The automatic transmission for a vehicle according to claim 1, wherein a first side of the input rotary element, facing the planetary gear unit, is linked to the input shaft, and a second side of the input rotary element, opposite the first side, is linked to the input side transfer member of the second input transfer clutch.

10. The automatic transmission for a vehicle according to claim 1, wherein the first brake has a locking force transfer member linked to a first side of the first rotary element that is axially opposite a second side of the first rotary element facing the speed reduction planetary gear set.

11. The automatic transmission for a vehicle according to claim 1, wherein:

the stationary element of the speed reduction planetary gear set comprises a first sun gear;

the input rotary element of the speed reduction planetary gear set comprises a first carrier that rotatably supports a first pinion gear that meshes with the first sun gear and a second pinion gear that meshes with the first pinion gear, and that is linked to the input shaft; and the reduced speed rotary element of the speed reduction planetary gear set comprises a first ring gear that meshes with the second pinion gear and outputs the reduced speed rotation.

12. The automatic transmission for a vehicle according to claim 1, wherein:

a first forward speed is established by engaging the second speed reduction transfer clutch and locking the second brake;

a second forward speed is established by engaging the second speed reduction transfer clutch and locking the first brake;

a third forward speed is established by engaging the second speed reduction transfer clutch and the first speed reduction transfer clutch;

a fourth forward speed is established by engaging the second speed reduction transfer clutch and the first input transfer clutch;

a fifth forward speed is established by engaging the second speed reduction transfer clutch and the second input transfer clutch;

a sixth forward speed is established by engaging the second input transfer clutch and the first input transfer clutch;

a seventh forward speed is established by engaging the second input transfer clutch and the first speed reduction transfer clutch;

an eighth forward speed is established by engaging the second input transfer clutch and locking the first brake; and a reverse speed is established by engaging the first speed reduction transfer clutch or the first input transfer clutch, and locking the second brake.

13. The automatic transmission for a vehicle according to claim 1, wherein the output side transfer member of the second input transfer clutch extends around and radially outward of the first and second speed reduction transfer clutches.

* * * * *